US009478971B2

(12) United States Patent
Aromin et al.

(10) Patent No.: US 9,478,971 B2
(45) Date of Patent: Oct. 25, 2016

(54) POWER CORD APPARATUS FOR REMOTELY DETECTING EXCESSIVE OPERATIONAL PARAMETERS IN AN ELECTRICALLY POWERED MACHINE

(71) Applicants: Victor V Aromin, West Warwick, RI (US); Paul M. Piekarski, Foster, RI (US)

(72) Inventors: Victor V Aromin, West Warwick, RI (US); Paul M. Piekarski, Foster, RI (US)

(73) Assignee: Tower Manufacturing Corporation, Providence, RI (US)

( * ) Notice: Subject to any disclaimer, the term of this patent is extended or adjusted under 35 U.S.C. 154(b) by 249 days.

(21) Appl. No.: 14/312,727

(22) Filed: Jun. 24, 2014

(65) Prior Publication Data

US 2015/0009600 A1    Jan. 8, 2015

Related U.S. Application Data

(60) Provisional application No. 61/842,998, filed on Jul. 4, 2013.

(51) Int. Cl.
*H02H 5/04* (2006.01)
*G01K 3/00* (2006.01)

(52) U.S. Cl.
CPC .............. *H02H 5/042* (2013.01); *G01K 3/005* (2013.01)

(58) Field of Classification Search
CPC .............................. H02H 5/042; G01K 3/005
See application file for complete search history.

(56) References Cited

U.S. PATENT DOCUMENTS

| | | | | |
|---|---|---|---|---|
| 4,006,958 A | * | 2/1977 | Kramer | H01R 13/633 439/450 |
| 4,339,690 A | * | 7/1982 | Regan | H05B 41/2325 315/101 |
| 5,992,366 A | * | 11/1999 | Krueger | F02N 11/087 123/179.3 |
| 2009/0251832 A1 | * | 10/2009 | Brugner | H01R 13/6683 361/42 |

* cited by examiner

*Primary Examiner* — Thienvu Tran
*Assistant Examiner* — Tien Mai
(74) *Attorney, Agent, or Firm* — K. P. Correll & Associates, LLC

(57) ABSTRACT

A power cord apparatus for remotely detecting excessive operational parameters in an alternating current (AC) powered machine (e.g., dehumidifiers, air conditioners, refrigerators, and Computer Numerically Controlled (CNC) machines) is provided. The power cord apparatus includes a cooperative remote parametric sensing device (e.g., heat sensing, vibration transducer) in the vicinity of the electrically powered machine.

10 Claims, 51 Drawing Sheets

Notes:
1. All RESISTORS SMT 1206 1/4W 1% TOL.
2. ALL CAPACITORS SMT 10% TOL.
3. D1/D2 RATED AT 150C AND LOW REVERSE LEAKAGE CURRENT
4. R3 MUST BE RATED AT 150C TOLERANCE

POWER CORD APPARATUS FOR REMOTELY DETECTING EXCESSIVE OPERATIONAL PARAMETERS IN AN ELECTRICALLY POWERED MACHINE

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

1. U.S. provisional patent application 61/842,998, entitled "A Power Cord Apparatus for Remotely Detecting Excessive Operational Parameters in an Electrically Powered Machine", naming Victor V. Aromin as inventor, filed 4 Jul. 2013.

FIELD OF USE

The present invention relates generally to electrical safety devices and more particularly to power cords having parametric sensing capability and a subsequent capability to disconnect power when a predetermined parameter threshold is exceeded.

DESCRIPTION OF PRIOR ART (BACKGROUND)

Conventional electrical capital producing machines, such as computer numerically controlled (CNC) machines, lathes, and other shop machines, typically receive alternating current (AC) power from a power supply, such as an electrical outlet, through a pair of conducting lines. The pair of conducting lines, often referred to as the line and neutral conductors, enable the electrical appliance, or load, to receive the current necessary to operate.

However, fire is a very valid concern in any machining facility. Fires occurring in machines running oil-based coolant can cause significant damage in seconds and potentially spread throughout the facility causing extensive damage. Even in the presence of operators, machines have been completely destroyed.

Fire protection of CNC and other machine tools is critically important as there is a great risk of fire in these valuable machines. Fires can quickly cause expensive down time, costly repairs, possible human injury and damage to plant and equipment. The number of CNC machines throughout the world has grown dramatically as they have become established as state-of-the-art equipment for milling, drilling, grinding, tapping, honing, turning and other operations critical to manufacturing. These machines can cost up to $300,000 each, and are designed to run in a demanding, often grueling work environment. Fires in CNC machines are commonplace. Using oil-based coolants, typically combustible petroleum or mineral oil, flash fires are reported as a "fireball" when oil mist is ignited. These machine fires can be catastrophic to the operator and result in significant downtime and expensive property damage.

In other environments, appliances such as, for example, dehumidifiers, refrigerators, air conditioners, and the like, can overheat to the point of causing a fire if AC power is continued to be applied after a mechanical failure, e.g., refrigerant leakage.

Typical fire suppressant systems detect a fire after it has started and release a fire-suppressant agent, such as, for example, $CO_2$. However, these typical fire suppressant systems operate after the fire has started and do not disconnect the power from the burning machine. In other words, the machine is still electrically hot during the fire and even after the fire is suppressed. Thus, posing a potentially life threatening hazard to the operator as well as continuing to reignite the fire.

Oftentimes vibration measurement is used as a tool to determine the condition of different types of production machinery. Vibration measurement is used on equipment that has rotating parts, for example, pumps, turbines and fans and is often used in predictive maintenance programs. Moreover, excessive vibrations are often prelude to a catastrophic mechanical failure and/or fire.

In other environments where compressors are employed, such as in air conditioners or dehumidifiers there is also a risk of fire if the compressor malfunctions, leaks refrigerant, or is otherwise operated incorrectly. In these situations a compressor may overheat to the point where electrical insulation begins to deteriorate leading to electrical arcing between wires and/or other conductive surfaces. Often times this leads to a catastrophic fire. Traditional arc detector circuits typically detect arcing after arcing has begun which may not provide sufficient protection.

Thus, there exists a need for an apparatus that can sense a potentially dangerous condition and interrupt AC power to the machine and provide a warning early in the breakdown process.

SUMMARY OF THE INVENTION

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

In accordance with one embodiment of the present invention a power cord apparatus for remotely detecting excessive operational parameters in an AC powered machine (e.g., humidifiers, air conditioners, CNC machines, lathes, milling machines) is provided. The power cord apparatus includes a cooperative remote parametric sensing device (e.g., heat sensing, vibration transducer). A shielded power cable connectable between the parametric sensing device and the controller includes at least one insulated line voltage wire connectable to the apparatus and an electrical ground wire connectable between the controller and the apparatus.

The invention is also directed towards an alternating current (AC) power cord apparatus for remotely detecting excessive operational parameters via at least one remote parametric sensing device. The apparatus includes at least one remote parametric sensing device comprising one or more thermistors. The apparatus also includes a controller having an interrupter circuit. The interrupter circuit includes a manually latched ganged switch and a solenoid for electronically de-latching the manually latched ganged switch. Also included is a local sensing circuit for sensing, via the parametric current sense path, excessive operational parameters detected by the at least one remote parametric sensing device and a solid state switching control circuit for triggering the interrupter circuit in response to a control signal from the local sensing circuit. The apparatus also includes a controller test switch for testing the control circuit and a reset button press connectable to the manually latched ganged switch and a test button press connectable to the controller test switch. A shielded power cable connectable between the parametric sensing device and the controller includes at least one insulated line voltage wire connectable to the apparatus; and an electrical ground wire connectable between the controller and the apparatus; and a parametric current sense path connectable between the at least one remote parametric sensing device and the controller. The parametric current sense path may be a dedicated wire connectable to a remote Negative Temperature Coefficient (NTC) or Positive Temperature Coefficient (PTC) thermistors or other parametric sensing devices, or in alternate embodiments, the parametric current sense path may be a cord conductive shielded power cable.

In accordance with another embodiment of the present invention an alternating current (AC) power cord apparatus for remotely detecting excessive operational parameters via at least one remote parametric sensing device is provided. The apparatus includes at least one negative temperature coefficient (NTC) thermistor and/or vibration sensor. The apparatus also includes a controller with a control circuit including an interrupter circuit. The interrupter circuit further includes a manually latched ganged switch and a solenoid for electronically de-latching the manually latched ganged switch. The solenoid is electronically de-latched by a solid state switching control circuit when the solid state switching control circuit is responsive to excessive operational parameters detected by the remote parametric sensing device via a local sensing circuit. The controller comprises also comprises an upper housing adaptable to fit snugly within the palm of a hand to facilitate secure gripping; and a lower housing, mateable with the upper housing, wherein the lower housing comprises a plurality of gripping surfaces.

The invention is also directed towards an alternating current (AC) power cord apparatus, connectable via a manual latched relay to an AC power Mains source having hot and neutral lines, and a device. The device may be any suitable device such as, for example a dehumidifier or air conditioner having a compressor. The power cord includes a conductive shield, a ground wire, a neutral wire for connecting to the neutral line, a line wire for connecting to the hot line The power cord includes a remote temperature detection sensor assembly having at least one PTC thermistor for changing electrical resistance in response to a change in temperature, wherein changing electrical resistance corresponds to changing voltage drop across the thermistor. The remote temperature assembly is connectable to the conductive shield via a sensor wire, an L-sensor wire connectable to the line wire, and an N-sensor wire connectable to the neutral wire. The power cord also includes a rectifier for rectifying AC Mains input voltage, wherein the rectifier comprises a bridge rectifier. A sensing circuit connectable to the remote temperature sensor and the rectifier senses excess temperature and trips a tripping circuit for delatching a manually latched relay in response to a fault condition or excessive device temperatures. The power cord also includes a voltage compensation circuit for balancing bias voltages in the sensing circuit, wherein the voltage compensation circuit is connectable to the rectifier and the sensing circuit.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the power cord apparatus, and may be included in more than one embodiment of the power cord apparatus (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Figure 1:
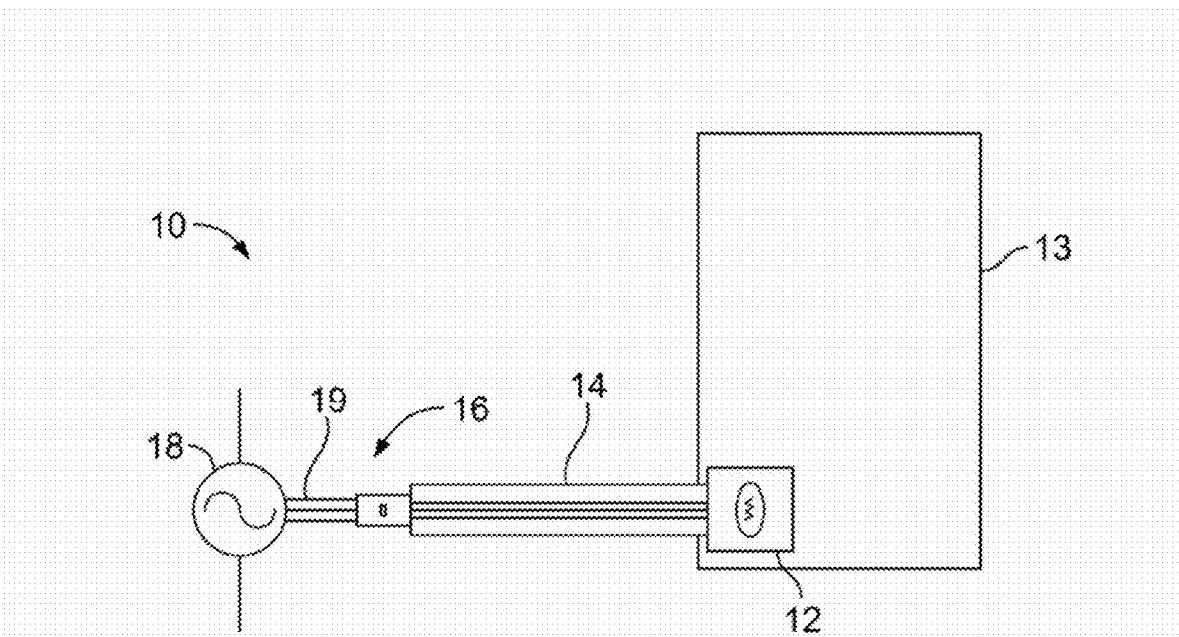
FIG. 1 is a pictorial illustration of the power cord apparatus for powering and remotely detecting excessive operational parameters in an electrically powered machine.

Referring now to the drawings and more particularly to FIG. 1, there is shown a pictorial illustration of the power cord apparatus 10 of the power cord apparatus for remotely detecting excessive operational parameters in an electrically powered machine 13. The power cord apparatus 10 includes a parametric sensing device 12, a connecting cable 14, a controller 16, and a plug 19. Connecting cable 14 may be any suitable power cable such as, for example, a shielded cable or a 4 wire cable. It will be understood that excessive operational parameters detected by parametric sensing device(s) 12 may be any suitable operational parameter such as, for example, ambient heat or machine vibration. It will also be understood that electrically powered machine 13 may be any suitable machine such as, for example, an air conditioner, dehumidifier, heat pump, or a computer-numerically-controlled (CNC) machine. In addition power source 18 may be any suitable power source such as, for example, single or poly-phase alternating current.

Figure 1A:
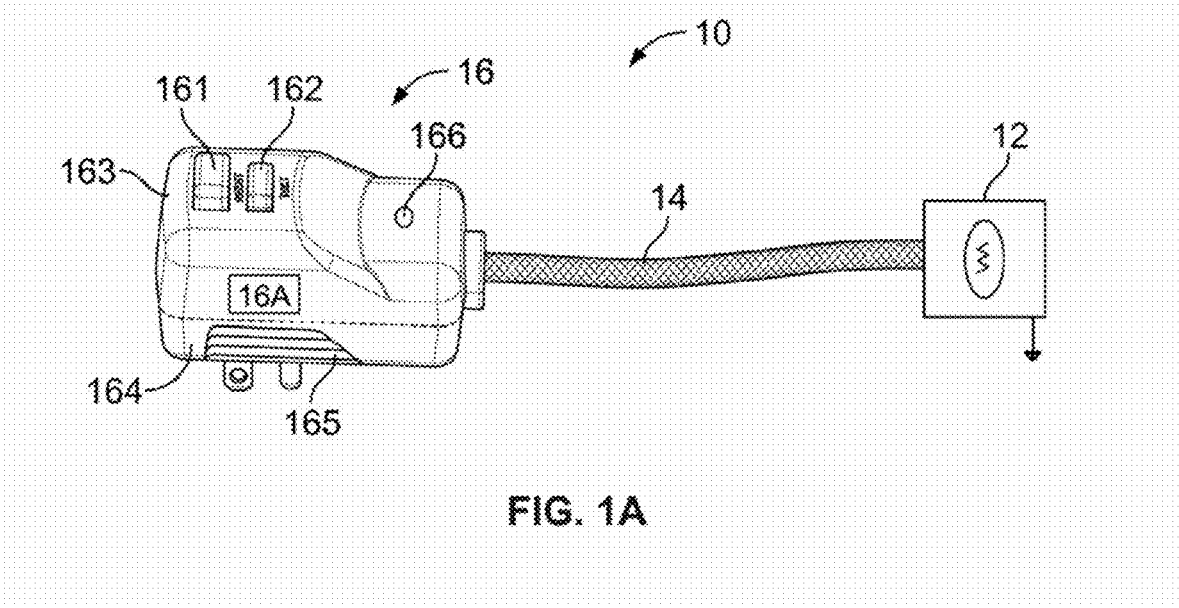
FIG. 1A is a pictorial illustration of the power cord apparatus in which the present invention is implemented.

Referring also to FIG. 1A there is shown a pictorial illustration of the power cord apparatus 10 of the present invention. As described earlier, the power cord apparatus 10 includes a remote parametric sensing device 12, a connecting cable 14, a controller 16, and a plug 19. Connecting cable 14 may be any suitable power cable such as, for example, a shielded cable or a 4 wire cable. It will be understood that excessive operational parameters detected by parametric sensing device(s) 12 may be any suitable operational parameter such as, for example, ambient heat or machine vibration. Furthermore, controller 16 circuitry includes reset button 161 and test button 162 for testing and resetting, respectively, the controller 16 on/off response to detecting an excessive operational parameter. In addition, controller 16 may include a three-port (shown in FIGS. 2-25) for mating with a single or poly-phase power source.

Figure 1B:
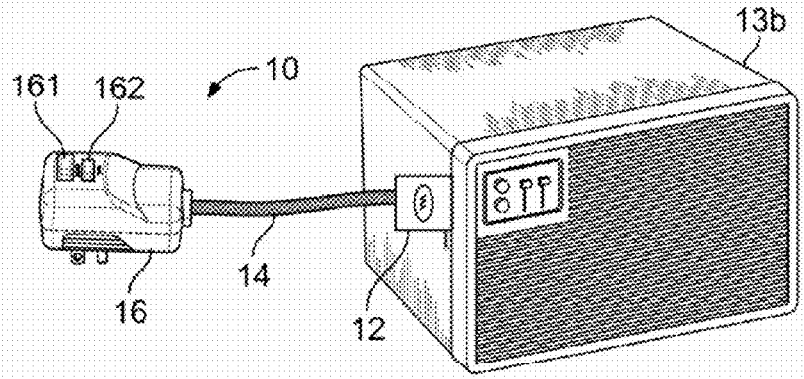
FIG. 1B is a pictorial illustration of the power cord apparatus for powering and remotely detecting excessive operational parameters in an electrically powered machine such as, for example, an air conditioner.

Referring also to FIG. 1B there is shown a pictorial illustration of the power cord apparatus 10 of the present invention for remotely detecting excessive operational parameters in, for example, an electrically powered air conditioning appliance 13B. As before, the power cord apparatus 10 includes a parametric sensing device 12, a connecting cable 14, a controller 16, and a plug 19. Controller 16 includes upper 163 and lower 164 mateable housings for containing controller circuitry 16A discussed herein. Upper mateable housing 163 may be adaptable to fit snugly and comfortably within the palm of a hand. Lower mateable housing includes a plurality of gripping surfaces 165 on either side of the lower mateable housing 164. Connecting cable 14 may be any suitable power cable such as, for example, a shielded cable or a 4 wire cable. Controller 16 includes reset button press 161 and test button press 162 for testing and resetting, respectively, the controller circuitry 16A on/off response to detecting an excessive operational parameter within the appliance 13B. Reset button 161 and test button 162 may be color coded to indicate normal on conditions or hazard off conditions. In alternate embodiments the controller 16 may include one or more light emitting diodes (LEDs) 166 to indicate normal on conditions or hazard off conditions.

It will be understood that excessive operational parameters detected by remote parametric sensing device(s) 12 may be any suitable operational parameter such as, for example, ambient heat or machine vibration. For example, ambient heat rise beyond a predetermined threshold may be detected by parametric sensing device 12 which in turn signals controller 16 to remove power from the appliance 13B.

Figure 1C:
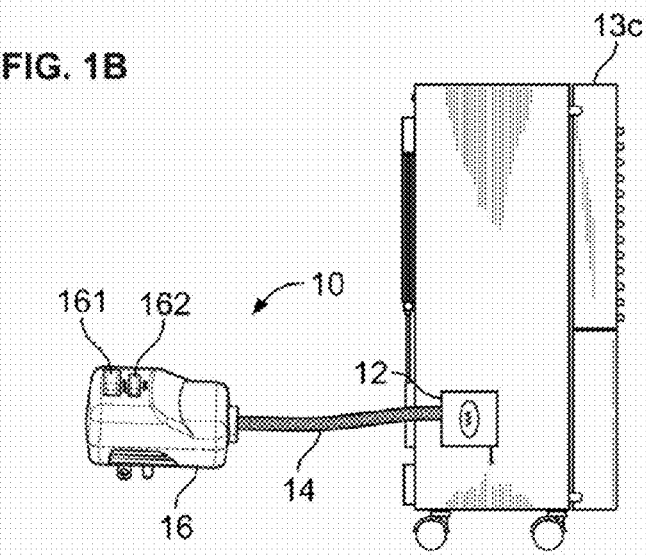
FIG. 1C is a pictorial illustration of the power cord apparatus for powering and remotely detecting excessive operational parameters in an electrically powered machine such as, for example, dehumidifier.

Referring also to FIG. 1C there is shown a pictorial illustration of the power cord apparatus 10 of the present invention for remotely detecting excessive operational parameters in, for example, an electrically powered air conditioning appliance 13C. As before, the power cord apparatus 10 includes a parametric sensing device 12, a connecting cable 14, a controller 16, and a plug 19. Connecting cable 14 may be any suitable power cable such as, for example, a shielded cable or a 4 wire cable. Controller 16 includes controller circuitry 16A and also includes reset button 161 and test button 162 for testing and resetting, respectively, the controller 16 on/off response to detecting an excessive operational parameter within the appliance 13B. It will be understood that excessive operational parameters detected by parametric sensing device(s) 12 may be any suitable operational parameter such as, for example, ambient heat or machine vibration. For example, ambient heat rise beyond a predetermined threshold may be detected by parametric sensing device 12 which in turn signals controller 16 to remove power from the appliance 13C.

Figure 1D:
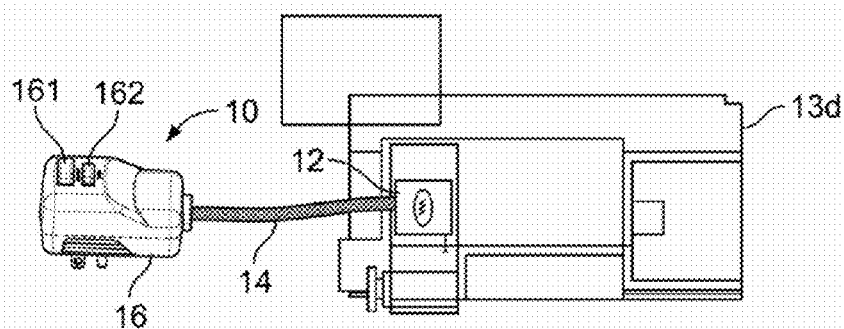
FIG. 1D is a pictorial illustration of the power cord apparatus for powering and remotely detecting excessive operational parameters in an electrically powered machine such as, for example, a Computer Numerical Control Machine (CNC)
Figure 1E:
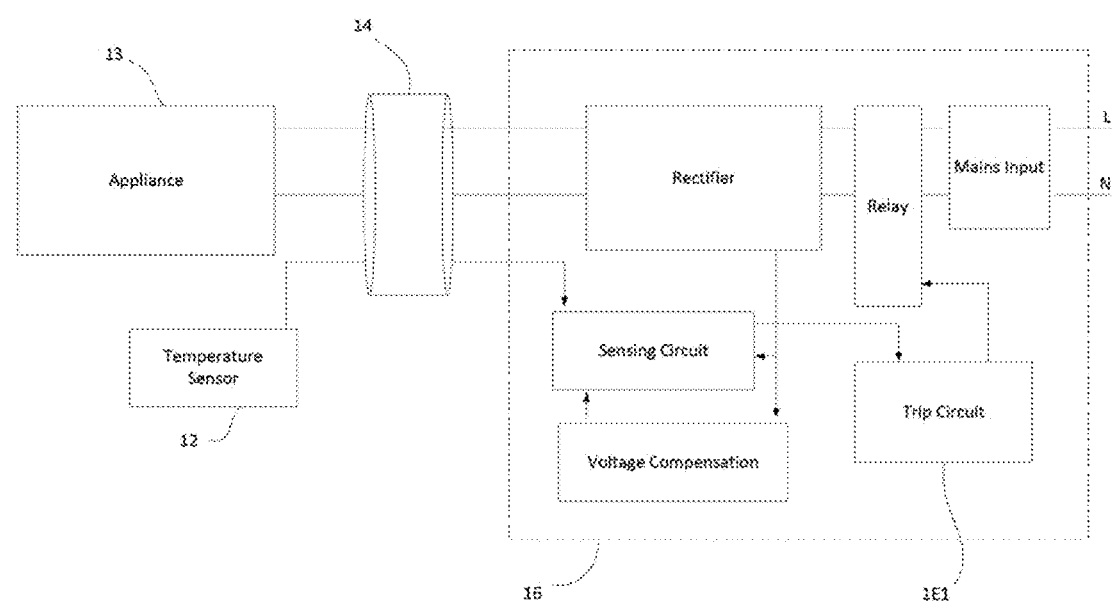
FIG. 1E is a block diagram of the power cord apparatus for powering and remotely detecting excessive operational parameters in an electrically powered machine in accordance with the power cord apparatus shown in FIGS. 1A-1D.

Referring also to FIG. 1D there is shown a pictorial illustration of the power cord apparatus 10 of the present invention for remotely detecting excessive operational parameters in, for example, a CNC machine 13D. It will be understood that power cord apparatus may be used to power and detect excessive operational parameters in any suitable machine or appliance.

Figure 2:
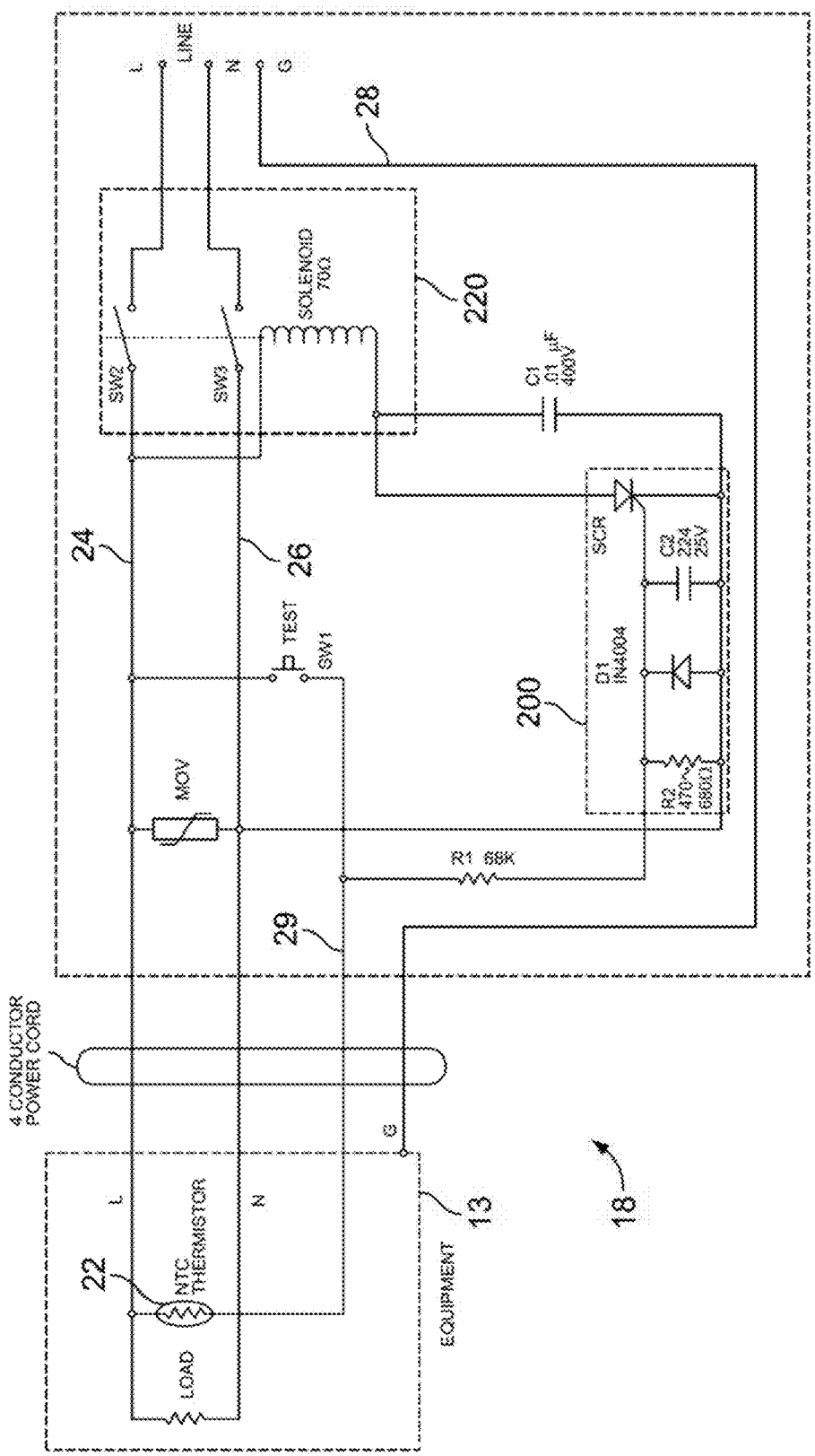
FIGS. 2A, and 2-5 are schematic circuit diagrams of different embodiments of the 4-conductor power cord apparatus with a single solid state controller in accordance with the power cord apparatus shown in FIGS. 1A-1E.

Referring also to FIG. 2 there is shown a schematic circuit diagram 18 of a 4-conductor power cord apparatus 10 with a single solid state controller circuitry 16A in accordance with power cord apparatus shown in FIG. 1. Circuit 18 includes a line voltage conductor 24, a neutral conductor 26, a ground wire 28, and a conductor 29. Circuit 18 also includes a solid state switching control circuit 200 and a local sensing circuit comprising sensing resistor R1, an interrupter circuit 220, a capacitor C1, a test switch SW1, and a negative temperature coefficient (NTC) thermistor 22. It will be appreciated that the parametric sensing device 12 shown in FIGS. 1, 1A-1D includes NTC thermistor 22.

It will be further understood that the parametric sensing device 12 shown in FIGS. 1, 1A-1D may include any suitable parametric sensing device such as, for example, excessive vibration sensing, excessive cold, or any other operational condition not conducive to normal operating conditions.

Control circuit 200 comprises a solid state switching control circuit and includes the sensing resistor R1 connected in-line between the gate of a Silicon Controlled Rectifier (SCR) 201 and the NTC thermistor 22 via conductor 29. Resistor R1 limits the current applied to the gate of the SCR 201. The control circuit 200 includes a parallel network comprising resistor R2, capacitor C2 and diode D1 connected between the gate and cathode terminals of the SCR. These components provide a measure of noise immunity and protection against damage across the gate to cathode junction of the SCR. The anode terminal of the SCR is operatively connected to electrical conductor 24 through coil L1.

Interrupter circuit 220 comprises an electrical circuit for interrupting the flow of current and includes an energizing coil L1, a first switch SW2 connected in-line with conductor 24 and a second switch SW3 in-line with conductor 26. In operation switches SW2 and SW3 are mechanically latched closed thus applying line voltage to the load 32 via conductors 24 and 26.

Switches SW2 and SW3 are mechanically latched closed by depressing button 161 (FIGS. 1A-1D). In normal operation current is not flowing through energizing coil L1. When an excessive operational parameter is detected by parametric sensing device 12 (FIGS. 1A-1D) current flows through energizing coil L1 which in turn induces its magnetic field to move a plunger which unlatches SW2 and SW3 from the latched position to the hazard condition open position.

For normal operating conditions values for the NTC thermistor 22, sensing resistor R1, and resistor R2 are selected for desired sensitivity to parametric deviation. For example, the values may be selected such that minor changes in the ambient heat of the electrical machine 13 result in NTC thermistor 22 resistance drop, which in turn causes the SCR gate voltage to rise from its quiescence level to its switching level. In response thereto, the SCR switches from its normally non-conducting state to the hazard condition conducting state (i.e., current flows through the SCR anode-cathode junction), thereby providing a path for current to flow through energizing coil L1, causing switches SW2 and SW3 to switch from the normally closed position to the hazard condition open position; thus, operatively disconnecting the AC source from the electrical appliance or machine.

Figure 2A:
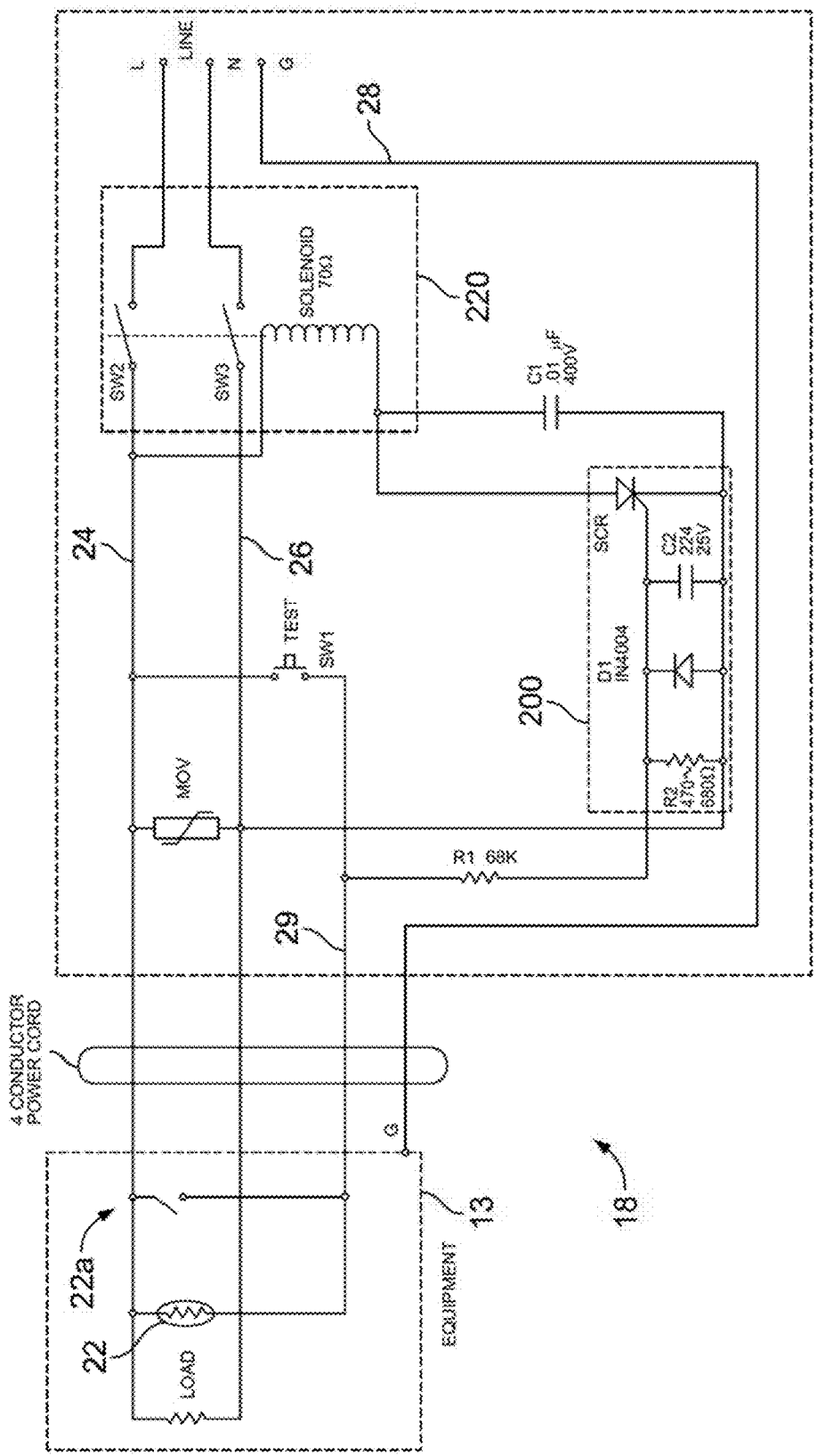

Referring also to FIG. 2A, it will be understood that any suitable parametric sensing device 12, such as, for example, a vibration sensor 22A, may be connected in-line between conductor 26 and conductor 29. The vibration sensor 22A, having normally open contacts, closes its contacts when a predetermined vibration level in machine 13 is sensed. With the vibration sensor contacts closed the SCR gate voltage rises from its quiescence level to its switching level as described earlier.

It will be appreciated that AC source power is also removed from the coil L1 when switches SW2 and SW3 switch from the normally closed position to the hazard condition open position. Thus, coil L1 is protected from an extended current flow which allows coil L1 to be a lower duty cycle rating thereby reducing coil L1 cost.

Still referring to FIG. 2, test switch SW1, connected between conductor 26 and conductor 29 operates when depressed, via button 162, to simulate a drop in the NTC thermistor resistance 22 which in turn triggers the SCR gate voltage as described above.

Figure 3:
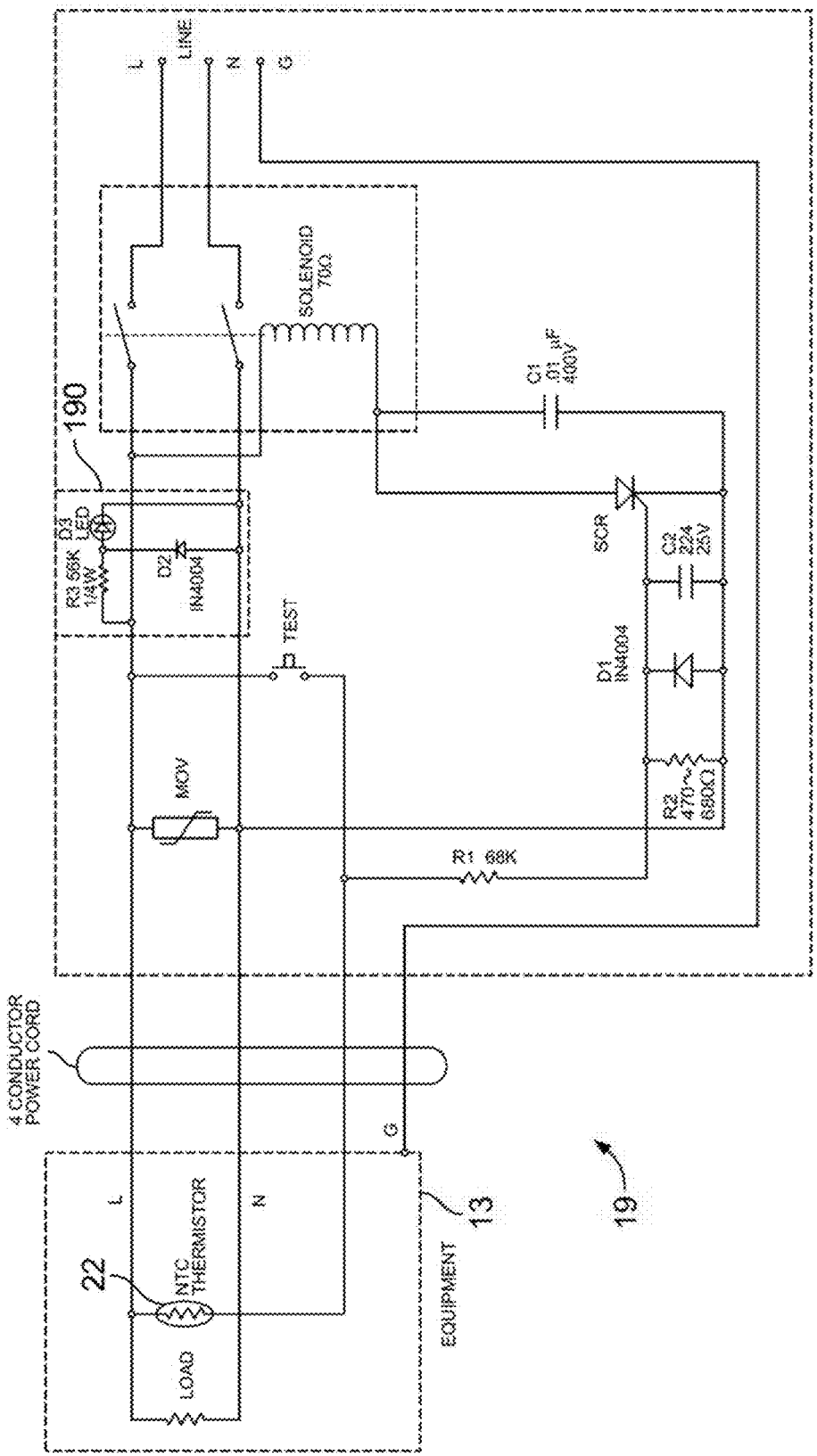

Referring also to FIG. 3 there is shown a schematic circuit 19 diagram of a 4-conductor power cord apparatus 10 with a single solid state controller circuitry 16A in accordance with power cord apparatus shown in FIG. 1. Circuit 19 is constructed and operates substantially similar to circuit 18.

(Circuit 19 includes an indicating circuit 190 which provides a means of visual indication that the circuit is operating. Indicating circuit 190 includes a silicon rectifier D2, a light emitting diode LED D3 and a current limiting resistor R3. Rectifier D2 is preferably an IN4004 rectifier and acts to convert the AC power of the line to DC power for diode LED D3. Diode LED D3 provides visual indication by means of a light that circuit 19 is operating. Resistor R3 is preferably 56K ohms and acts to limit the current which passes to diode LED D3.

It will be understood that indicating circuit 190 may be any suitable indicating circuit such as, for example, a blinking visual indicator, or for another example, a momentary buzzer indicating power has been applied when switches SW2 and SW3 are mechanically latched.

Figure 4:
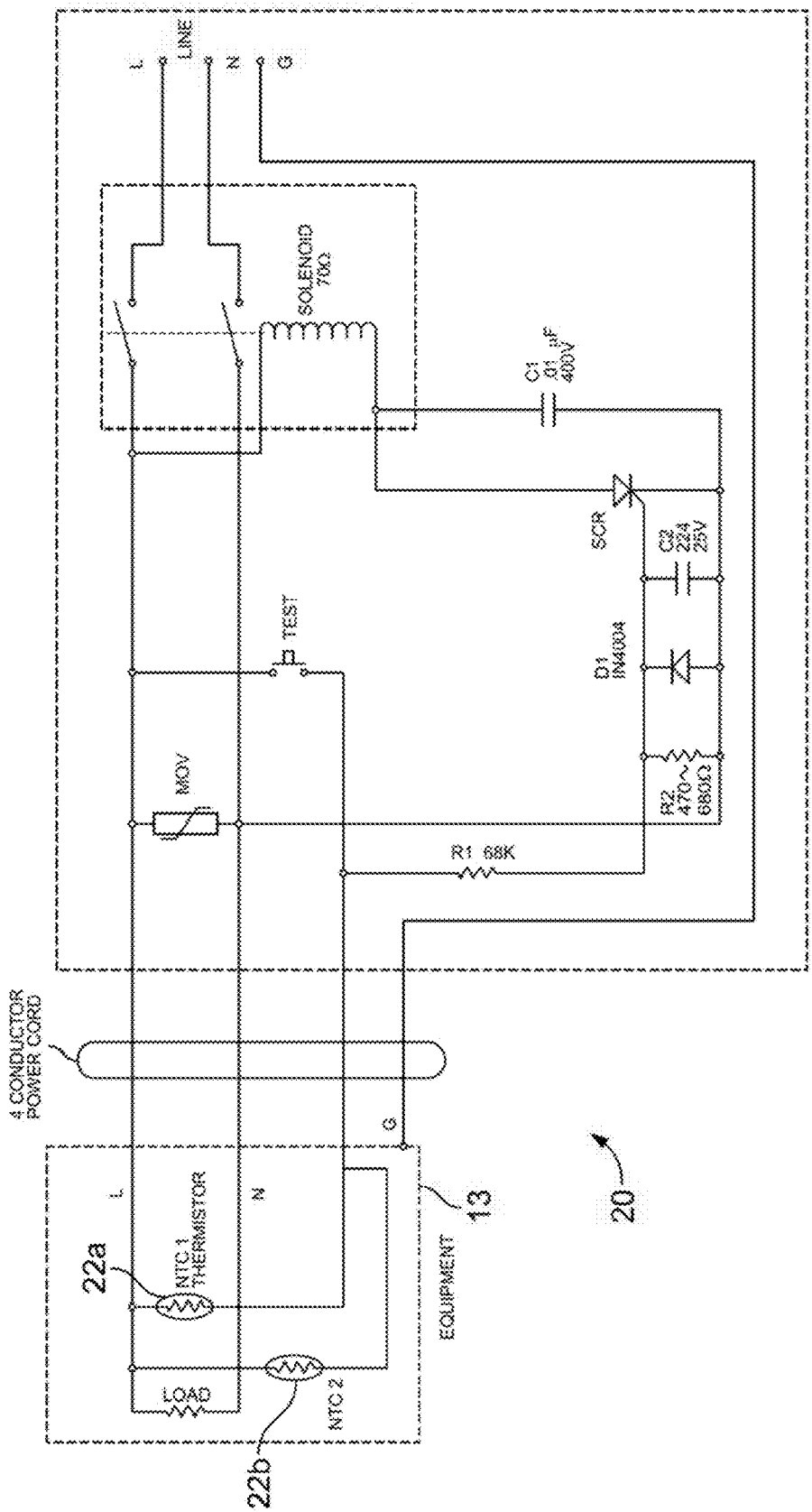

Referring also to FIG. 4 there is shown a schematic circuit 20 diagram of a 4-conductor power cord apparatus 10 with a single solid state controller circuitry 16A in accordance with power cord apparatus shown in FIG. 1. Circuit 20 is constructed and operates substantially similar to circuit 18.

Circuit 20 includes dual parametric sensing devices 22A and 22B connected in parallel across machine 13 load. Dual parametric sensing devices, or more, may be selected for different conditions in one or more areas of machine 13. For example, Parametric sensing device 22A may be a NTC thermistor located in a fire prone area of machine 13, while parametric sensing device 22B may also be a NTC thermistor located in a second fire prone area of machine 13. Similarly, parametric sensing device 22B could be any suitable parametric sensing device, such as, for example, a vibration sensing switch, a tilt sensor switch, or a tip over switch.

Figure 5:
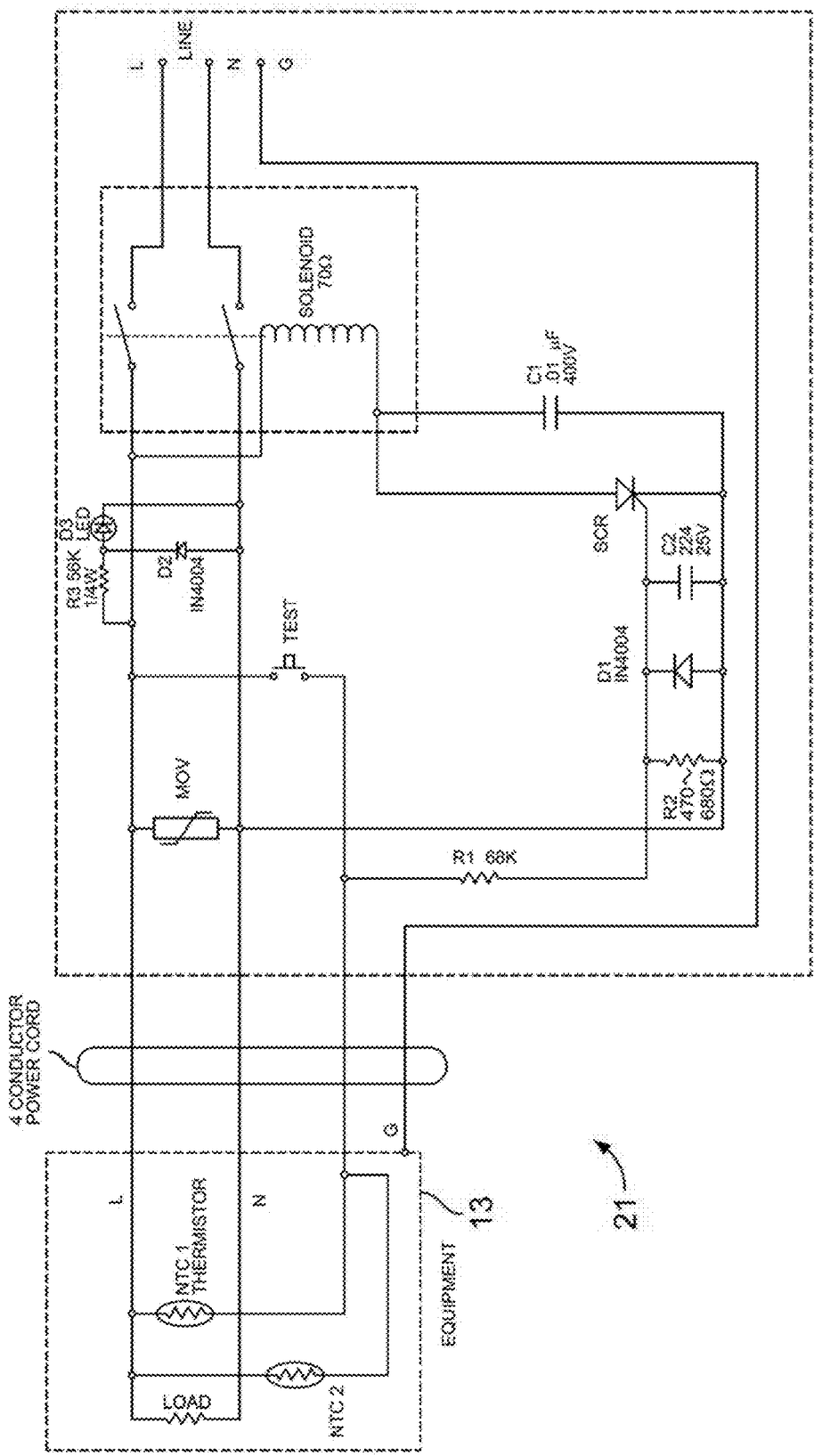

Referring also to FIG. 5 there is shown a schematic circuit 21 diagram of a 4-conductor power cord apparatus 10 with a single solid state controller circuitry in accordance with power cord apparatus shown in FIG. 1. Circuit 21 is constructed and operates substantially similar to circuits 18-20.

Figure 6:
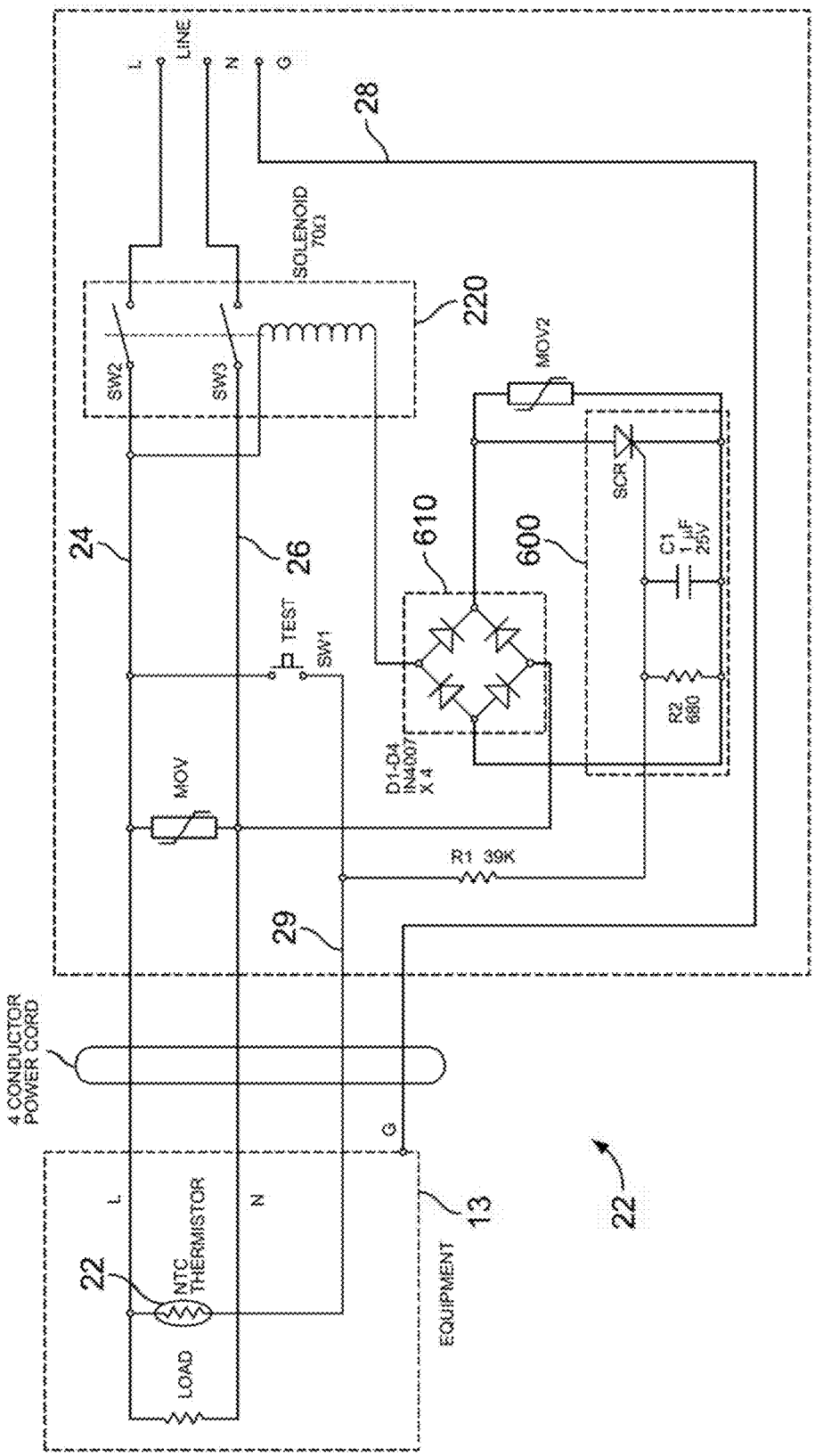
FIGS. 6-9 are schematic circuit diagrams of different embodiments of the 4-conductor power cord apparatus with a full wave rectifying bridge controller in accordance with the power cord apparatus shown in FIGS. 1A-1E.

Referring also to FIG. 6 there is shown a schematic circuit 22 diagram of the 4-conductor power cord apparatus 10 with controller circuitry 16A including a full wave rectifying bridge 610 and solid state controller 600 in accordance with power cord apparatus shown in FIG. 1.

Circuit 22 is constructed and operates substantially similar to circuit 18. However, Circuit 22 includes a full wave bridge rectifier 610 for rectifying AC line voltage from conductor 24. The full wave bridge rectifier enables a faster SCR transition to its conducting state since the SCR is forward biased independently of the line AC phase.

For normal operating conditions values for the NTC thermistor 22, sensing resistor R1, and R2 are selected, as before, for desired sensitivity to parametric deviation. In response to the NTC thermistor 22 sensing higher than normal heat, the SCR switches from its normally non-conducting state to the shock hazard condition conducting state (i.e., current flows through the SCR anode-cathode junction), thereby providing a path for current to flow through energizing coil L1, causing switches SW2 and SW3 to switch from the normally closed position to the shock hazard condition open position and thus operatively disconnecting the AC source from the electrical appliance.

Figure 7:
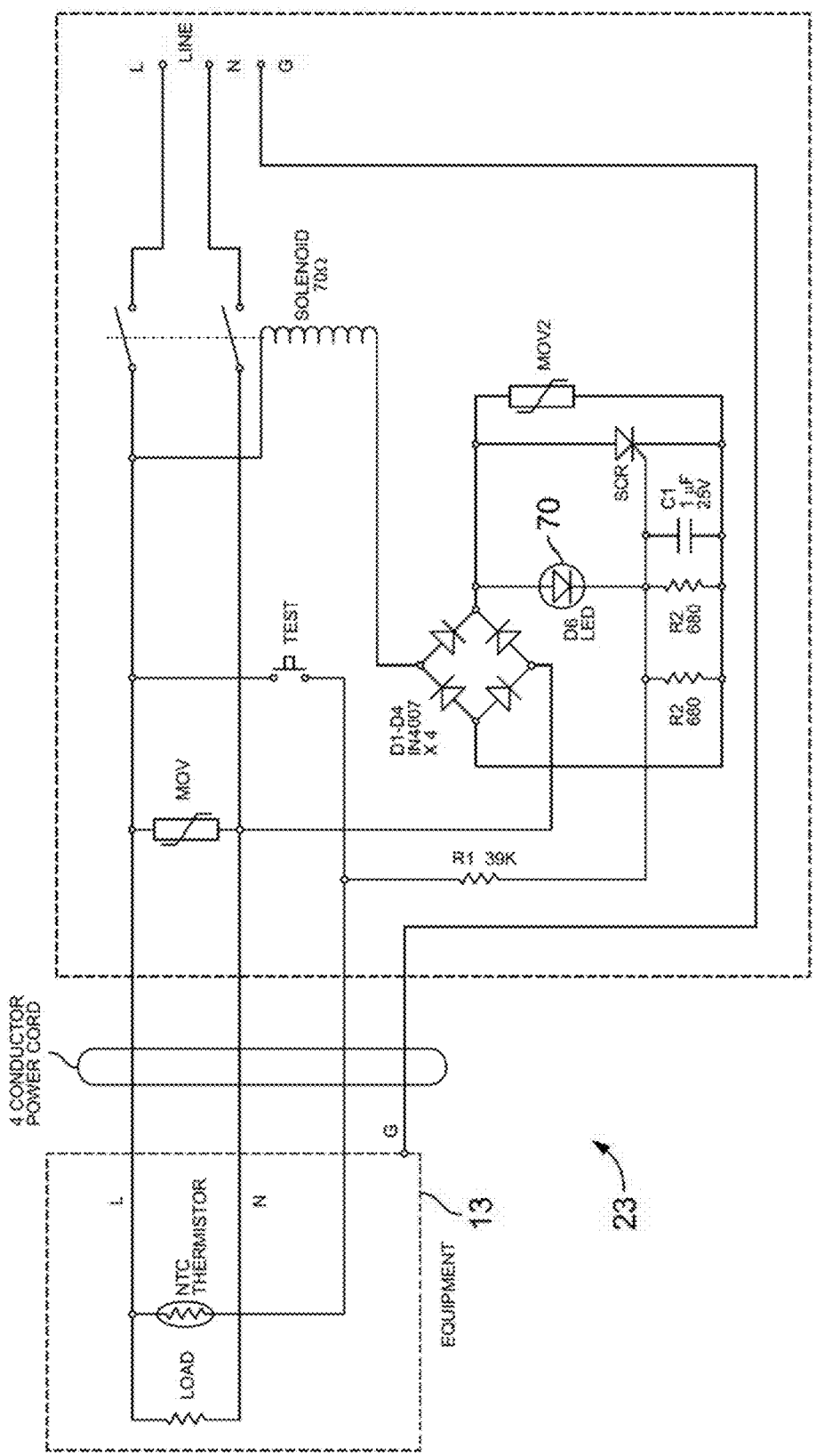

Referring also to FIG. 7, there is shown a schematic circuit 23 diagram of the 4-conductor power cord apparatus 10 with controller circuitry 16A including a full wave rectifying bridge 610 and solid state controller 600 in accordance with power cord apparatus shown in FIG. 1.

Circuit 23 is constructed and operates substantially similar to circuit 22. Circuit 23 includes an indicating circuit 70 which provides a means of visual indication that the circuit is operating. Indicating circuit 70 includes a light emitting diode LED D6 and a current limiting resistor R3. Diode LED D6 provides visual indication by means of a light that circuit 23 is operating. Resistor R3 is preferably 120K ohms and acts to limit the current which passes through diode LED D6.

It will be understood that indicating circuit 70 may be any suitable indicating circuit such as, for example, a blinking visual indicator, or for another example, a momentary buzzer indicating power has been applied when switches SW2 and SW3 are mechanically latched.

Figure 8:
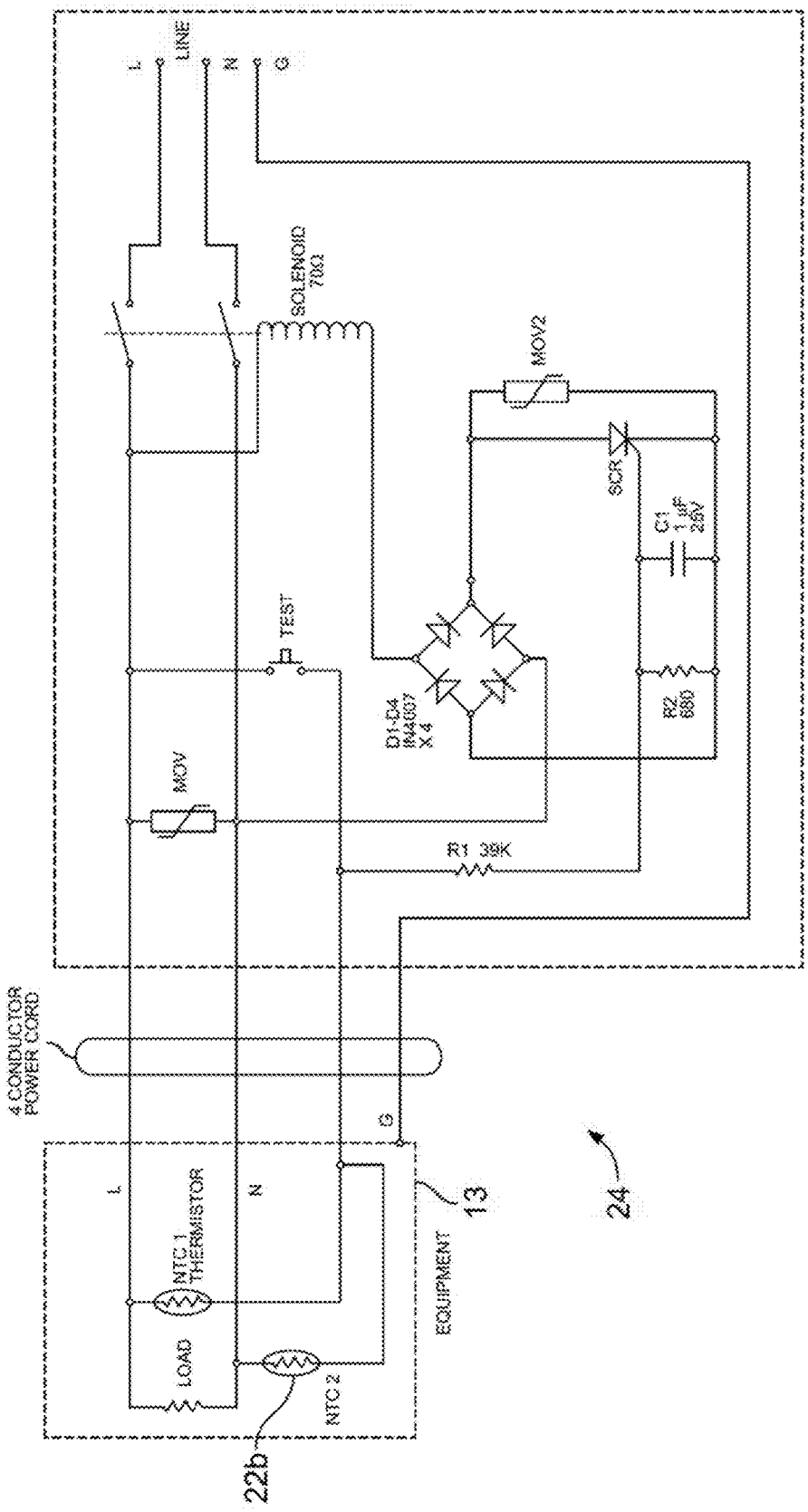

Referring also to FIG. 8, there is shown a schematic circuit 24 diagram of the 4-conductor power cord apparatus 10 with controller circuitry including a full wave rectifying bridge 610 and solid state controller 600 in accordance with power cord apparatus shown in FIG. 1. Circuit 24 is constructed and operates substantially similar to circuit 20 and circuit 22.

Figure 9:
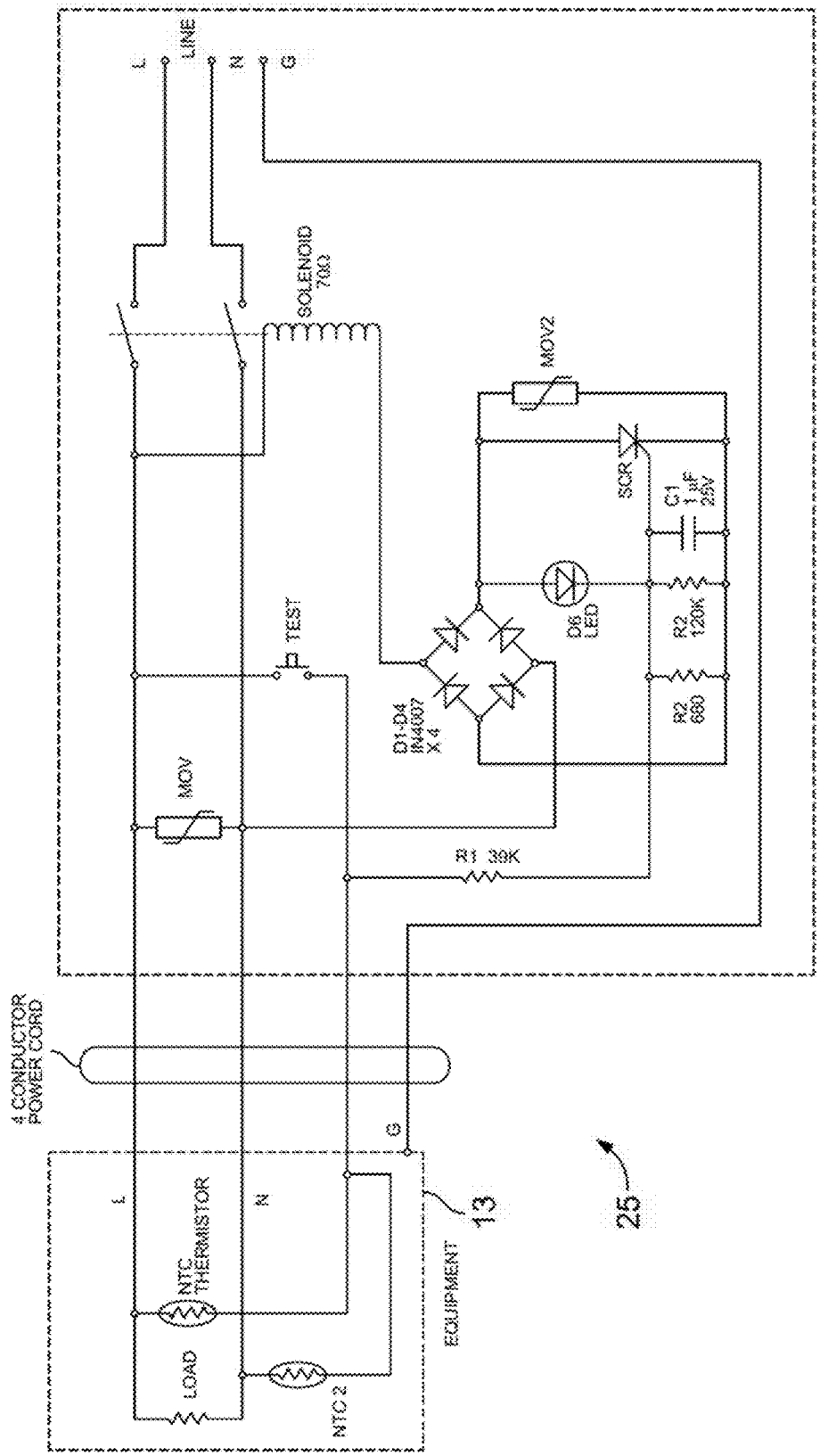

Referring also to FIG. 9, there is shown a schematic circuit 25 diagram of the 4-conductor power cord apparatus 10 with controller circuitry including a full wave rectifying bridge 610 and solid state controller 600 in accordance with power cord apparatus shown in FIG. 1. Circuit 24 is constructed and operates substantially similar to circuits 22-24.

Figure 10:
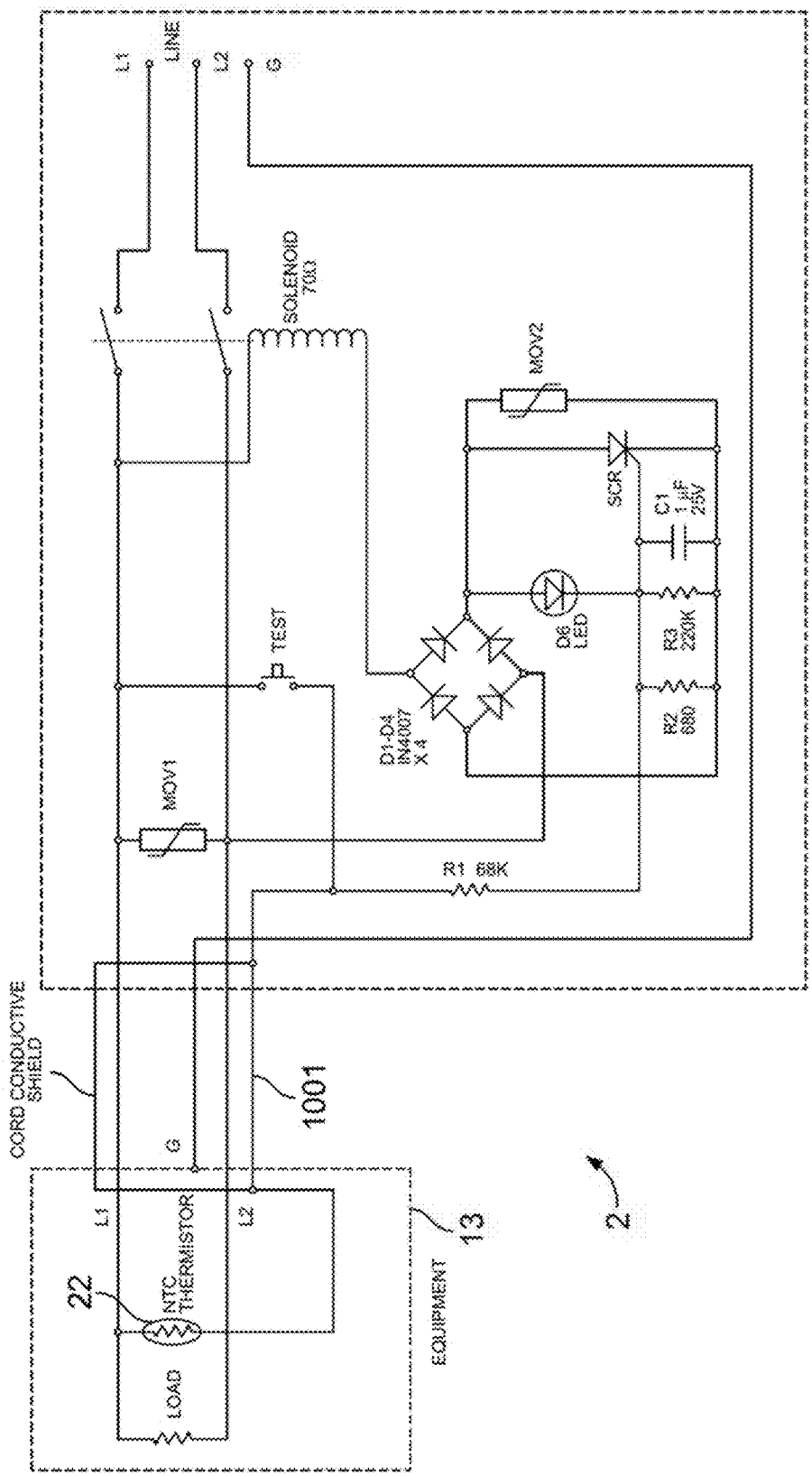
FIGS. 10-17 are schematic circuit diagrams of different embodiments of the conductive shield power cord apparatus with a full wave rectifying bridge controller in accordance with power cord apparatus shown in FIGS. 1A-1E.
Figure 11:
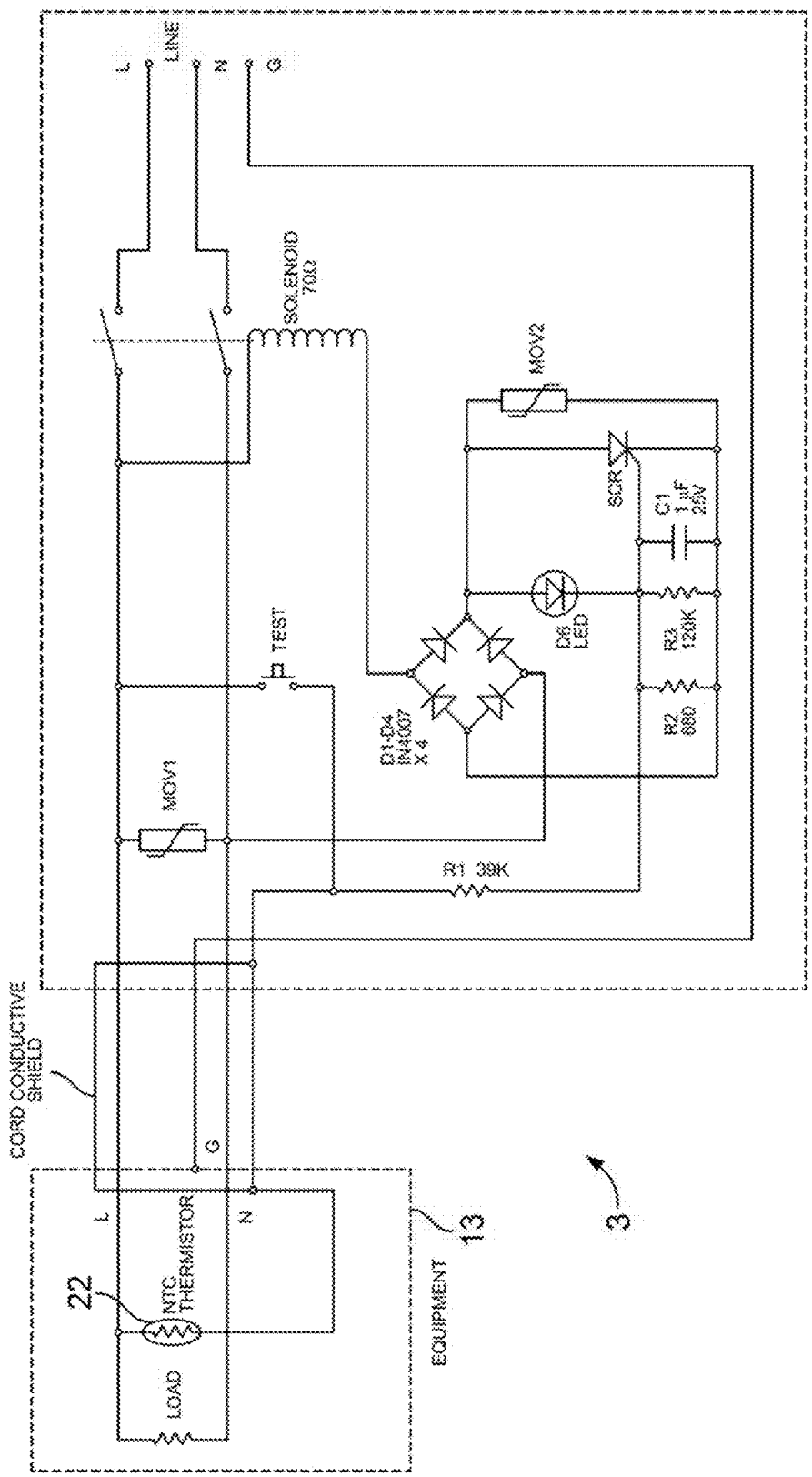
Figure 12:
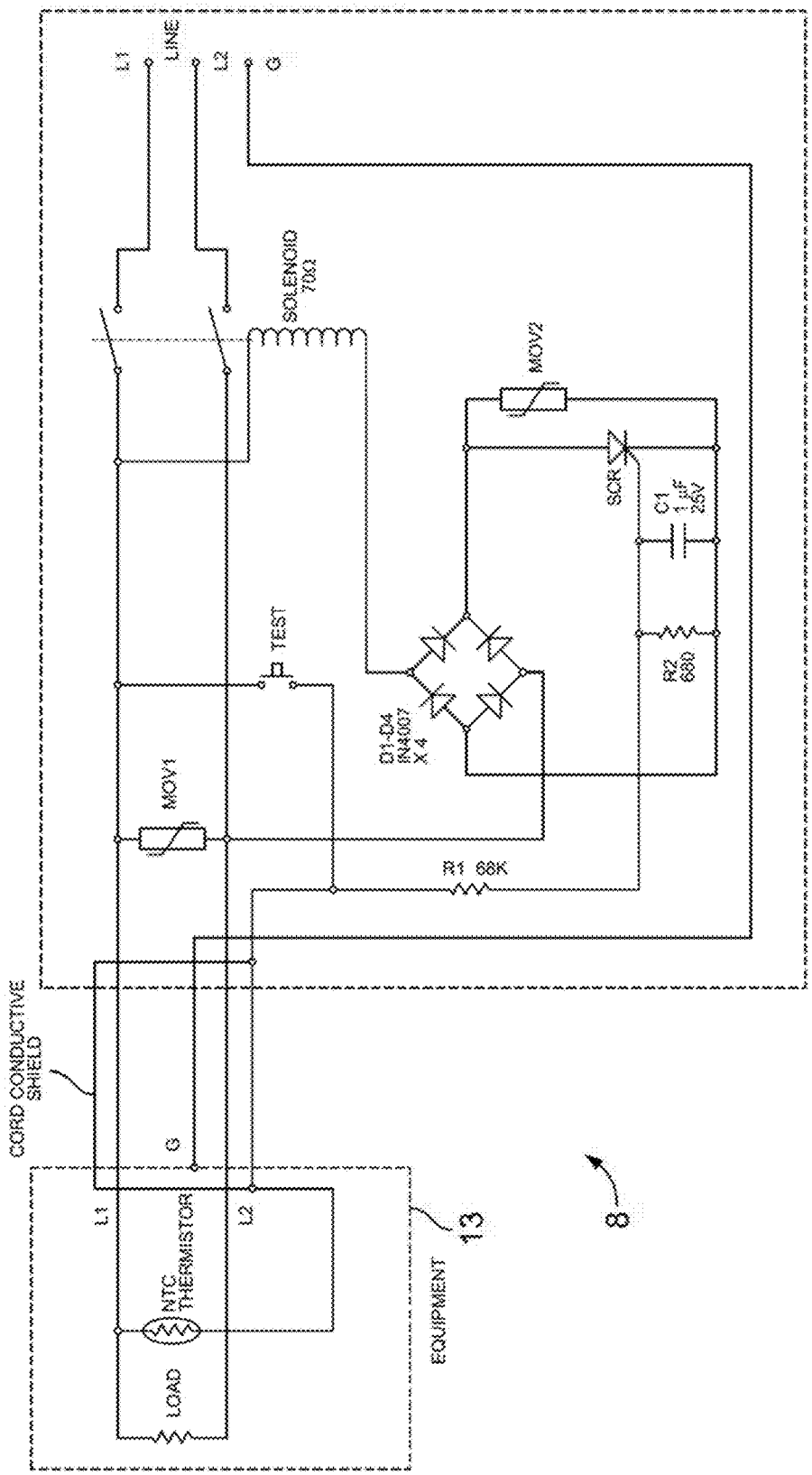
Figure 13:
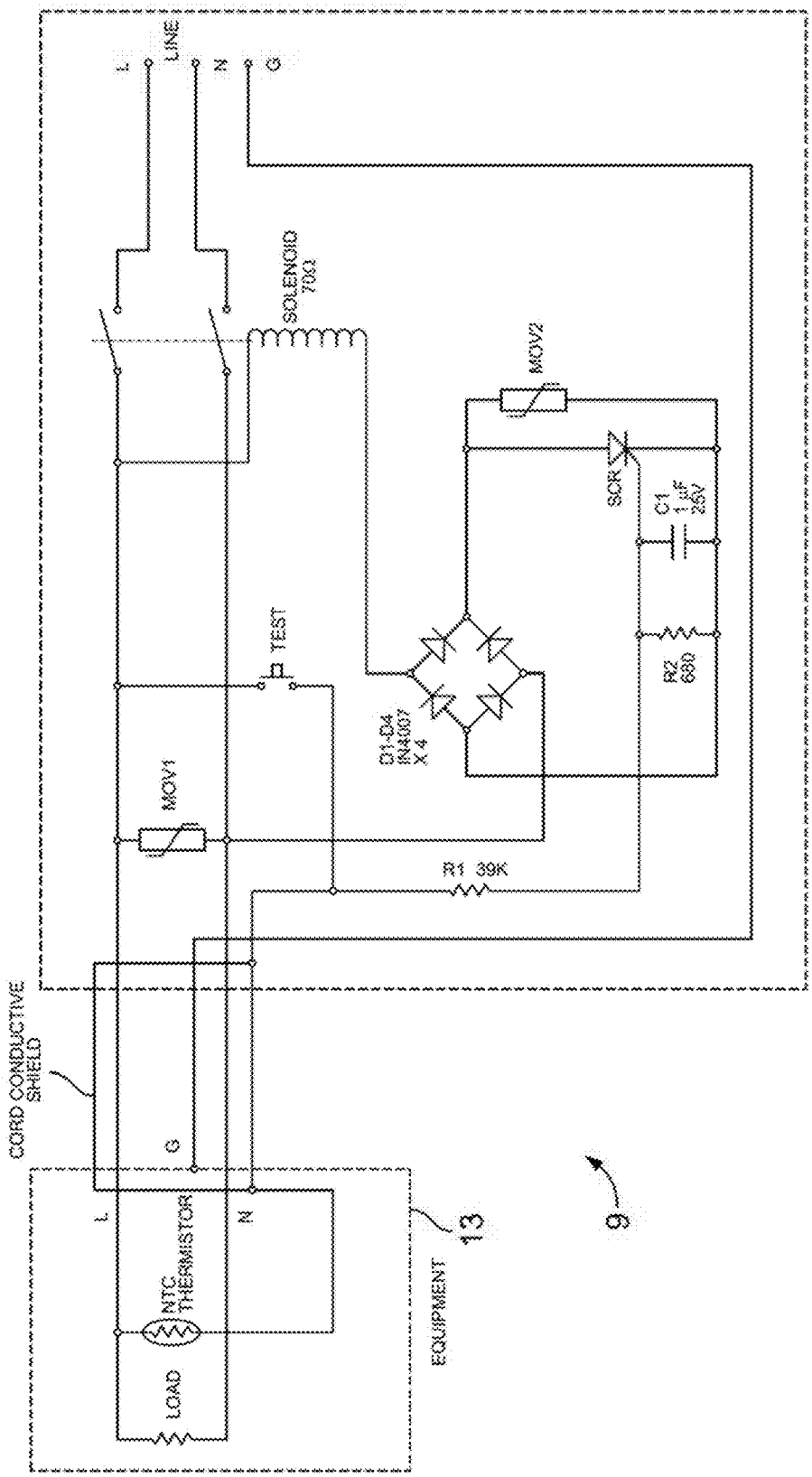
Figure 14:
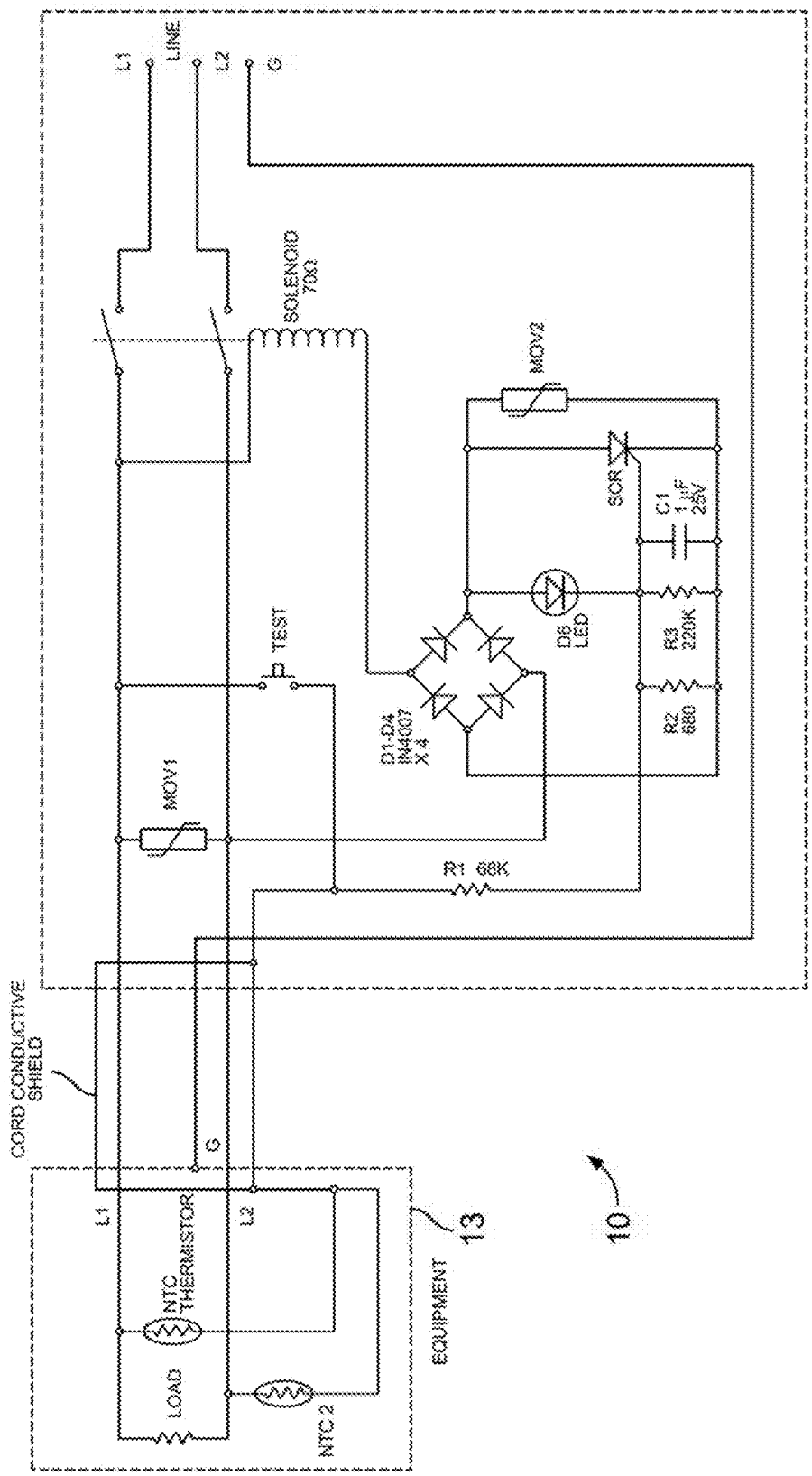
Figure 15:
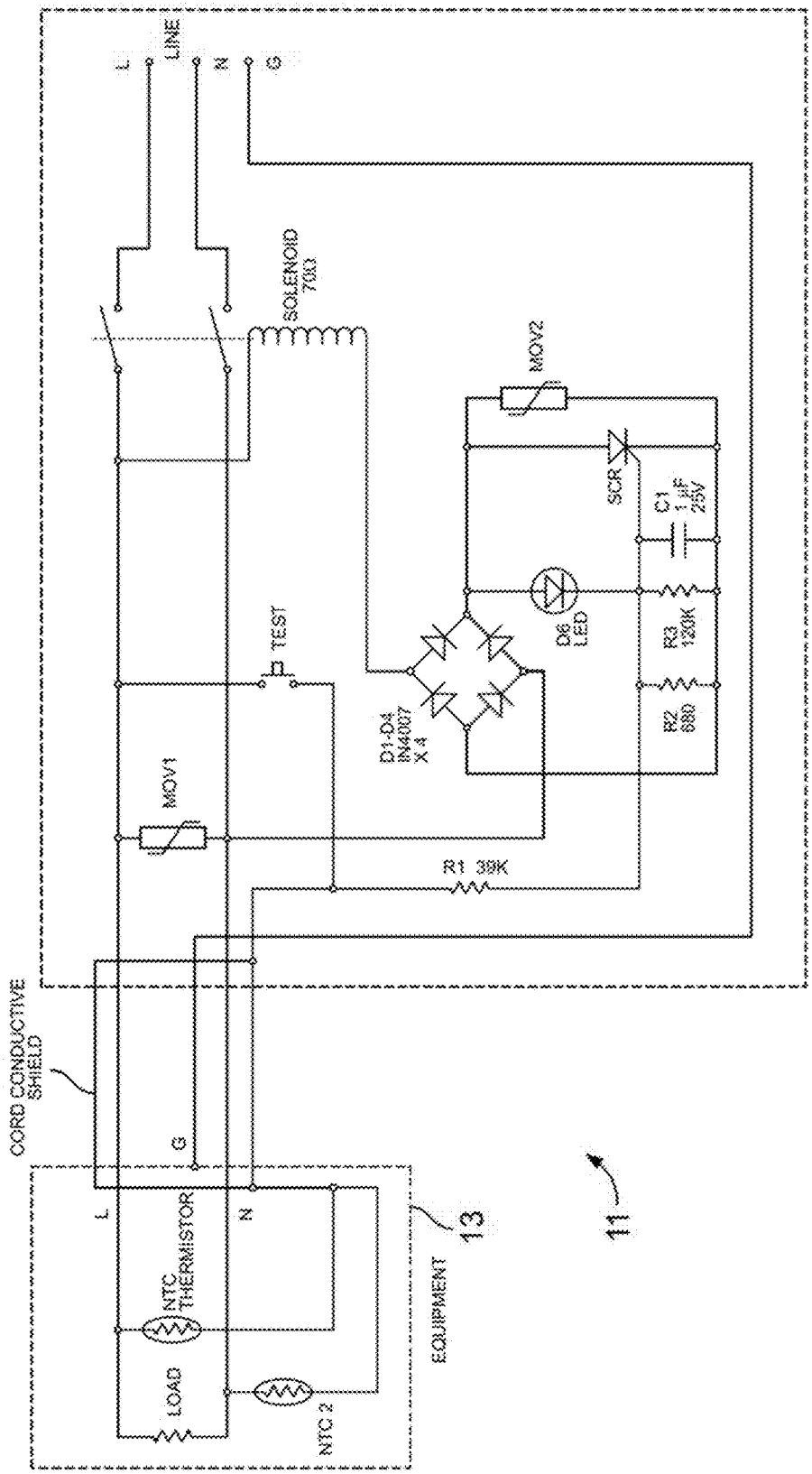
Figure 16:
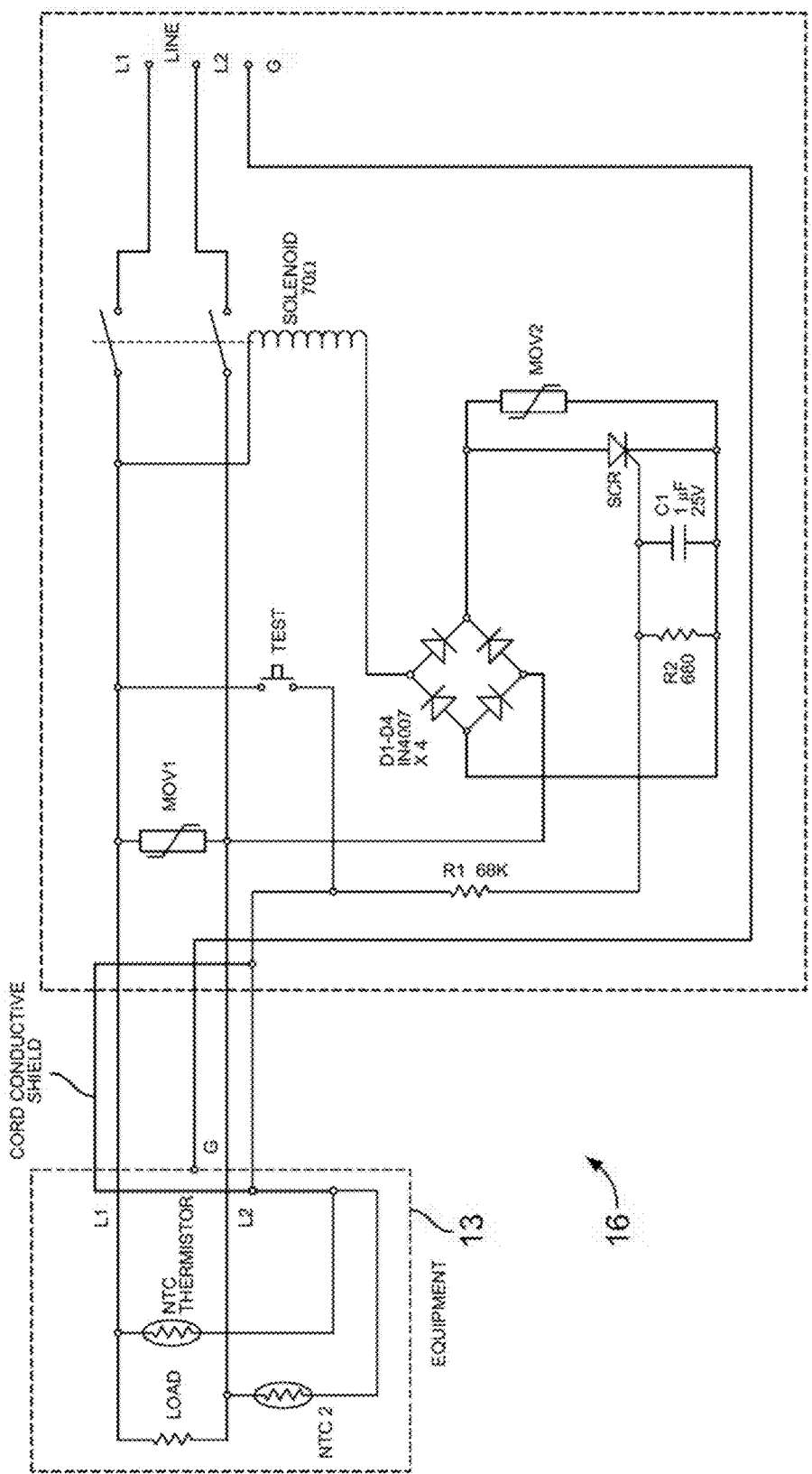
Figure 17:
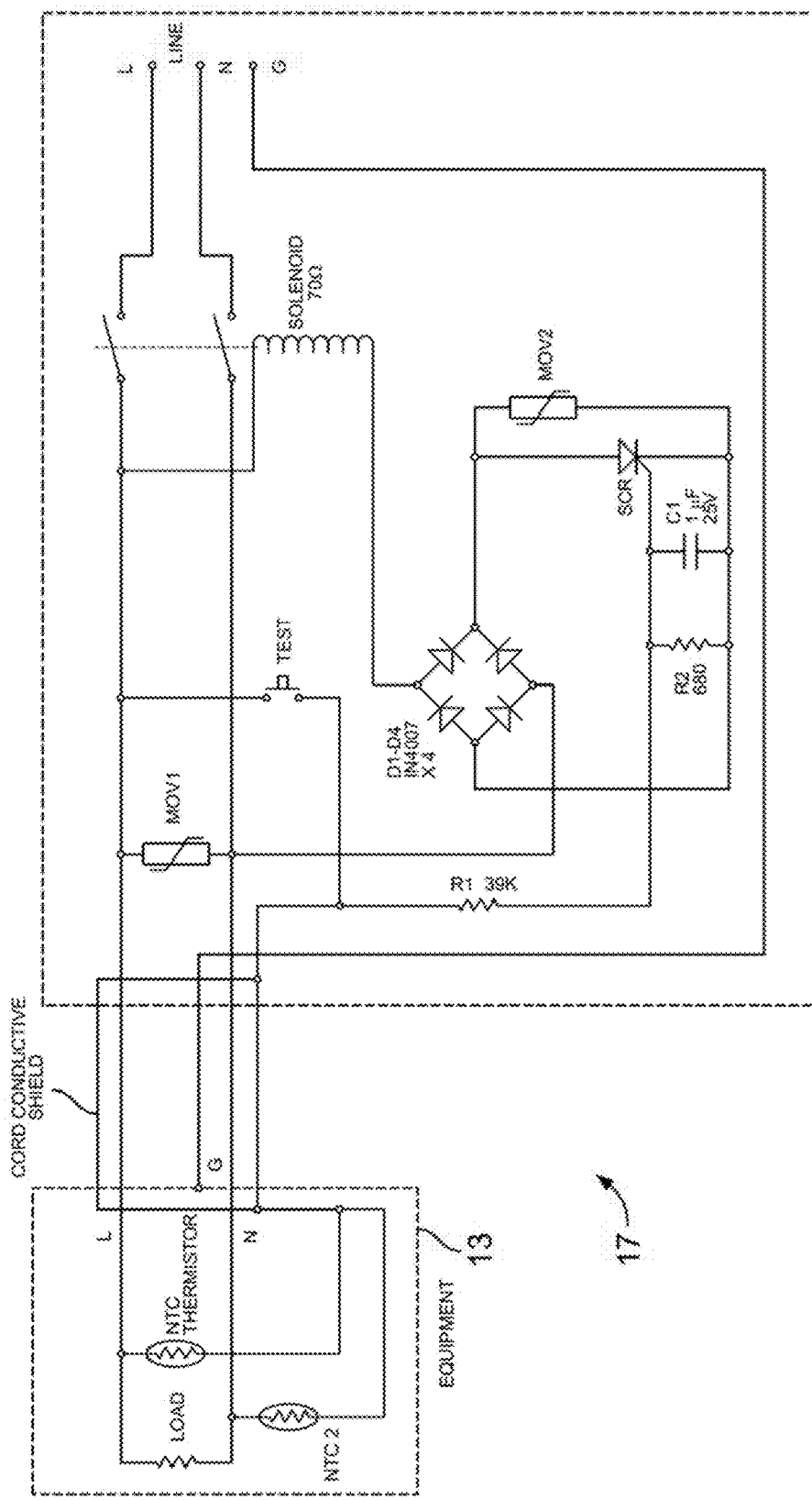

Referring also to FIG. 10-FIG. 17, there is shown circuit diagrams of the conductive shield power cord apparatus 10 with controller circuitry 16A including a full wave rectifying bridge controller in accordance with power cord apparatus shown in FIG. 1. In principle, the circuits shown in FIG. 10-FIG. 17 operate substantially similar to the circuits described in FIG. 2-FIG. 9. However, as shown, for example, in FIG. 10, circuit 2 is a shielded cable wherein the conductivity of the shield is exploited to function as the return line for parametric sensing device, thermistor 22. Also, note FIG. 10 illustrates two phase line voltage.

Figure 18:
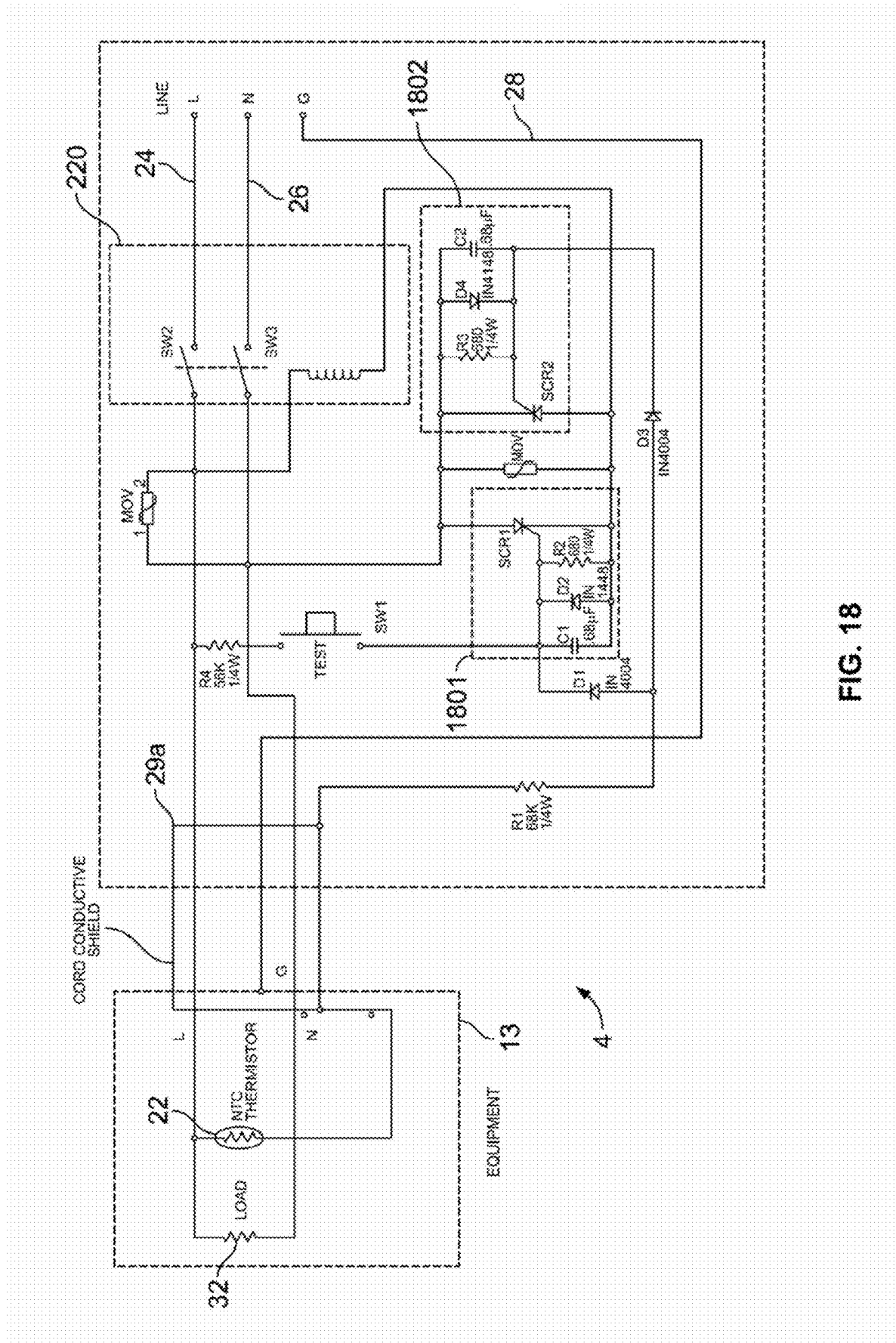
FIGS. 18-25 are schematic circuit diagrams of different embodiments of the shield-conductor power cord apparatus with a dual solid state controller in accordance with the power cord apparatus shown in FIGS. 1A-1E.

Referring also to FIG. 18 there is shown a schematic circuit 4 of a shielded conductive power cord apparatus 10 with controller circuitry 16A including a dual solid state controller in accordance with power cord apparatus shown in FIG. 1. Circuit 4 includes a line voltage conductor 24, a neutral conductor 26, a ground wire 28, and a conductor 29A, wherein the conductor 29A is the conductive shielding surrounding the line voltage conductor 24 and the neutral conductor 26. Circuit 4 also includes a first solid state switching control circuit 1801, a second solid state switching control circuit 1802, a sensing resistor R1, an interrupter circuit 220, a test switch SW1, and a negative temperature coefficient (NTC) thermistor 22.

Control circuit 1801 comprises a solid state switching control circuit and includes the sensing resistor R1 connected in-line between the gate of a Silicon Controlled Rectifier (SCR) SCR1 and the NTC thermistor 22 via shield conductor 29A. The control circuit 1801 includes a parallel network comprising resistor R2, capacitor C2 and diode D2 connected between the gate and cathode terminals of the SCR. These components provide a measure of noise immunity and protection against damage across the gate to cathode junction of the SCR. Diode D1 connected between SCR1 gate and resistor R1 prevents a negative AC excursion from being applied to the SCR1 gate. Resistor R11 limits the current applied to the gate of the SCR 1, and along with NTC thermistor 22 and resistor R2, sets the sensitivity of SCR1 to an out-of-bounds parametric condition associated with machine 13. The cathode terminal of SCR1 is operatively connected to electrical conductor 24 through energizing coil L1.

Interrupter circuit 220 comprises an electrical circuit for interrupting the flow of current and includes the energizing coil L1, a first switch SW2 connected in-line with conductor 24 and a second switch SW3 in-line with conductor 26. Switches SW2 and SW3 are mechanically latched closed but are also responsive to the flow of current through energizing coil 11 and are closed when such current is not flowing. In response to the flow of such current, SW2 and SW3 switch from the normally closed position to the shock hazard condition open position. When current flows through energizing coil L1 its magnetic field moves a plunger which unlatches SW2 and SW3.

In operation switches SW2 and SW3 are mechanically latched closed thus applying line voltage to the load 32 via conductors 24 and 26.

For normal operating conditions values for the NTC thermistor 22, sensing resistor R1, and resistor R2 are selected for desired sensitivity to parametric deviation. In other words, the values may be selected such that minor changes in the ambient heat of the electrical machine 13 result in NTC thermistor 22 resistance drop, which in turn cause the SCR 1 gate voltage to rise from its quiescence level to its switching level. In response thereto, the SCR 1 switches from its normally non-conducting state to the shock hazard condition conducting state (i.e., current flows through the SCR anode-cathode junction), thereby providing a path for current to flow through energizing coil L1, causing switches SW2 and SW3 to switch from the normally closed position to the hazard condition open position and thus operatively disconnecting the AC source from the electrical appliance.

It will be understood that the NTC thermistor 22 may be any suitable parametric sensing device, such as, for example, a vibration sensor, as described earlier, connected in-line between conductor 26 and conductor 29A. The vibration sensor, having normally open contacts, closes its contacts when a predetermined vibration level in machine 13 is sensed. With the vibration sensor contacts closed the SCR gate voltage rises from its quiescence level to its switching level as described earlier.

It will be appreciated that AC source power is also removed from the coil L1 when switches SW2 and SW3 switch from the normally closed position to the shock hazard condition open position. Thus, coil L1 is protected from an extended current flow which allows for coil L1 to be a lower duty cycle rating thereby reducing coil L1 cost.

Still referring to FIG. 18, test switch SW1, connected between conductor 26 and conductor 29 operates when depressed to simulate a drop in the NTC thermistor resistance 22 which in turn triggers the SCR gate voltage as described above.

Control circuit 1802 operates similar to control circuit 1801 with the exception that control circuit 1802 is wired such that a negative AC cycle will provide sufficient holding current to flow through SCR2 when SCR2 gate-cathode is forward biased. SCR2 gate voltage is sufficiently positive when, due to excess heat, NTC thermistor 22 allows positive current flow though diode D3 which charges capacitor C2 sufficiently positive such that the SCR2 gate-cathode is forward biased when the negative AC cycle is applied to the SCR2 cathode. It will be appreciated that the dual control circuits, 1801, 1802 provide phase independent power removal from machine 13 than does a single control circuit. It will also be appreciated that the dual control circuits also provide mutual redundancy in the event of a failure of one of the control circuits.

Figure 19:
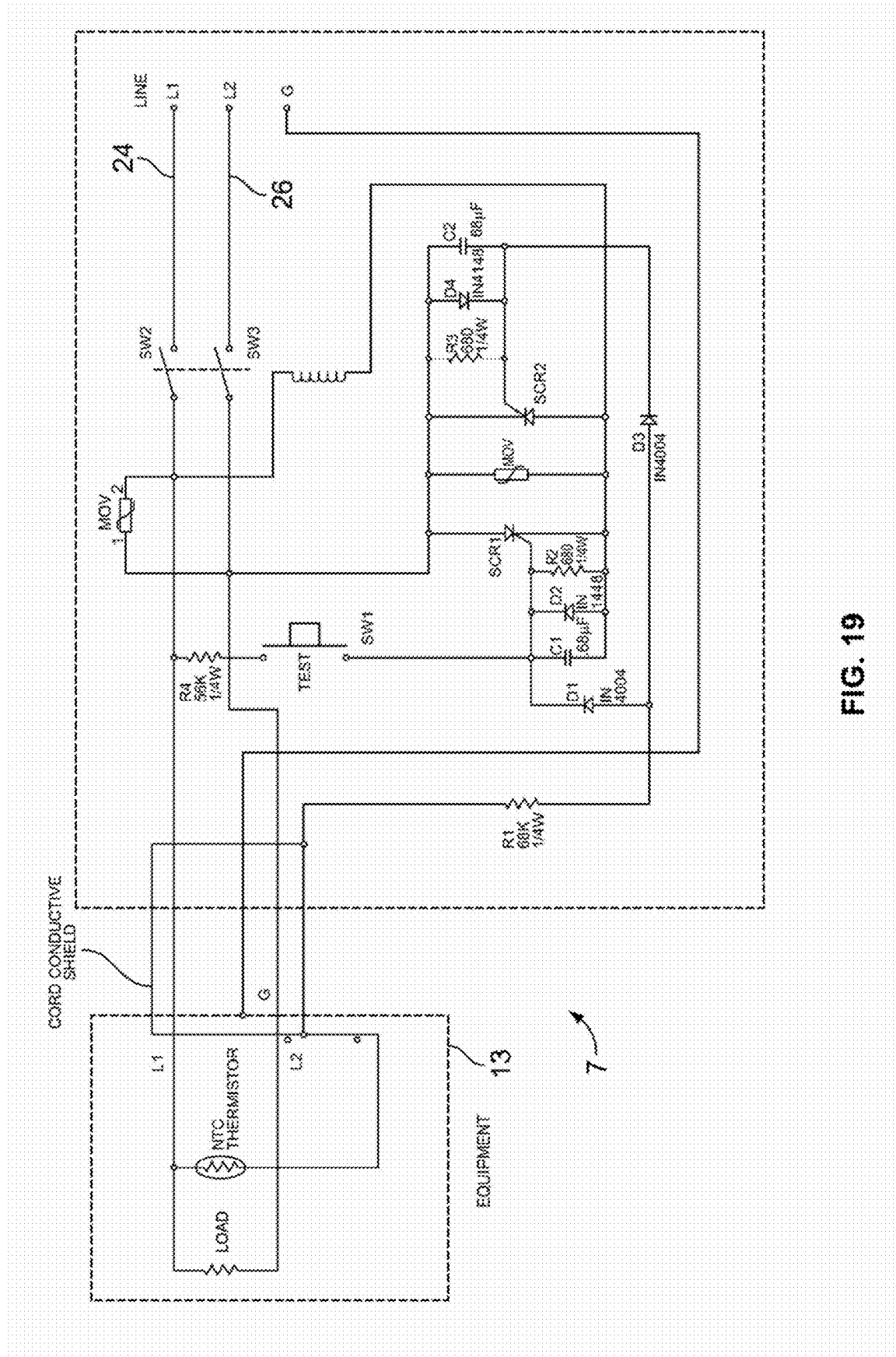

Referring also to FIG. 19 there is shown a circuit diagram 7 of the shield-conductor power cord apparatus 10 with controller circuitry 16A including a dual solid state controller in accordance with power cord apparatus shown in FIG. 1. Circuit 7 is constructed and operates substantially similar to circuit 4 shown in FIG. 18. Circuit 7 shows multi-phase lines 24 and 26A.

Figure 20:
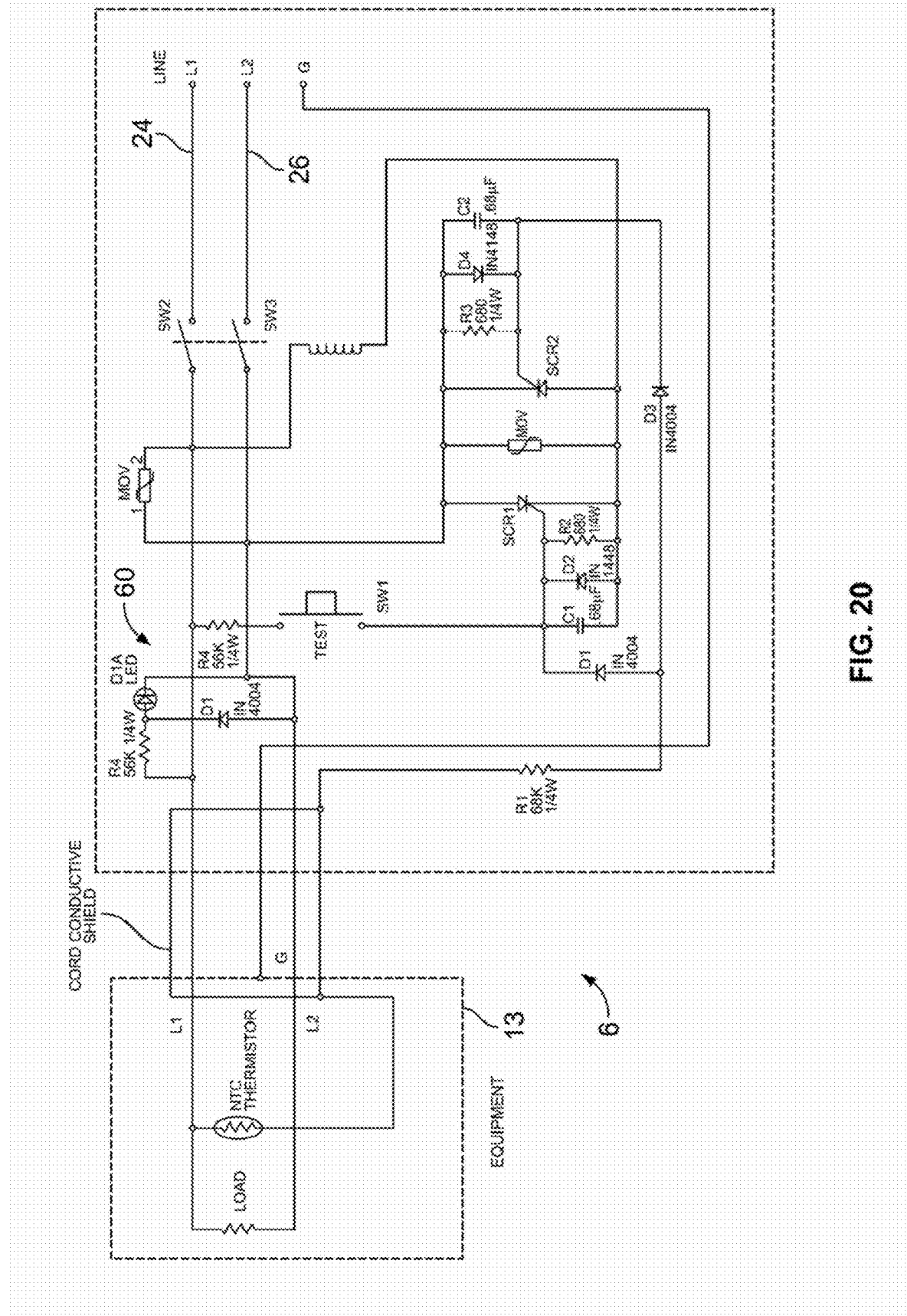

Referring also to FIG. 20 there is shown a circuit diagram 6 of the shield-conductor power cord apparatus 10 with controller circuitry 16A including a dual solid state controller in accordance with power cord apparatus shown in FIG. 1. Circuit 6 is constructed and operates substantially similar to circuits 4 and 7 shown in FIG. 18 and FIG. 19, respectively.

Circuit 6 includes an indicating circuit 60 which provides a means of visual indication that the circuit is operating. Indicating circuit 60 includes a light emitting diode LED D1A and a current limiting resistor R4. Diode LED D1A provides visual indication by means of a light that circuit 6 is operating. Resistor R4 is preferably 56K ohms and acts to limit the current which passes to diode LED D1A.

It will be understood that indicating circuit 60 may be any suitable indicating circuit such as, for example, a blinking visual indicator, or for another example, a momentary buzzer indicating power has been applied when switches SW2 and SW3 are mechanically latched.

Figure 21:
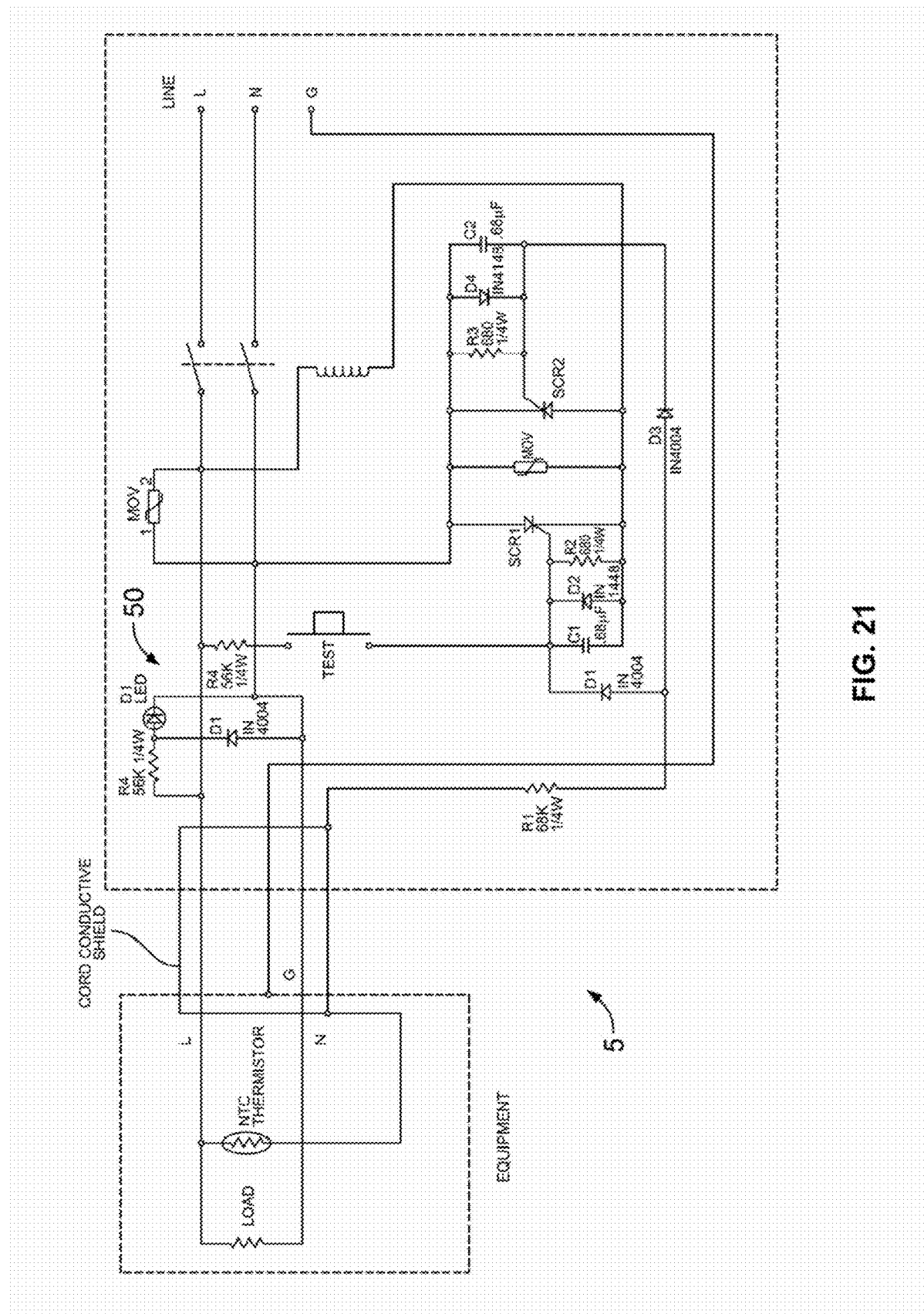
Figure 22:
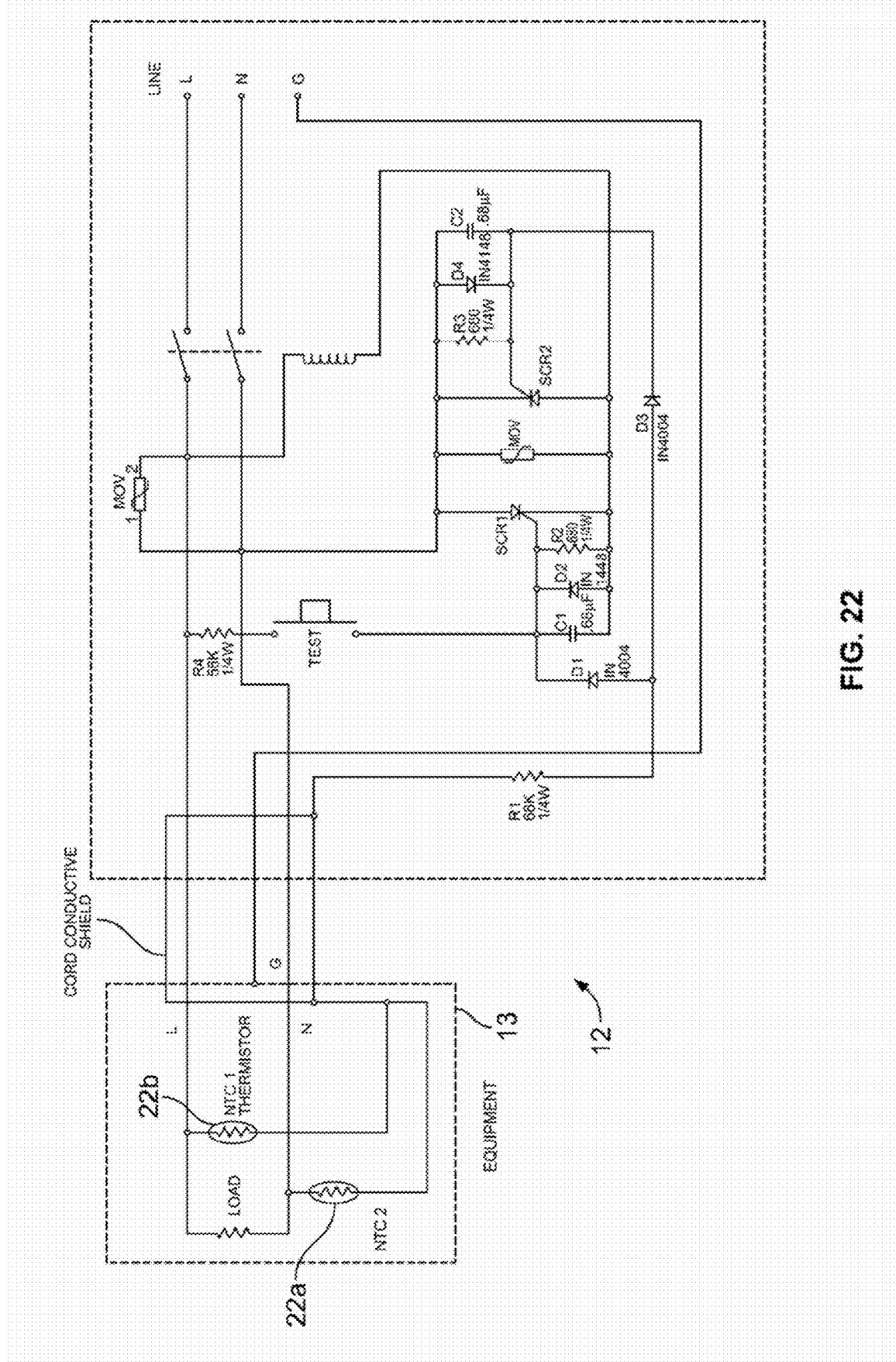
Figure 23:
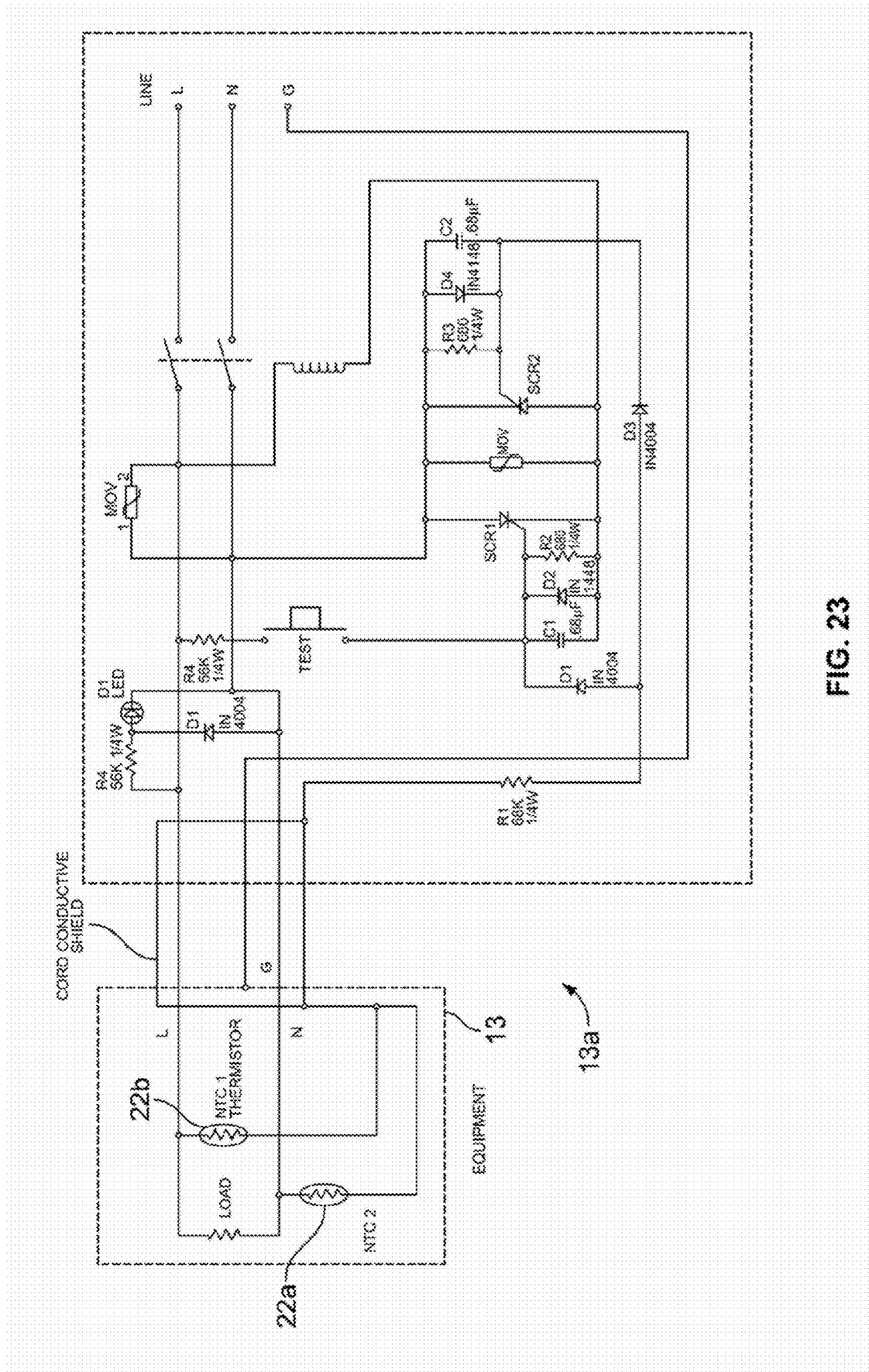
Figure 24:
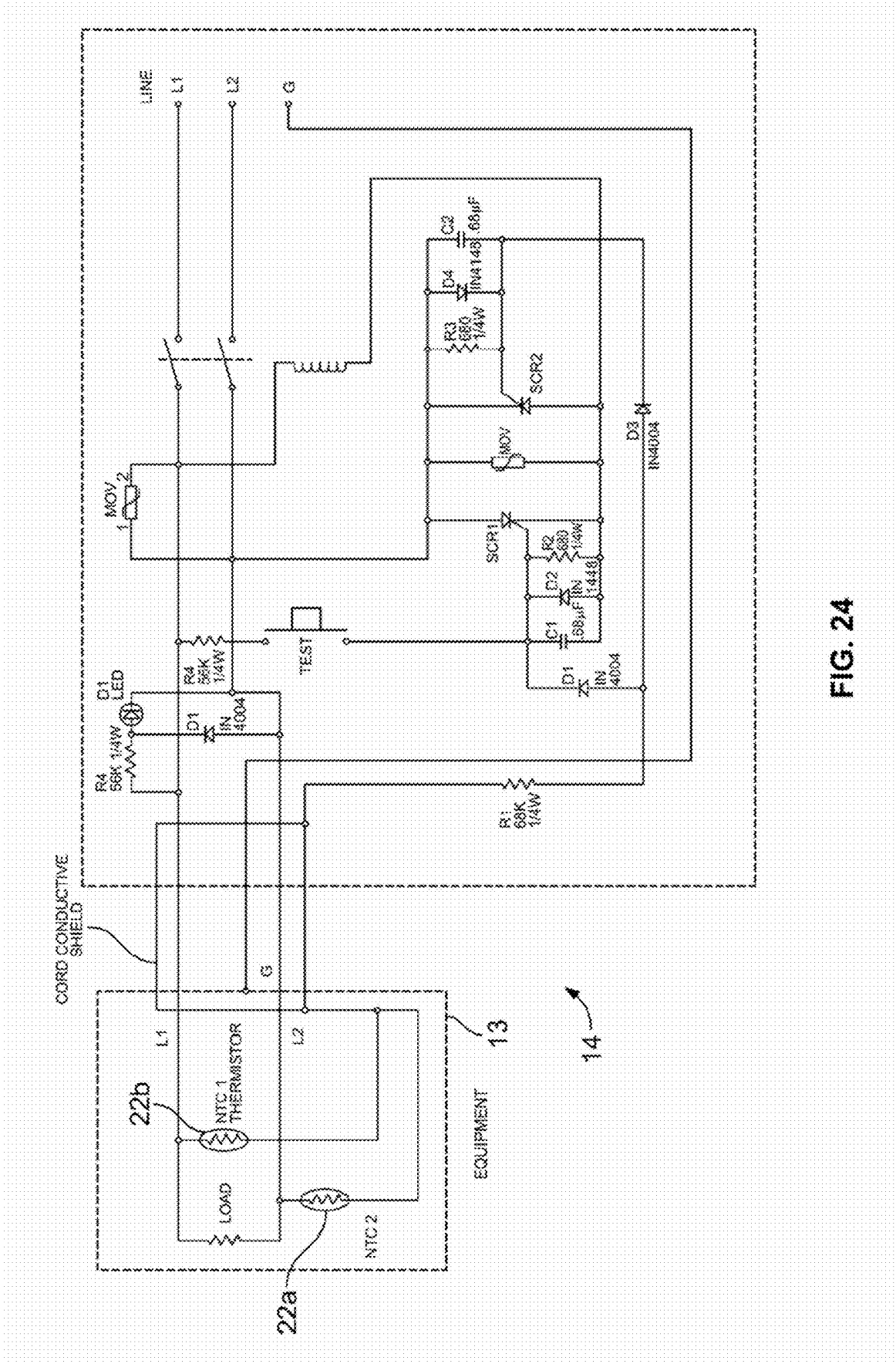
Figure 25:
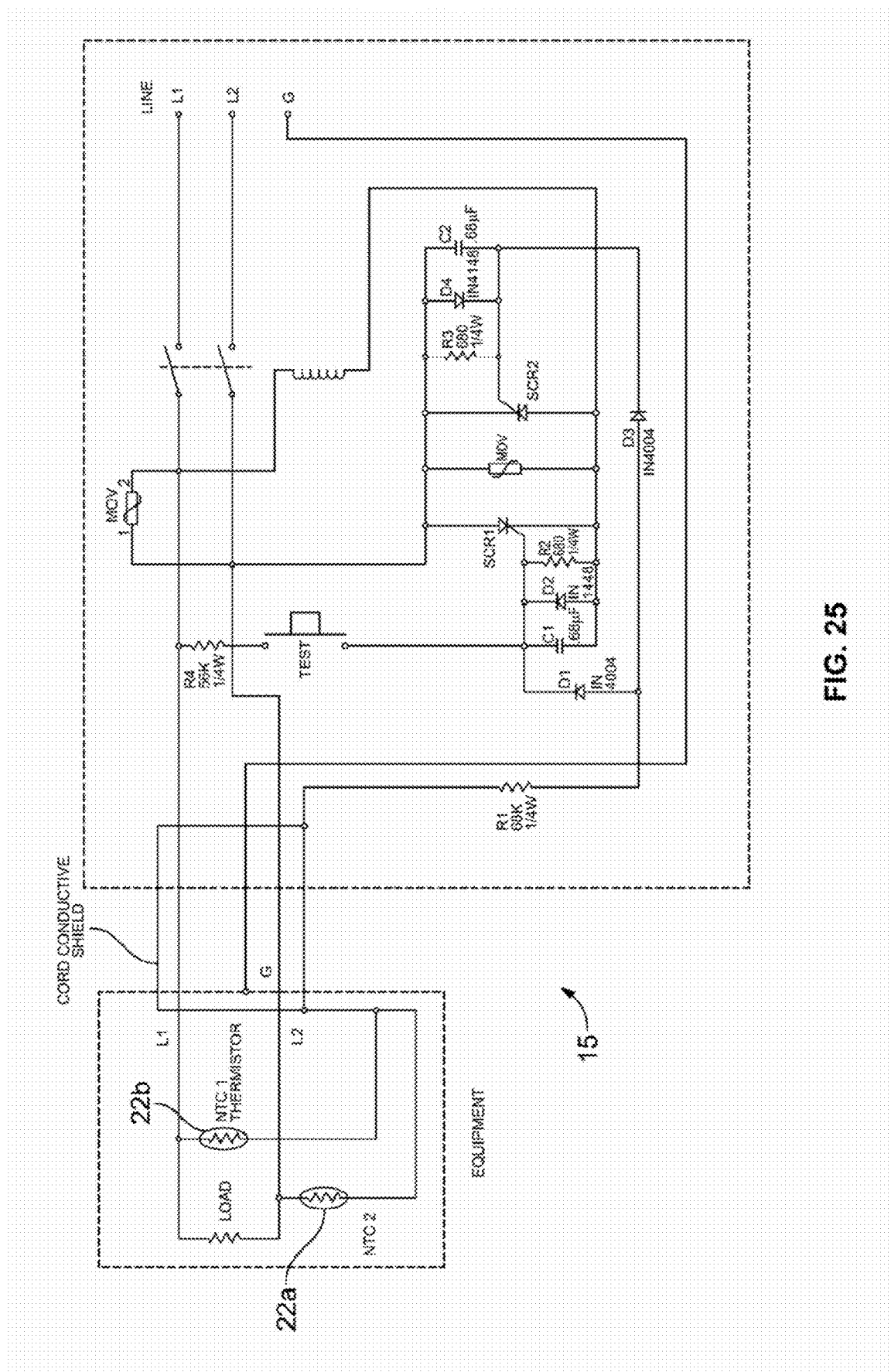
Figure 26:
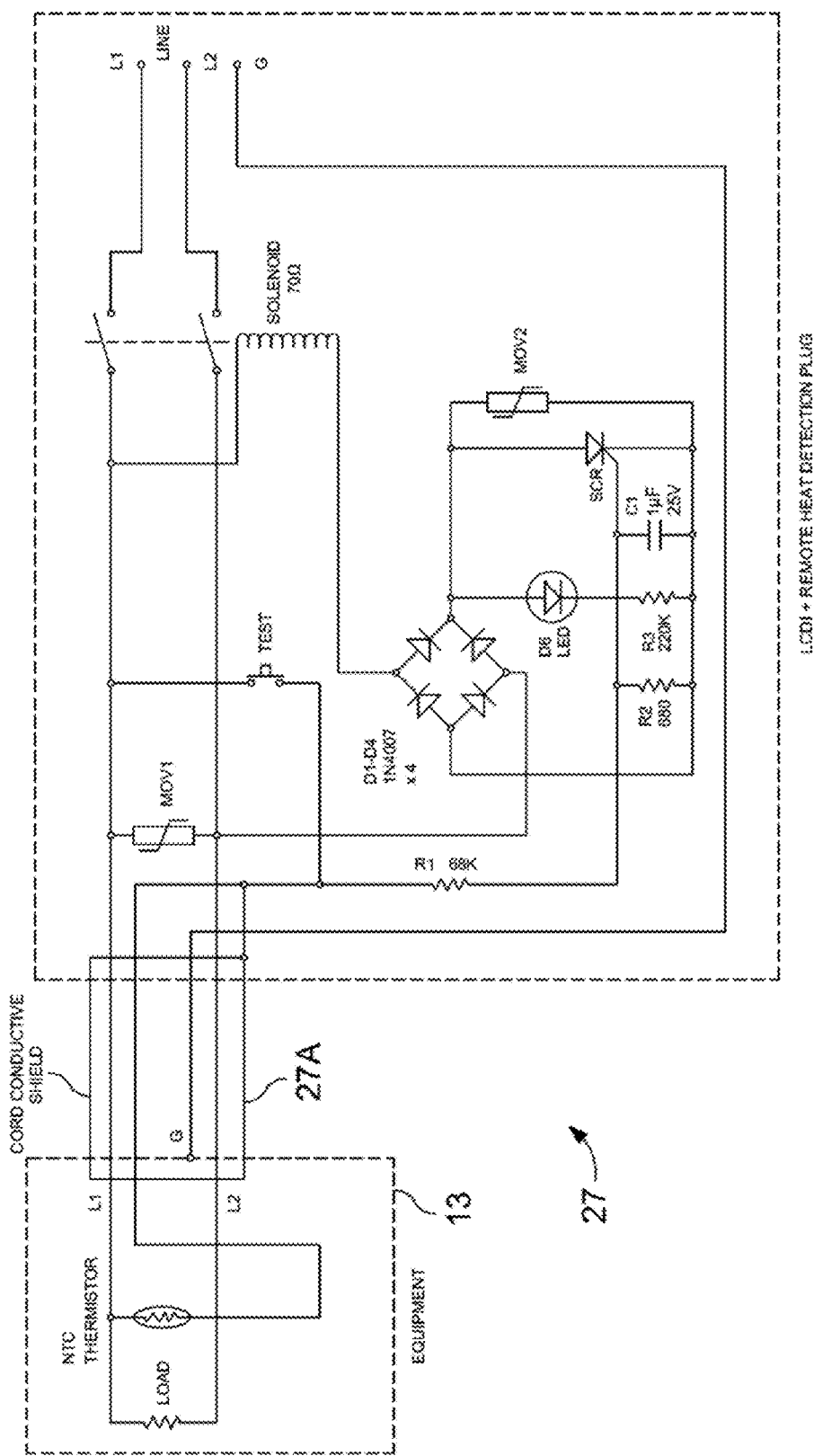
FIGS. 26-41 are schematic circuit diagrams of different embodiments of the shielded 4-conductor power cord apparatus in accordance with the power cord apparatus shown in FIGS. 1A-1E.
Figure 27:
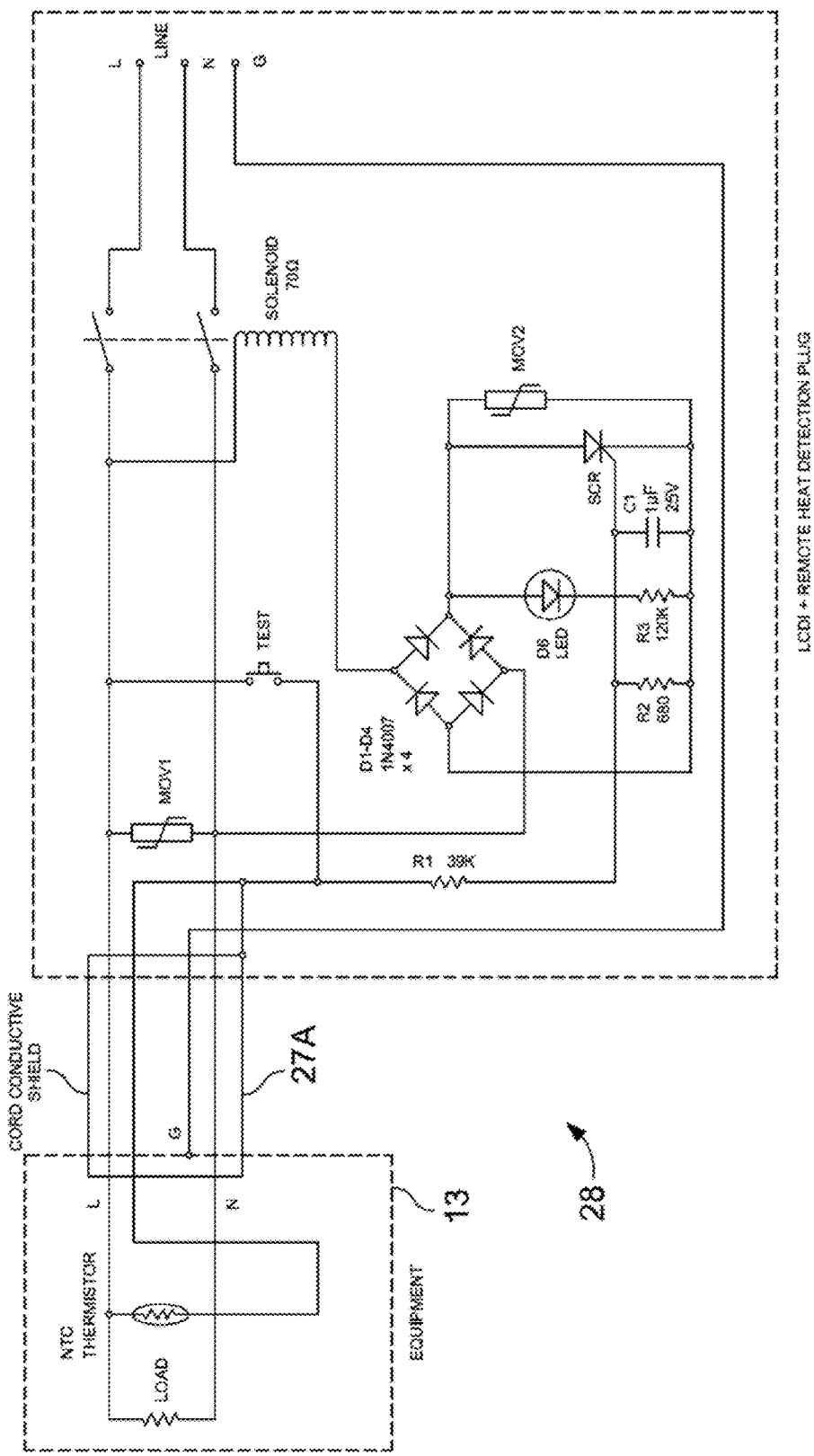
Figure 28:
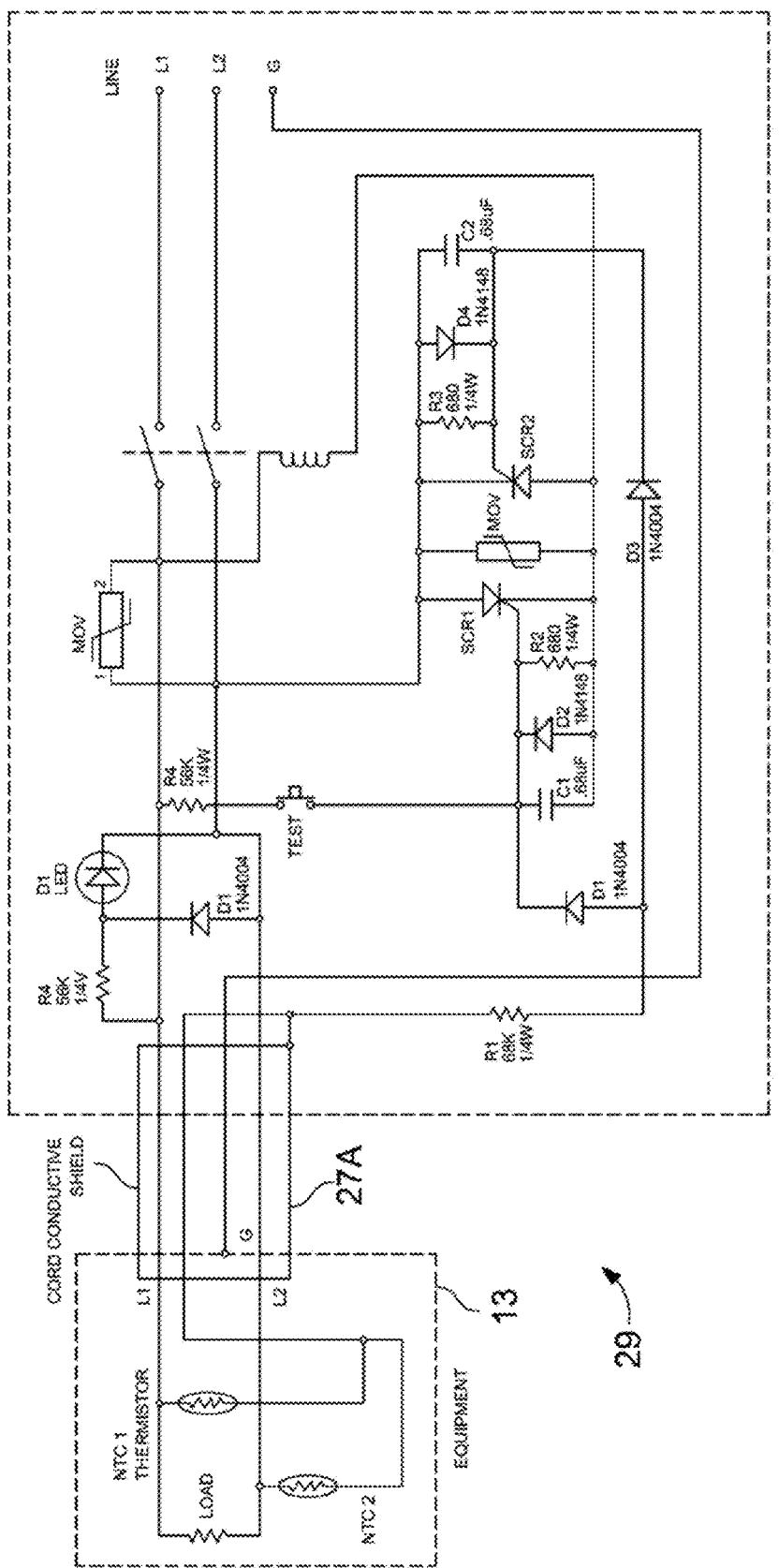
Figure 29:
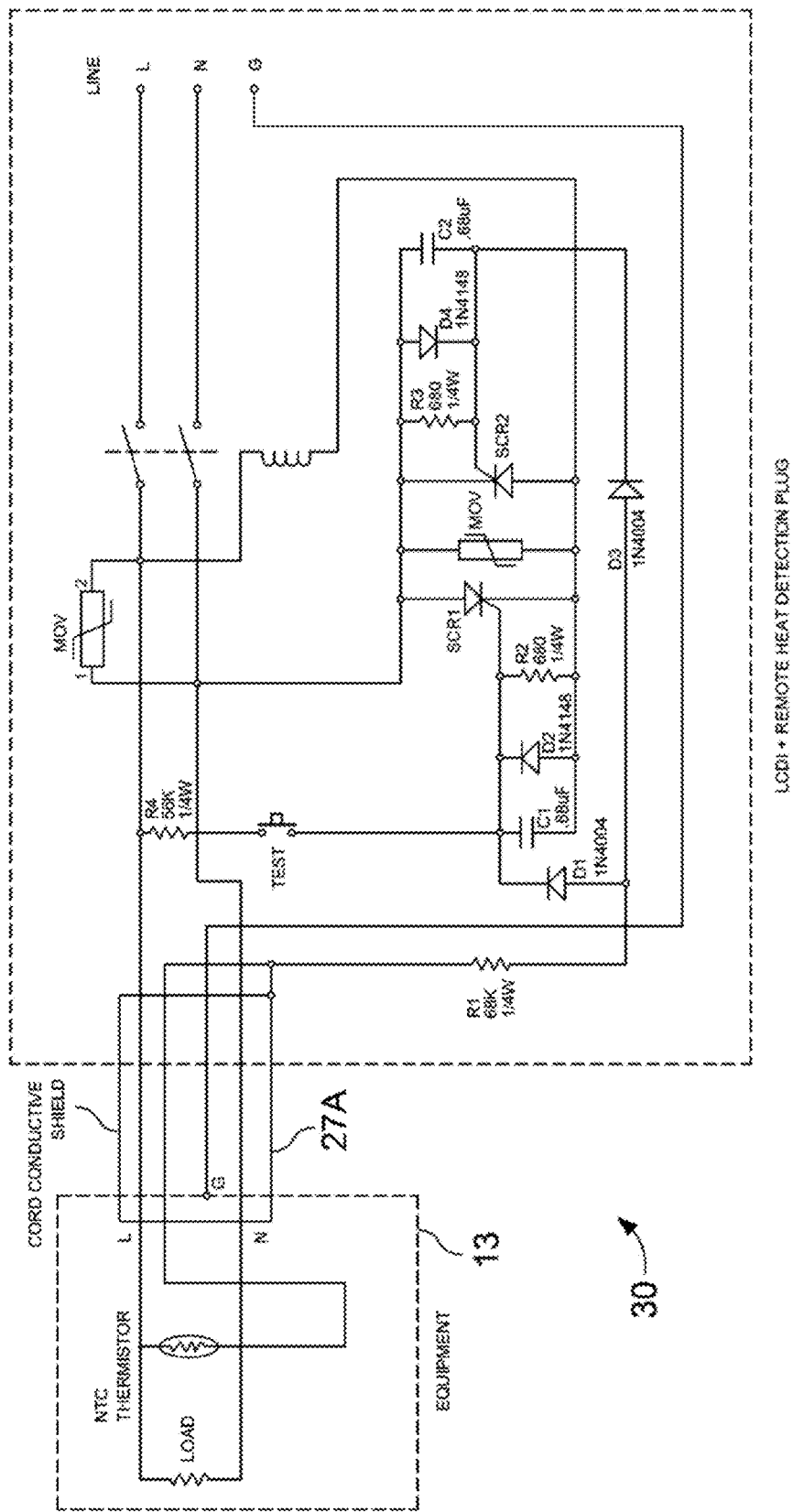
Figure 30:
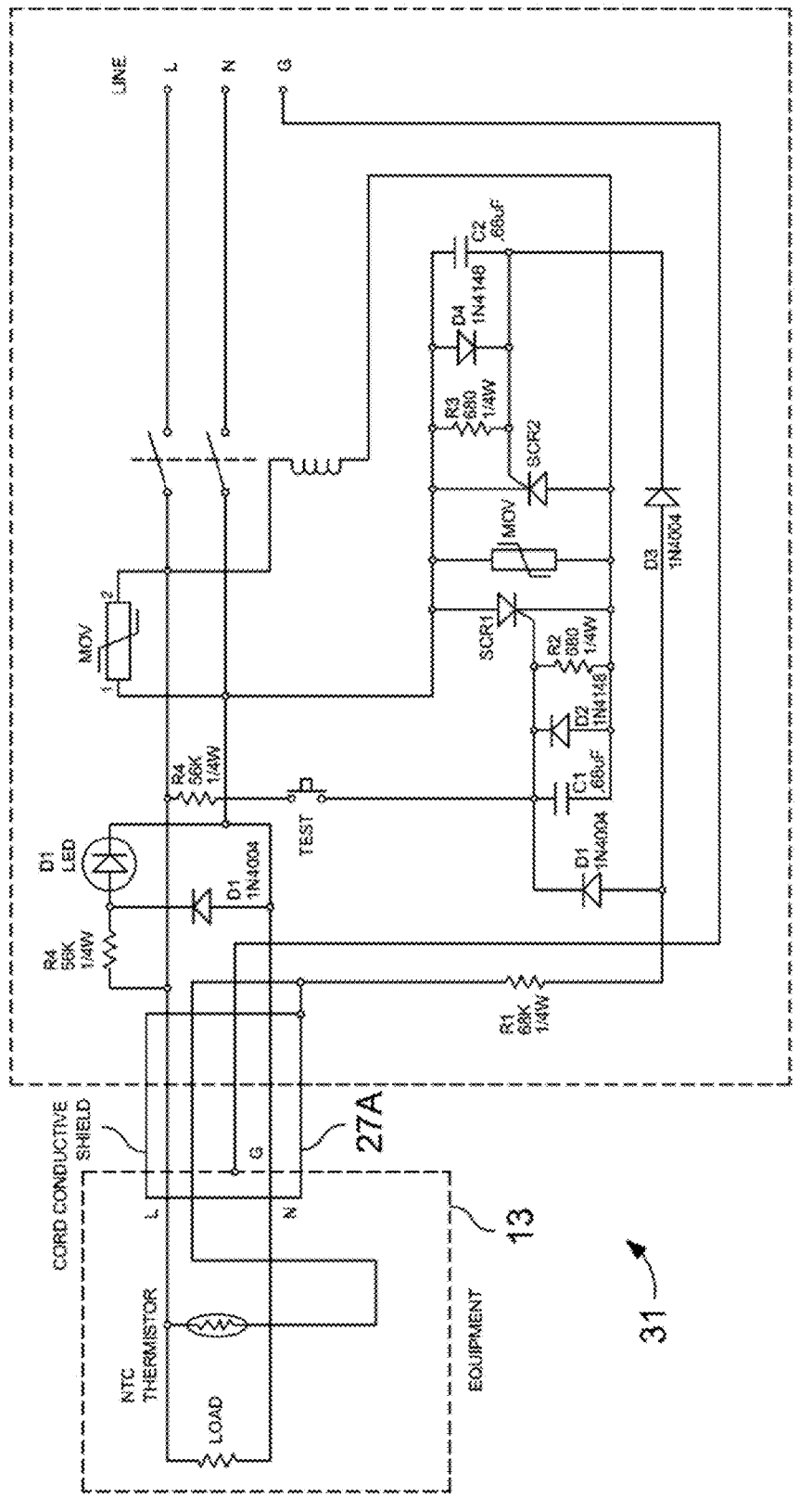
Figure 31:
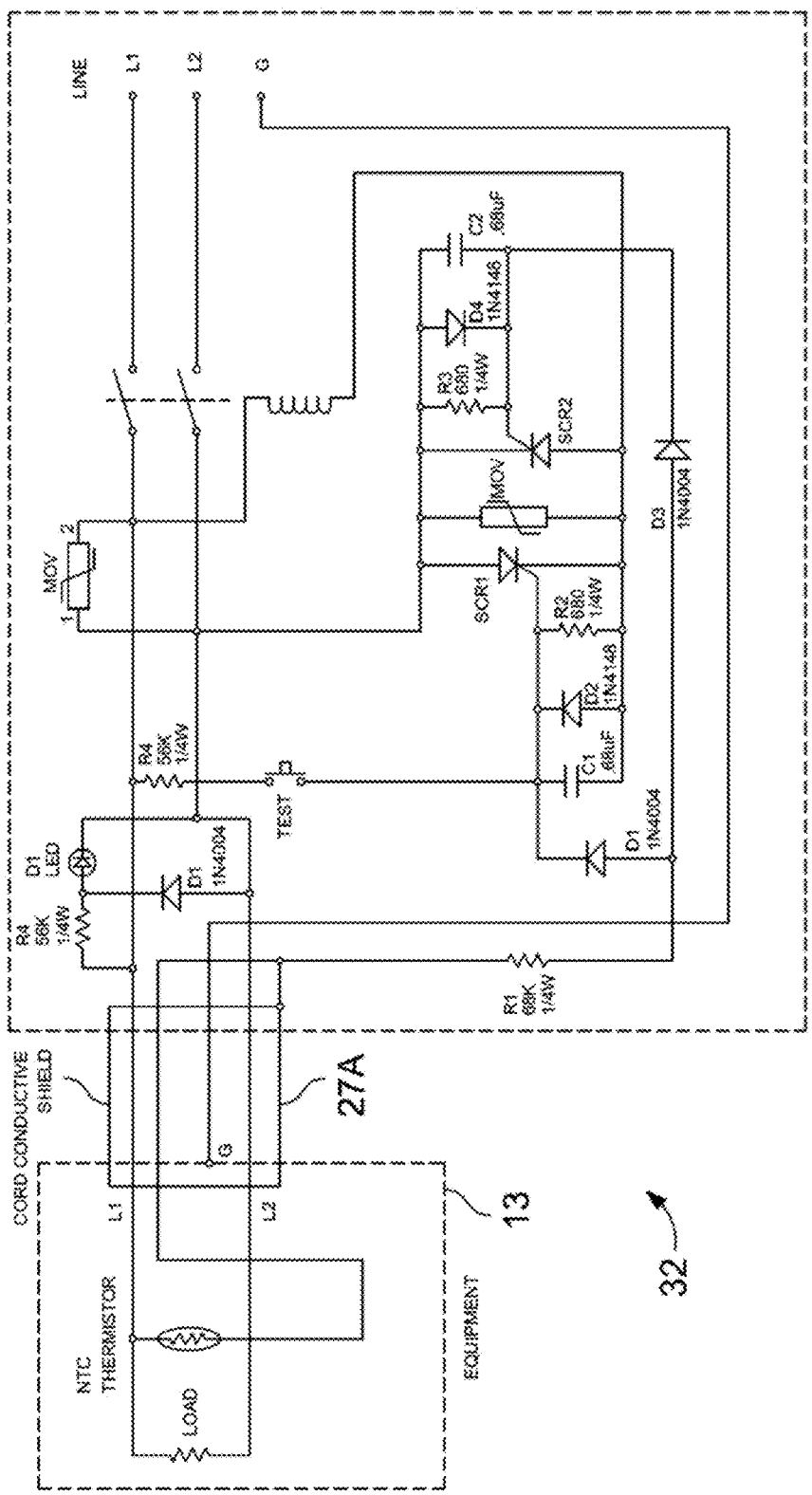
Figure 32:
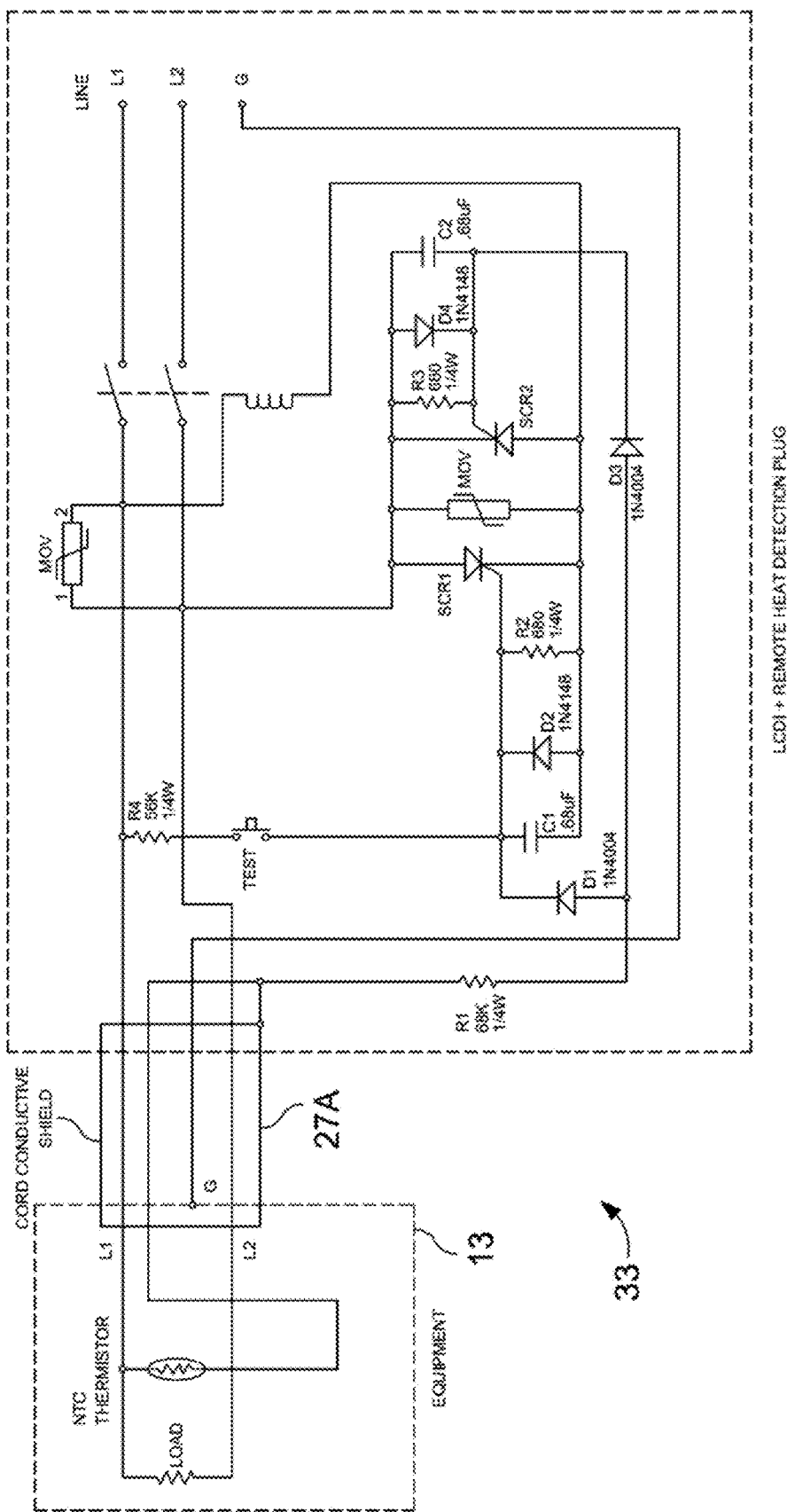
Figure 33:
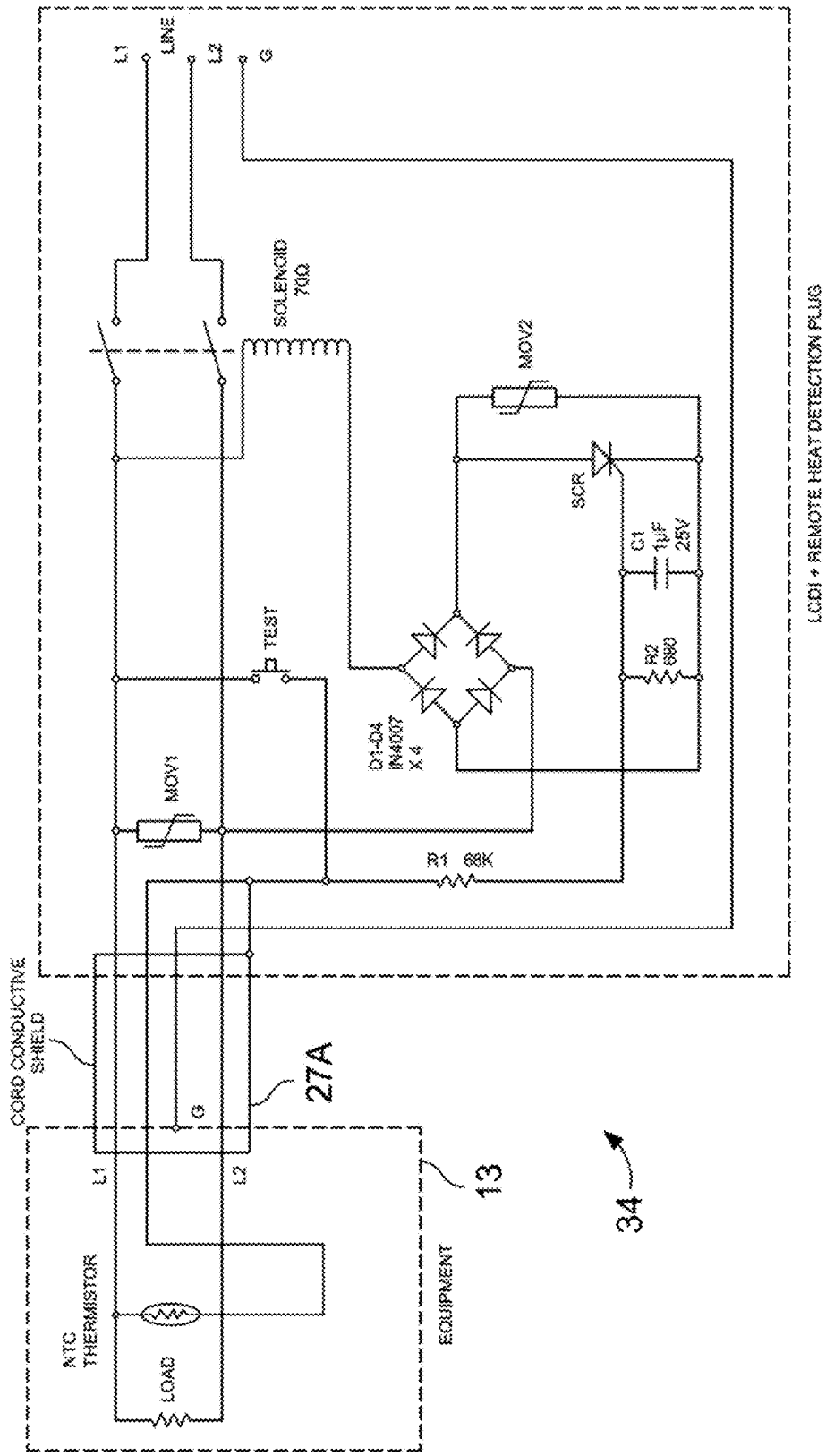
Figure 34:
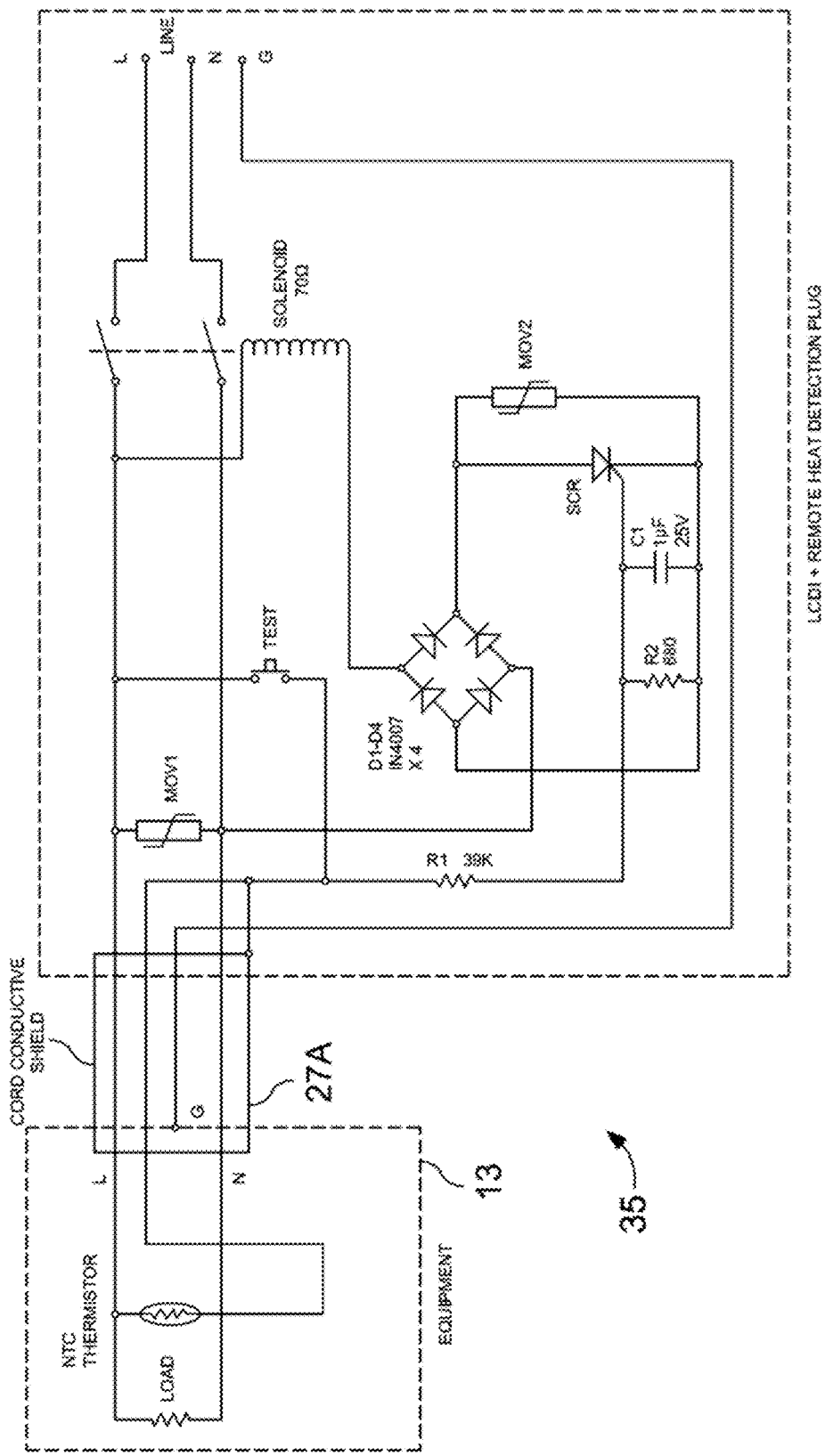
Figure 35:
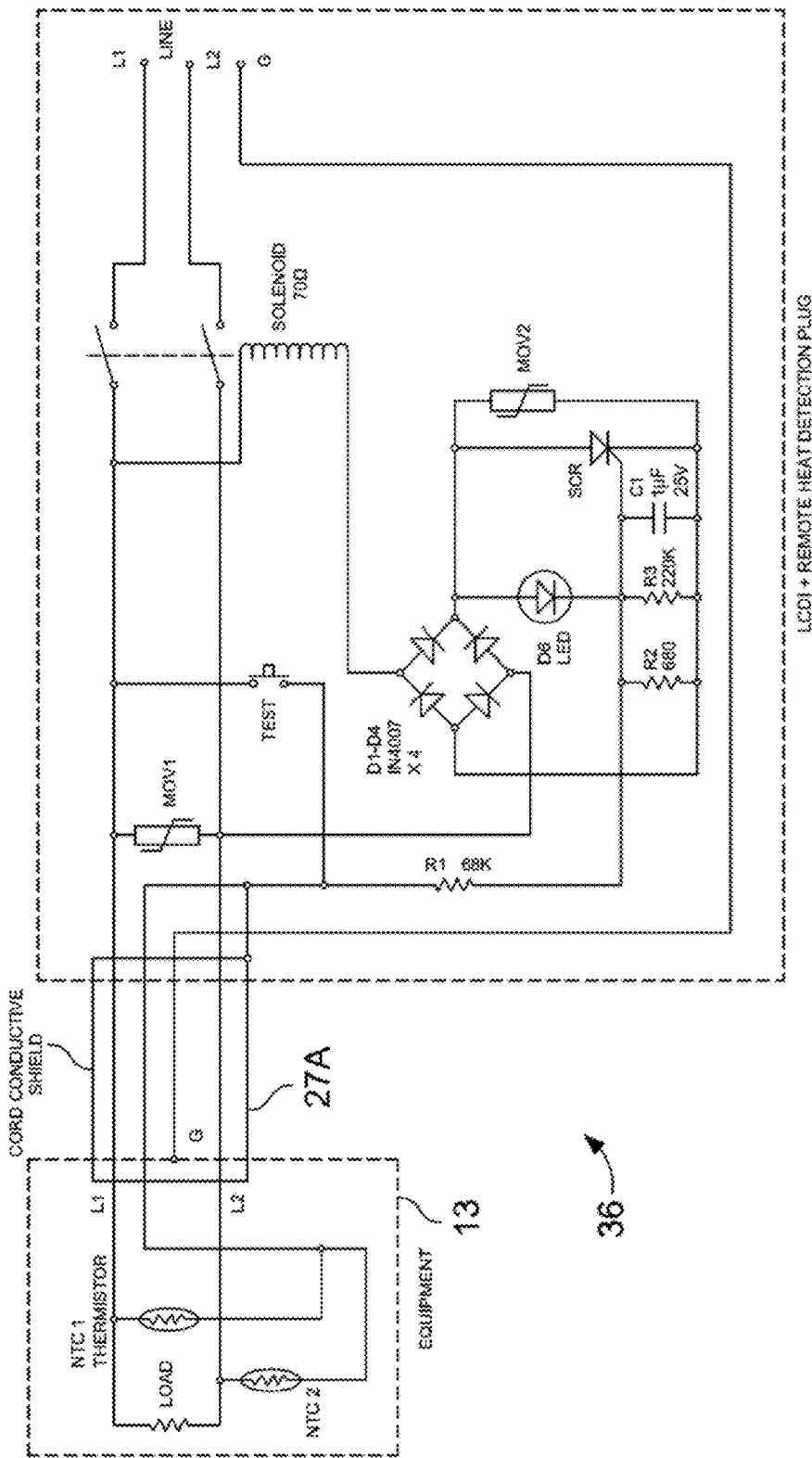
Figure 36:
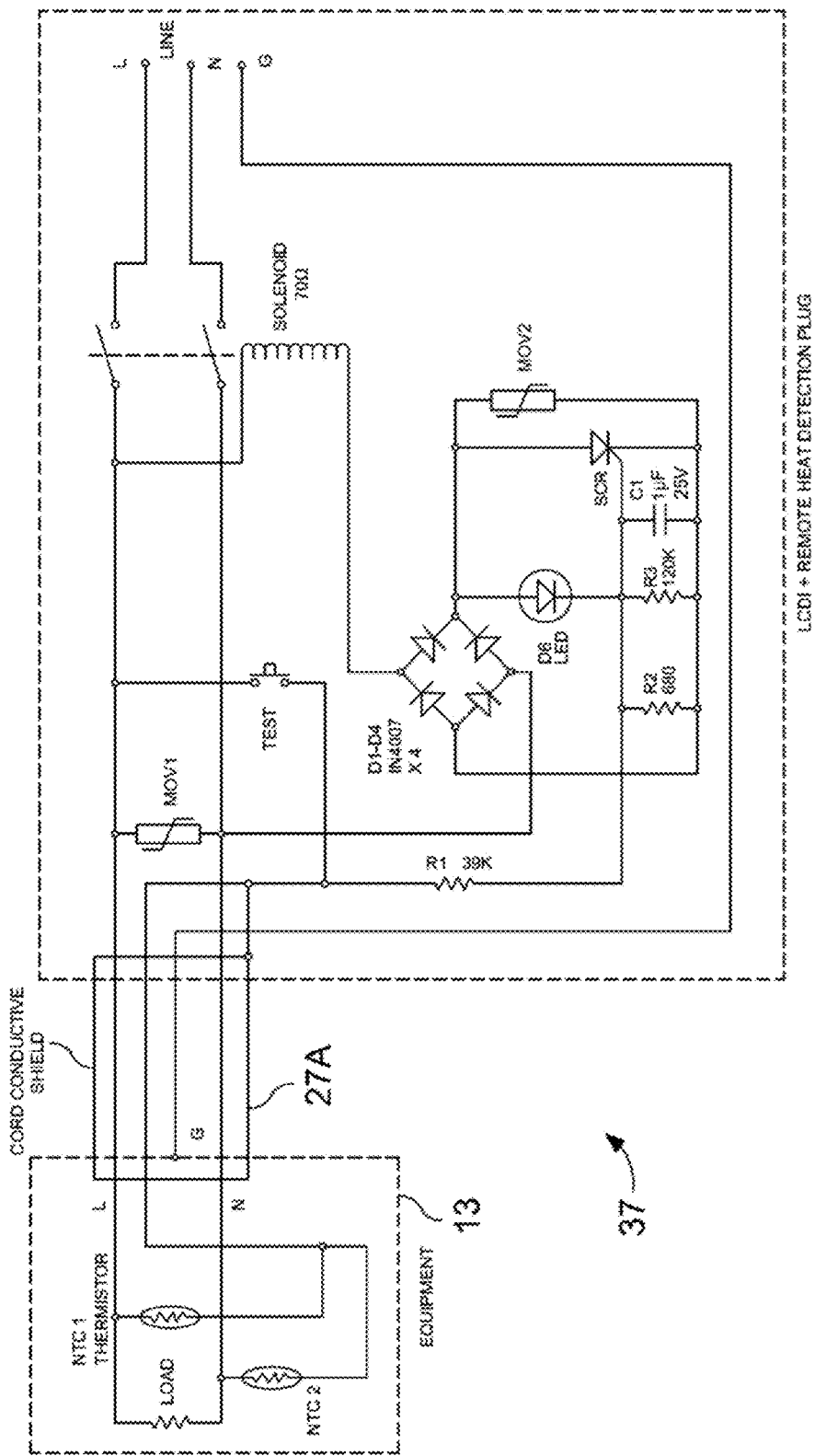
Figure 37:
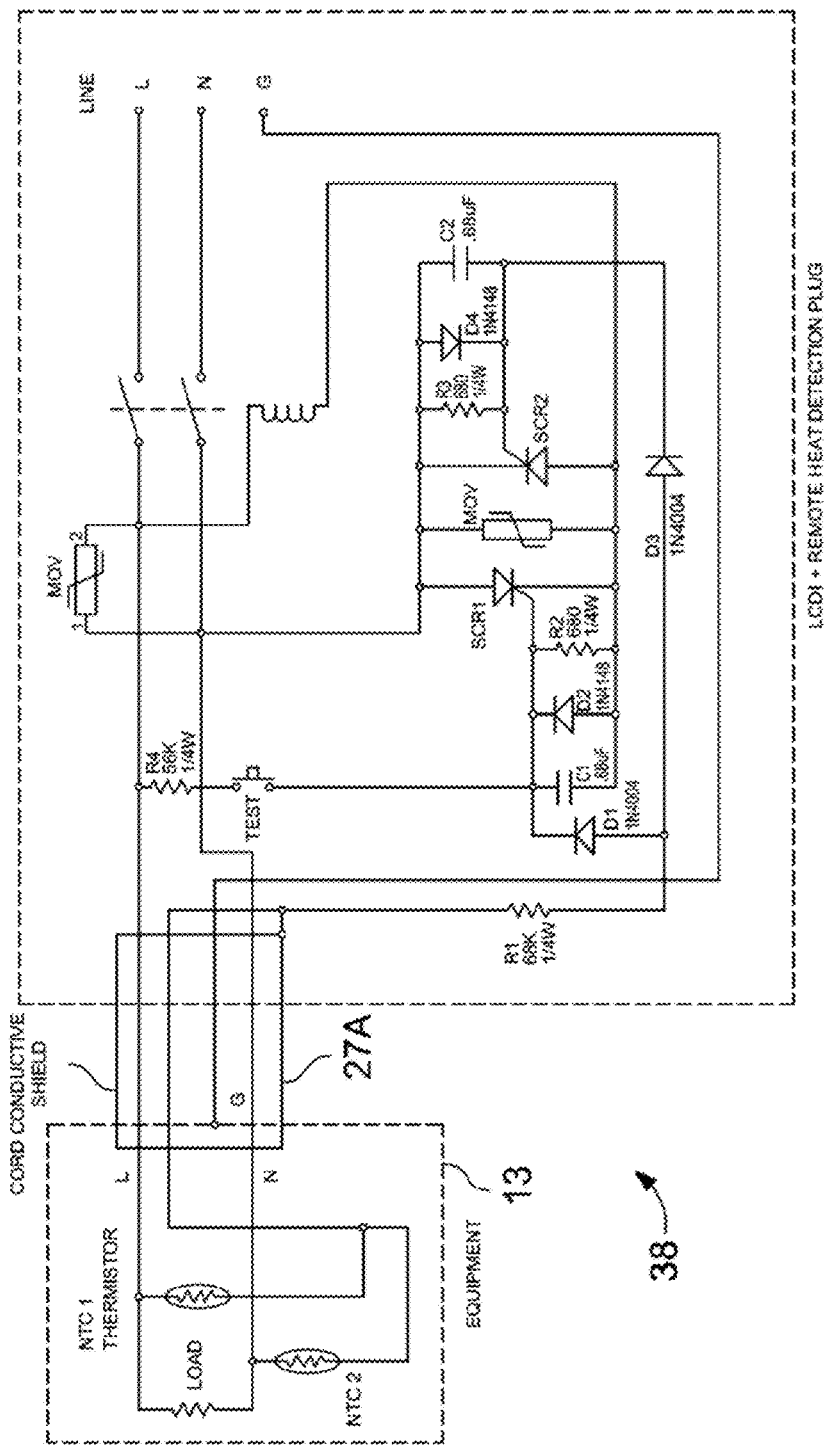
Figure 38:
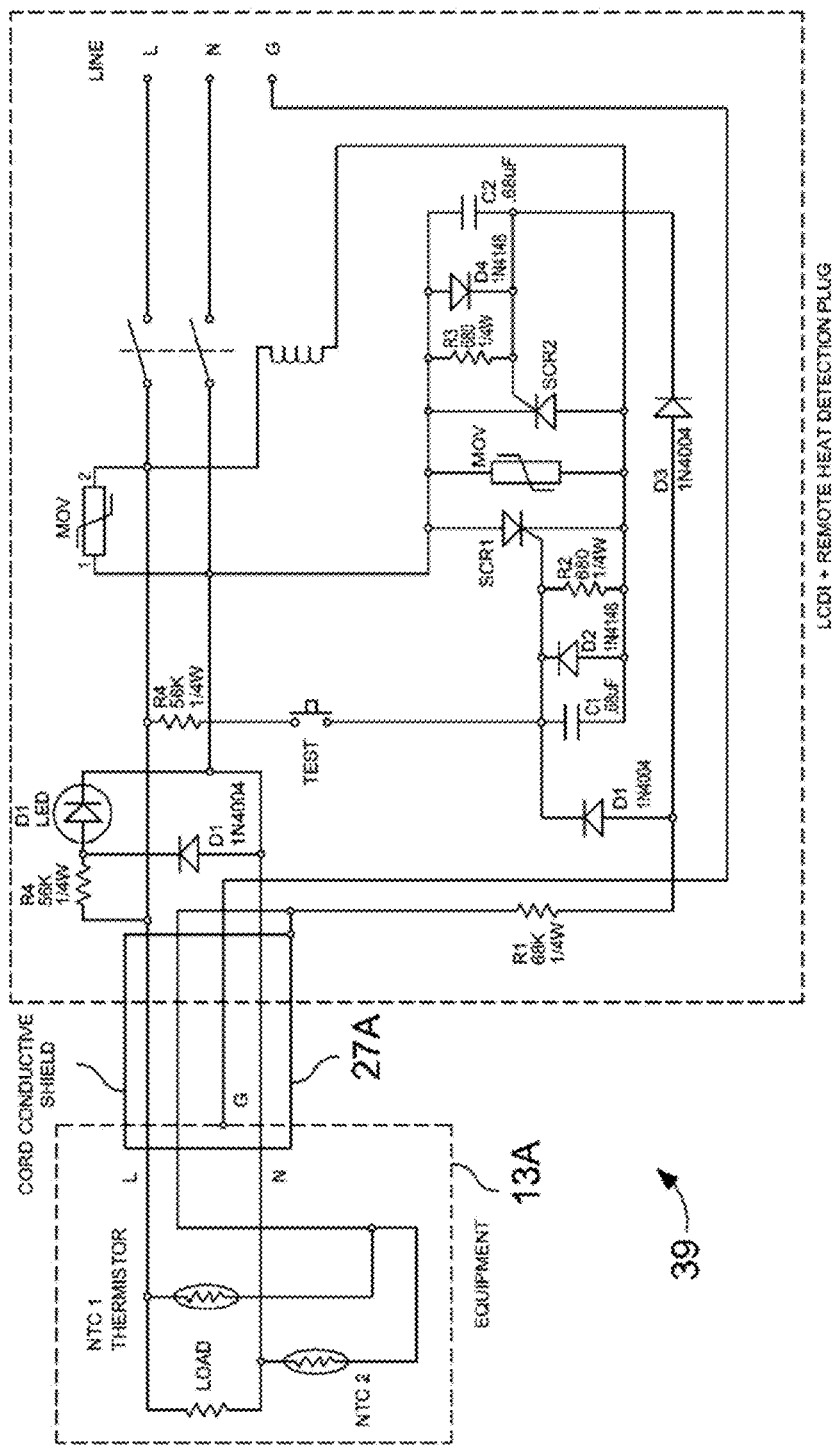
Figure 39:
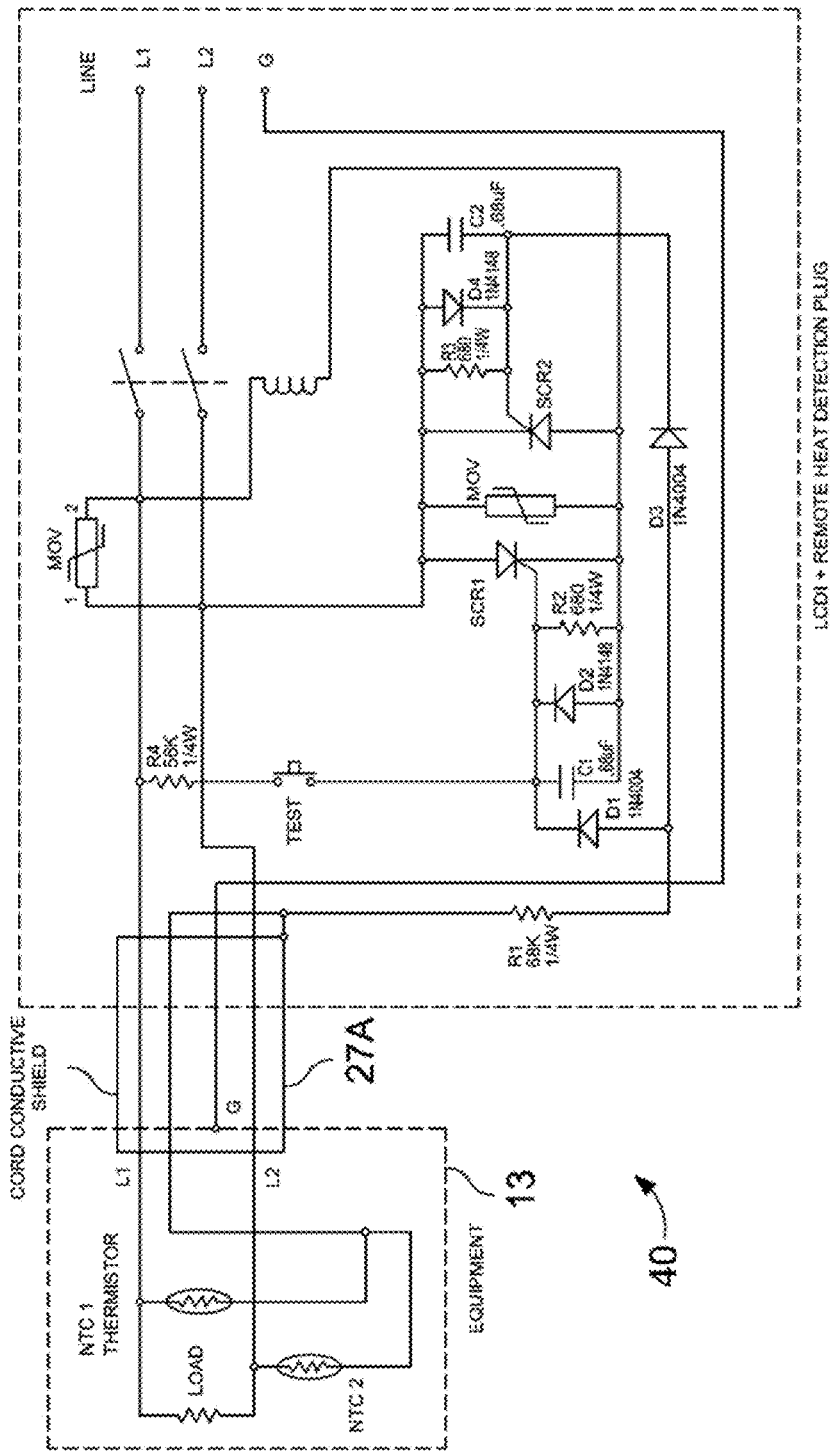
Figure 40:
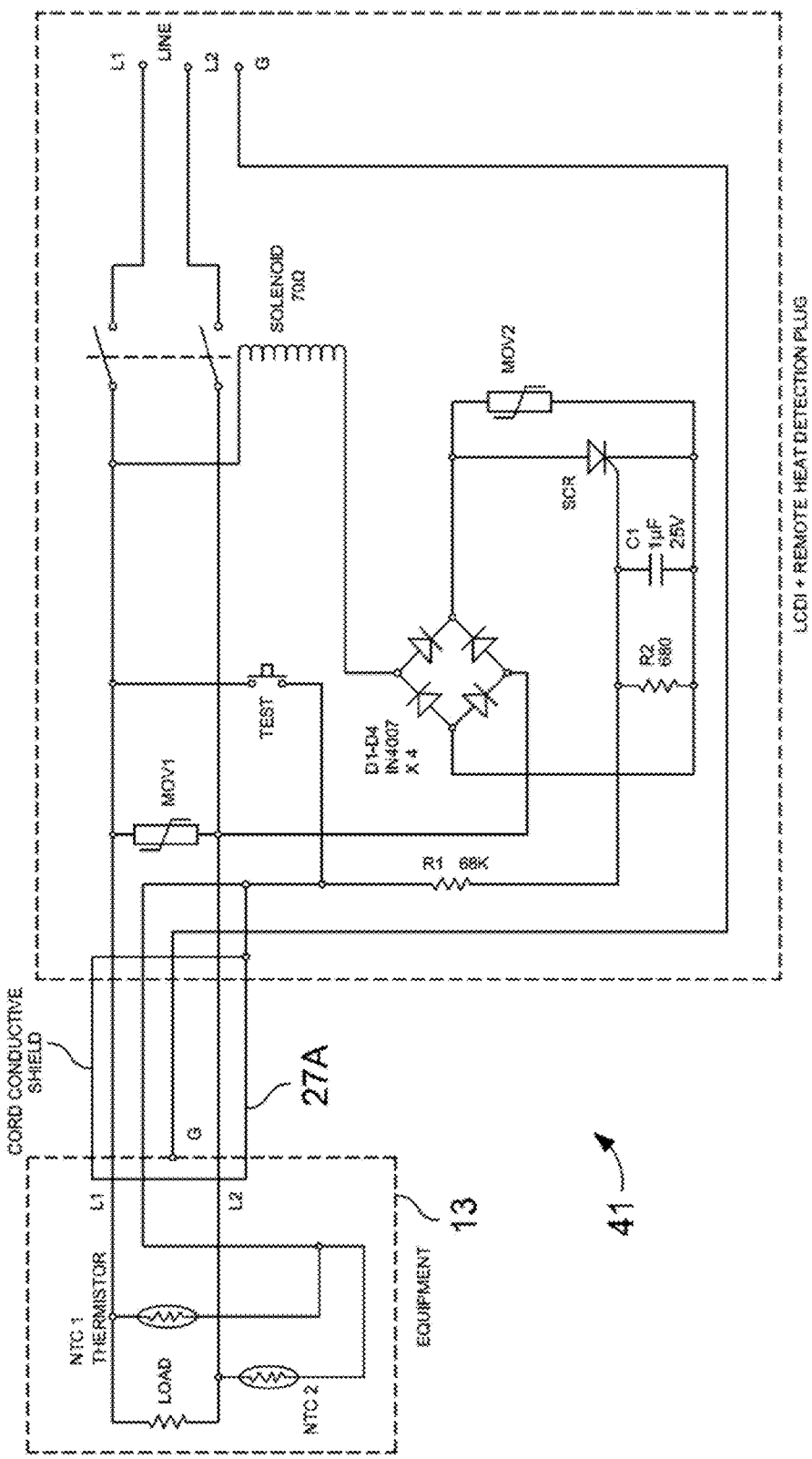
Figure 41:
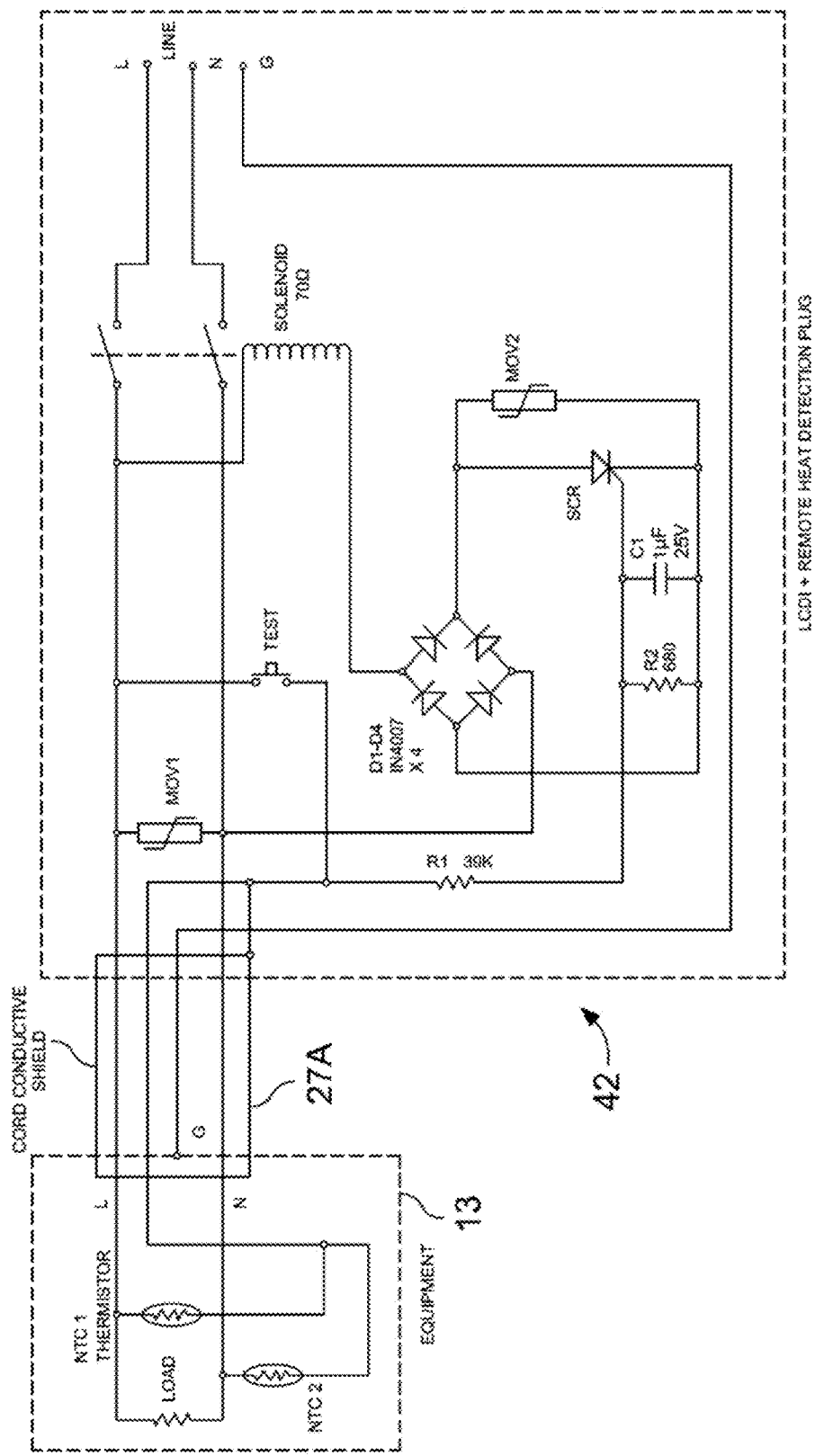

Referring also to FIG. 21 there is shown a circuit diagram 5 of the shield-conductor power cord apparatus 10 with controller circuitry 16A including a dual solid state controller in accordance with power cord apparatus shown in FIG. 1. Circuit 5 is constructed and operates substantially similar to circuits 4, 6, and 7, described earlier. FIG. 21 illustrates a single phase application of the present invention.

Referring also to FIG. 22-FIG. 25 there is shown a circuit diagrams of the shield-conductor power cord apparatus 10 with controller circuitry 16A including a dual solid state controller in accordance with power cord apparatus shown in FIG. 1. Circuits 12-15 shown in FIGS. 22-25, respectively, are constructed and operate similar to circuits 4-7, described earlier.

Circuits 12-15 include dual parametric sensing devices 22A and 22B connected in parallel across machine 13 load. Dual parametric sensing devices, or more, may be selected for different conditions in one or more areas of machine 13. For example, Parametric sensing device 22A may be a NTC thermistor located in a fire prone area of machine 13, while parametric sensing device 228 may also be a NTC thermistor located in a second fire prone area of machine 13. Similarly, parametric sensing device 22B could be any suitable parametric sensing device, such as, for example, a vibration sensing switch, a tilt sensor switch, or a tip over switch.

Referring also to FIGS. 26-41 there are shown schematic circuit diagrams of different embodiments of the shielded 4 wire-conductor 27A power cord apparatus 10 in accordance with the power cord apparatus shown in FIGS. 1A-1D. Controller circuitry 16A shown as alternate circuits 27 through 42 in FIGS. 26-41, respectively operate similar to corresponding controller circuitry described earlier. It will be appreciated that shielded 4 wire-conductor 27A may be any suitable shielded N wire-conductor, where N equals any suitable number of conductors. It will be further understood that shielded 4 wire-conductor 27A may include conductive or non-conductive shielding.

Figure 42:
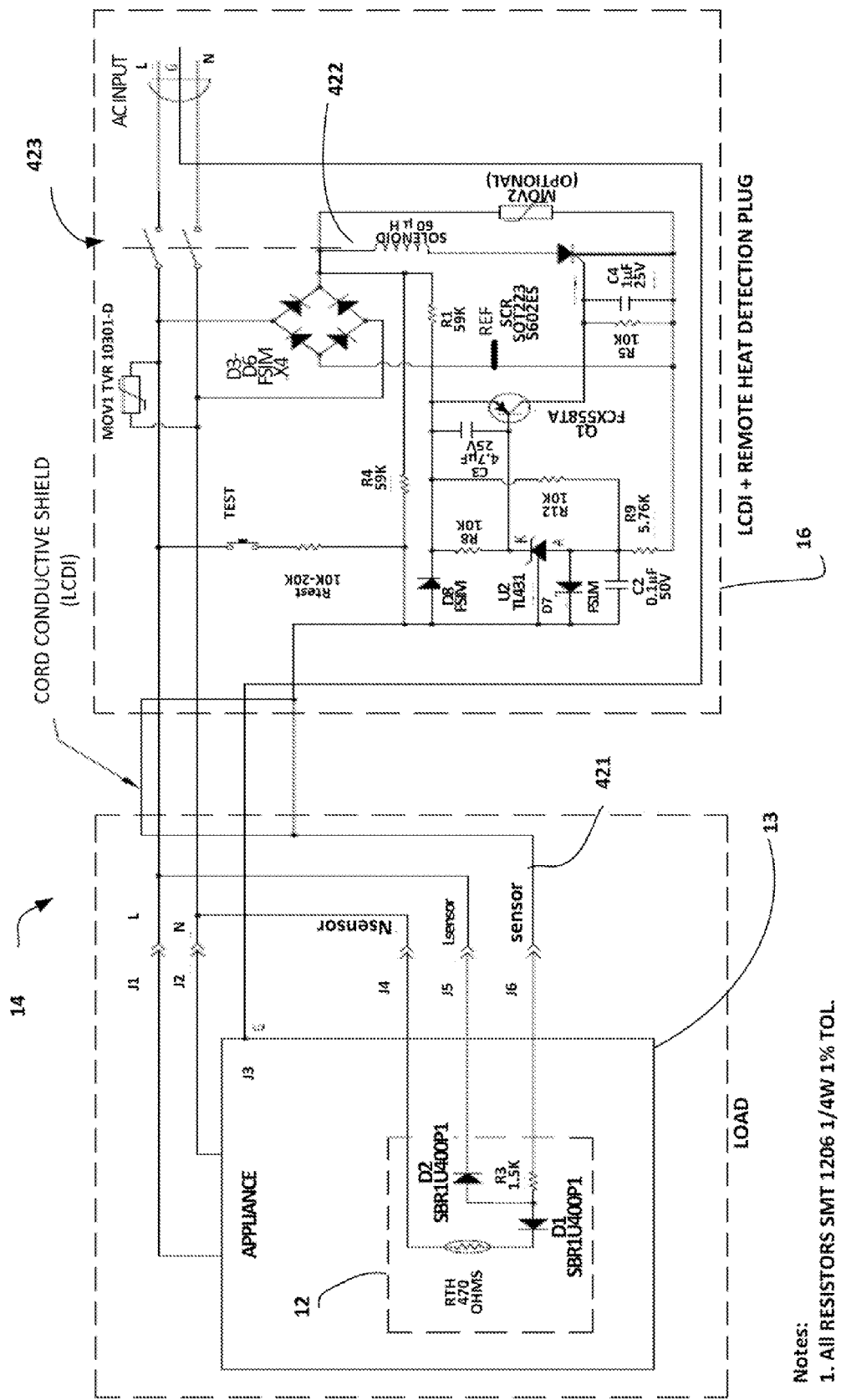
FIG. 42 is a schematic circuit diagram of an alternate embodiment of the conductive shield power cord apparatus with a full wave bridge rectifier controller in accordance with the power cord apparatus shown in FIGS. 1A-1E.

Referring also to FIG. 42 there is shown a schematic circuit diagram of an alternate embodiment of the conductive shield power cord apparatus with a full wave bridge rectifier controller in accordance with the power cord apparatus shown in FIGS. 1A-1E.

Sensor Assembly 12 consists of sensor board (not shown) and wire assembly 422 comprising N-sensor wire, L-sensor wire, and SENSOR wire. A cord (see FIG. 45:451) comprising wire assembly 422 wires connects the sensor assembly 12 to the plug 16 circuitry.

The thermistor wire 421 is used for sensing the voltage across the thermistor $R_{TH}$. Thermistor voltage rises as a result of a temperature rise on the surface in contact with the sensor assembly casing (See FIG. 45:444). The sensor circuit assembly 12 consists of PTC thermistor, a biasing resistor R3, and diodes D1 and D2. The thermistor RTH changes electrical resistance based on ambient or sensed temperature variations with corresponding changes in voltage drop across thermistor $R_{TH}$. D1 blocks reverse current flow and prevents the plug 16 from inadvertently tripping when line voltage on line L is negative with respect to neutral wire N. D2 prevents inadvertent tripping due to very small leakage currents from thermistor wire 421 to Line L.

To detect a fault condition resulting from shorting the thermistor wire 421 to neutral, R3, a part of a voltage sensing circuit, is located in sensor assembly 12.

The bridge rectifier comprising of D3-D6 ensures that U1 (SCR) and U2 are biased properly and that the nodes labeled as "Ref" in FIG. 42 are always at the lowest potential. It will also be appreciated that bridge rectifier D3-D6 enables proper circuit function in the case where Line and Neutral are reversed at the Mains (an Underwriters Laboratory (UL) requirement).

Still referring to FIG. 42, precision comparator U2 is a three-terminal adjustable regulator. The output voltage of U2 may be set to any suitable voltage such as, for example between $V_{REF}$ (approximately 2.5 volts) and, for example, approximately 36 volts with external circuit components. U2 may be any suitable precision comparator or active electronic component, such as, for example FAIRCHILD TL431 programmable shunt regulator wired as a precision comparator.

In normal operation voltage divider path from rectifier D3-D6 through R3, R3, D1, $R_{TH}$ to neutral line N is such that the reference lead R on U2 does not exceed U2's reference voltage, nominally for the TL431, approximately 2.5 volts; thus U2 is biased in the off, or non-conducting state.

In the event of a temperature rise thermistor $R_{TH}$ resistance begins to rise and the voltage drop across the thermistor rises correspondingly. As the voltage across the thermistor $R_{TH}$ rises the voltage on U2's reference input R exceeds U2's reference voltage; thus forward biasing U2 to an on, or conducting state.

During the AC input when the half cycle Line is negative with respect to Neutral, an undesired reverse voltage condition at the Reference-Anode of U2 is prevented by means of diode D7.

Other undesired fault conditions may occur when thermistor wire 421 is broken or shorted to line or neutral which can cause high voltage levels at the reference R of U2. To protect U2, diode D8 allows excess voltage well above the voltage necessary to forward bias U2 to "Discharge" via Cathode node "K" of U2. Capacitor C2 prevents electrical noise signals from creating a false tripping condition at the gate "F" of U2.

Still referring to FIG. 42, compensation resistors R1, R12, and R9 provide stable Ref-Anode voltage at U2 in presence of line voltage variations, and component tolerances. It will be appreciated that R1, R12, and R9 and the sensing voltage pair R3 and R4 are advantageously selected to balance the voltage across U2's reference and anode inputs. It will be further appreciated that the voltage balance, in normal operations, biases U2 in the non-conducting or off state and that the tripping voltage seen by U2 is not significantly affected by line voltage variation or component tolerances. It will also be understood that when thermistor Rut senses an undesirable predetermined temperature the voltage balance is unbalanced resulting in a circuit tripping condition as described herein.

When a predetermined voltage threshold is reached at U2, the circuit is designed to trip in a controlled fashion. Trigger circuit consists of R1, R8, C3, Q1, R5, C4 and U1. U2 and Q1 ensure that the wide variation in trigger levels of U1 (SCR) can be satisfied while keeping the temperature trip level tightly controlled. R8 is prevents Emitter-Base voltage at Q1 (PNP) from reaching the trigger threshold at an undesirable time. C3 prevents electrical noise or surge voltages from falsely turning on Q1. As noted earlier R1, R12, and R9, and along with R3 and R4, balance the voltage across U2's reference input and anode. In addition, the value of R1 also ensures that U2 operates in a specified voltage region. Further, the values of R1, R12, R9 ensure that adequate current will flow through U2 when it becomes forward biased (i.e., circuit is tripped). Once Q1 is turned on and conducting, R5 provides trigger voltage level at the gate "G" of SCR U1. C4 prevents electrical noise from inadvertently triggering the SCR U1.

It will be further understood that the values of R1, R12, and R9 are also critically selected, along with other circuit components, to advantageously self-monitor for proper operation and detect, in addition to an overheat condition or arcing, the following potential fault conditions associated with the power cord apparatus described herein:

1. Thermistor wire (421) shorted to Line, or Neutral; and
2. broken Thermistor wire (421); and
3. broken L-sensor wire; and
4. broken N-sensor wire to Neutral.

It will be appreciated that any one of these conditions will trip the circuit as described herein. Thus, if the circuit is not tripped there is a corresponding high level of confidence that the power cord and device is functioning properly.

Trip circuit (FIG. 1E: item1E1) comprises, primarily, C4, R5, SCR (U1) and relay coil (L1). As Q1 starts to conduct, the voltage drop across R5 (U1 gate) increases; when the voltage reaches a pre-determined level, U1 will conduct, thus energizing coil 422 of the manual latching relay. The energized coil dis-engages the mains contacts 423 and de-energizes the appliance and the circuit. R5 also serves to dissipate any residual gate voltage to prevent the circuit from unintentionally tripping after the fault condition is remedied and the mains voltage is reapplied.

Optional MOV1 suppresses voltage spikes that might inadvertently cause SCR to conduct or would damage the SCR (U1).

Test circuit connects thermistor wire 451 to Line via TEST button and series resistor $R_{test}$. Series resistor $R_{test}$ limits inrush current.

Figure 43:
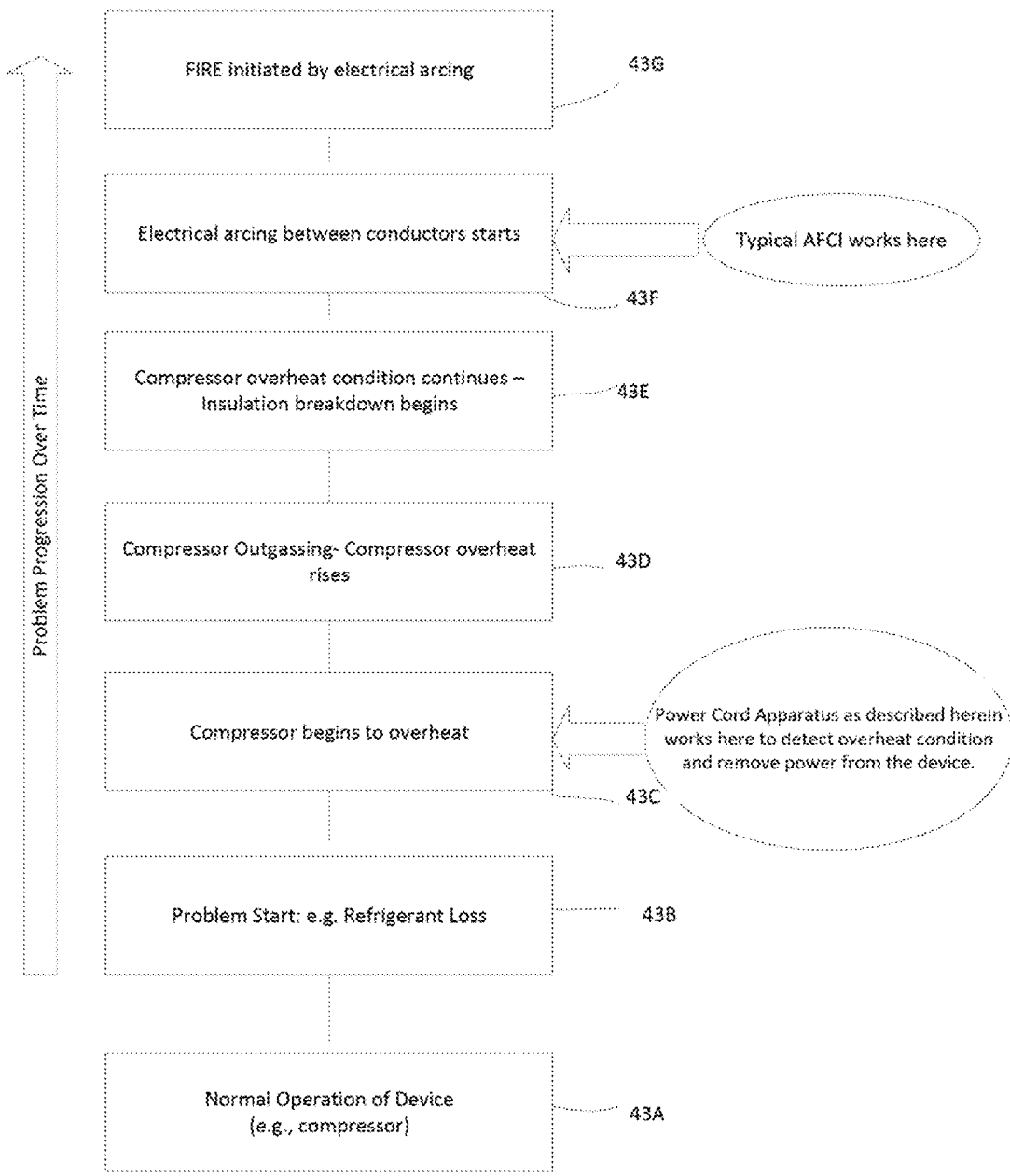
FIG. 43 is a block diagram showing problem detection time advantage of the power cord apparatus shown in FIGS. 1A-1E and FIGS. 2-42 relative to typical AFCI detection circuits.

Referring also to FIG. 43, there is shown a block diagram showing problem detection time advantages of the power cord apparatus shown in FIGS. 1A-1E and FIGS. 2-42 relative to typical AFCI detection circuits. As shown in FIG. 43, a compressor, for example, exhibits normal operation at 43A. At 43B the compressor exhibits refrigerant loss and begins to overheat 43C. It will be appreciated by those skilled in the art that a compressor may overheat for many reasons other than refrigerant loss. As compressor overheat condition continues, e.g., refrigerant outgassing continues, the compressor temperature continues to rise 43D. At 43E electrical insulation begins to deteriorate and electrical arcing between conductors begins 43F, potentially causing a catastrophic fire 43G. It will be appreciated that the time from problem start 43B to catastrophic fire 43G can be on order of seconds. It will be further appreciated, as shown in FIG. 43, that the invention described herein detects a beginning overheat condition early in the problem time line (at 43C) and turns of power to the device well before the problem can escalate to a catastrophic fire.

Figure 44:
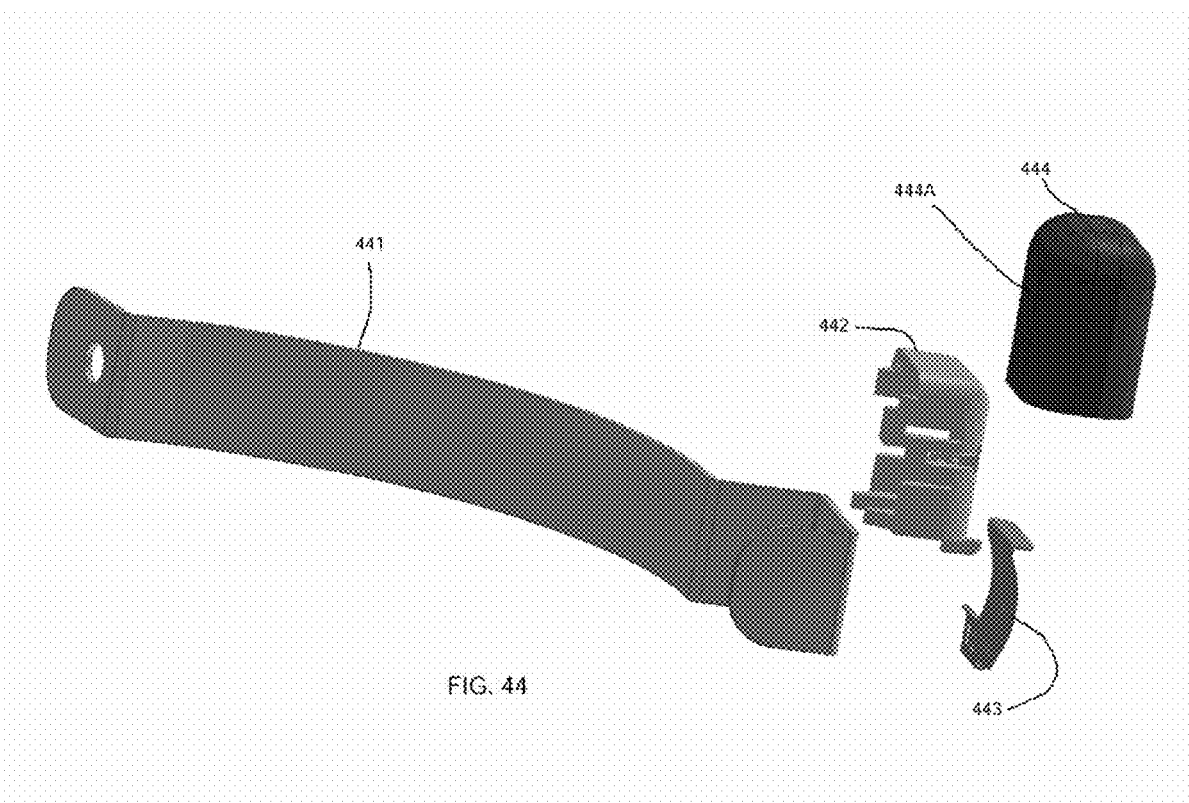
FIG. 44 is an exploded illustration of the sensing device and a holding bracket shown in FIGS. 1A-1E.
Figure 45:
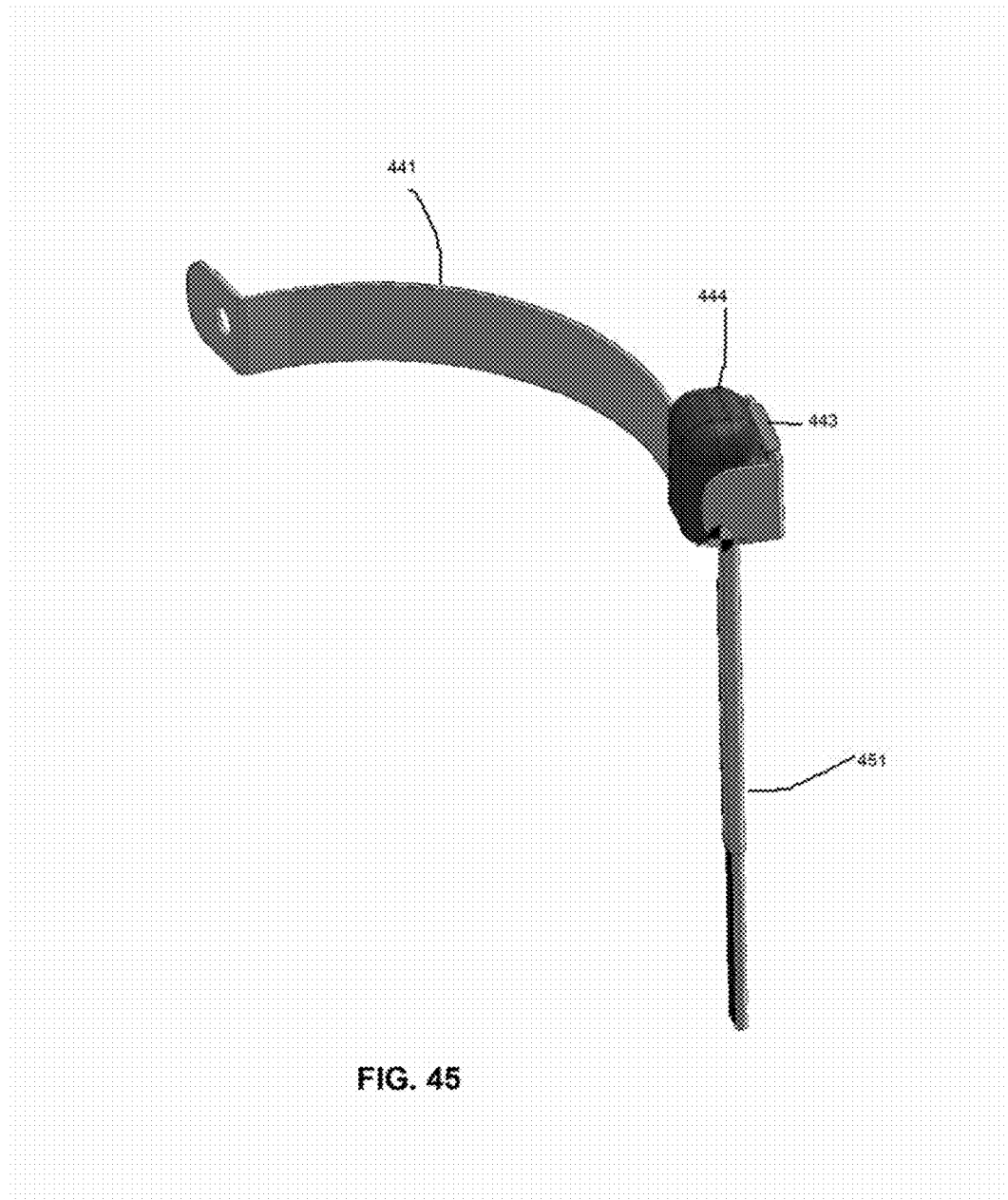
FIG. 45 is an unexploded illustration of the sensing device and holding bracket shown in FIG. 44.
Figure 46:
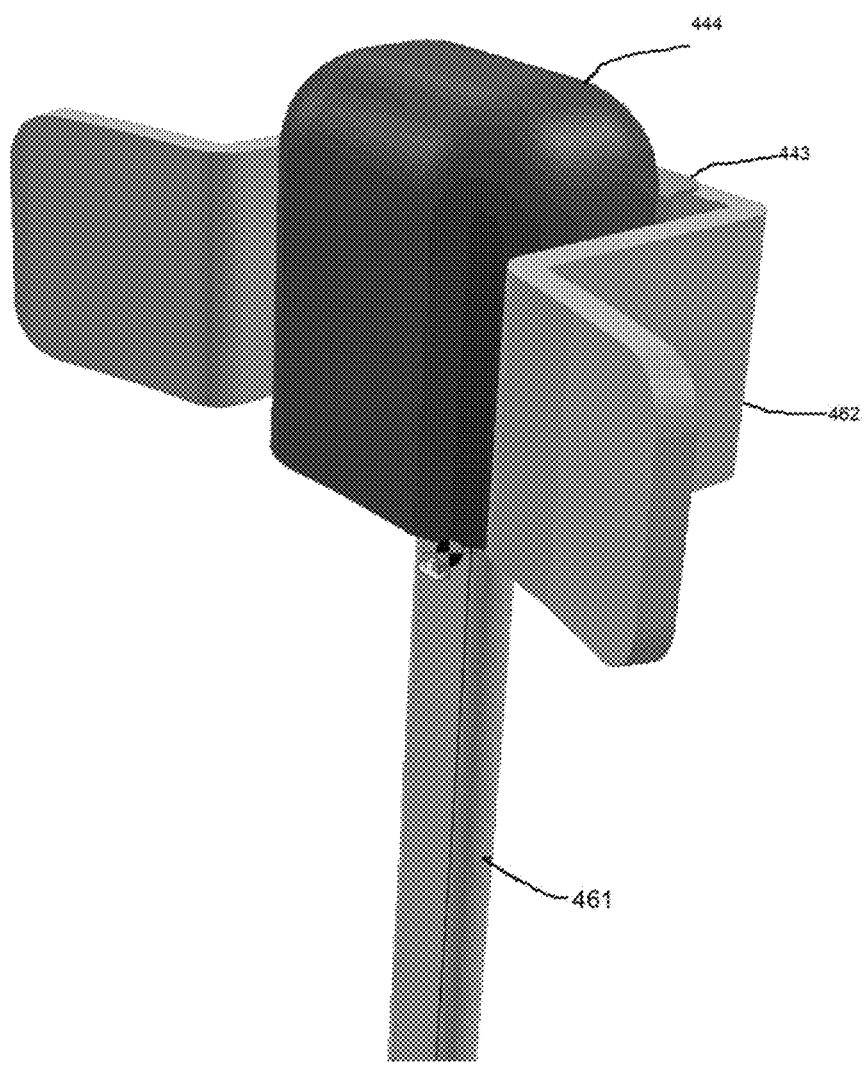
FIG. 46 is an illustration of the sensing device shown in FIGS. 1A-1E and an alternate holding bracket.

Referring also to FIGS. 44-46 there are shown physical embodiments of the sensor assembly 12 and attachment means. Circuit board support 442 supports the circuit assembly 12, Circuit board support 442 may be any suitable material. Sensor housing 444 for housing circuit board support 442 and circuit assembly 12. Sensor housing 444 may be any suitable thermally conductive material such as, for exemplary purposes only, brass, aluminum, or aluminum bronze. It will be appreciated that sensor housing 444 may have a curved face 444A as shown in FIG. 44 to facilitate thermal conductivity in a direction normal to a surface. It will be further appreciated that the curved face 444A of sensor housing 444 may be any suitable radius of curvature. It will also be appreciated that sensor housing 444 may be filled with a thermally conductive epoxy to facilitate thermal transfer from housing 444 to thermistor $R_{TH}$.

Still referring to FIGS. 44-46 spring clip 443 attaches housing 444 to holding strap 441. FIG. 6 shows alternate welding or brazing strap 462 for holding housing 444 against a surface to be temperature monitored.

Figure 47:
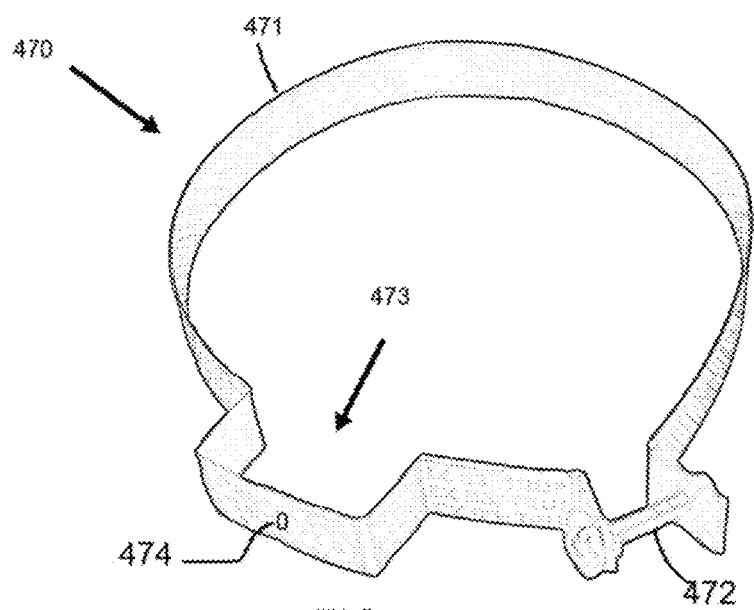
FIG. 47 is a pictorial illustration of a band clamp for holding sensing device shown in FIGS. 44-46.

Referring also to FIG. 47 there is shown a pictorial illustration of a band clamp assembly 470 for holding sensing device 444 shown in FIGS. 44-46. Band clamp assembly includes band 471, bolt 472, opening 473, and dimple 474.

Still referring to FIG. 47, band clamp assembly 470 may be any suitable type of clamp type such as T-bolt clamp, spring loaded clamp, adjustable diameter T-bolt clamp, barrel clamp, worm gear clamp, or V-band clamp. Similarly, band 471 may be any suitable material such as, for example, stainless steel, galvanized steel, or plastic for applications requiring a non-conductive, non-corrosive, or thermally insulated clamp.

Likewise, bolt 472 may be any suitable bolt such as, for example, stainless steel, galvanized steel, or plastic.

Still referring to FIG. 47, opening 473 is sized to substantially fit sensor housing 444 described herein and shown in earlier figures. Dimple 474 is sized and located to fit an inverted dimple on the sensor housing 444 to prevent the sensor housing 444 from slipping out of opening 473 when installed.

Figure 48:
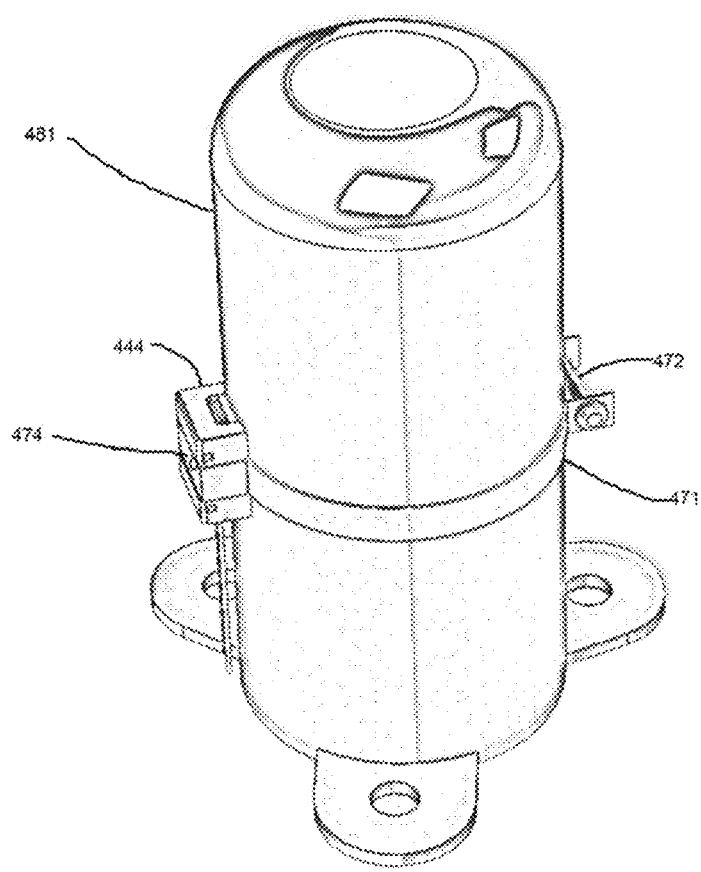
FIG. 48 is an exemplary pictorial illustration of a band clamp holding sensing device shown in FIGS. 44-46.

Referring also to FIG. 48 there is shown an exemplary pictorial illustration of a band clamp holding sensing device shown in FIGS. 44-46. As shown in FIG. 48 sensor assembly 444 is held flush against device 481. Device 481 may be any device such as, for example, a compressor found in air conditioners or dehumidifiers (see FIGS. 1B-1C).

The versions of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An alternating current (AC) power cord apparatus, connectable via a manual latched relay to an AC power Mains source having hot and neutral lines, and a device, the power cord including a conductive shield, a ground wire, a neutral wire for connecting to the neutral line, a line wire for connecting to the hot line and the power cord apparatus comprising:
   a remote temperature detection sensor assembly comprising:
      at least one thermistor for changing electrical resistance in response to a change in temperature, wherein changing electrical resistance corresponds to changing voltage drop across the thermistor, and wherein the remote temperature assembly is connectable to the conductive shield via a sensor wire;
      an L-sensor wire connectable to the line wire;
      an N-sensor wire connectable to the neutral wire;
   a rectifier for rectifying AC Mains input voltage, wherein the rectifier comprises a bridge rectifier;
   a sensing circuit connectable to the remote temperature sensor and the rectifier, the sensing circuit comprising a voltage comparator, wherein the voltage comparator comprises:
      an active electronic device comprising a reference input, an anode and a cathode, wherein the active electronic device compares the changing voltage drop across the thermistor to a predetermined reference voltage and in response to the comparison changing from a non-conducting state to a conducting state;
      a first diode across the reference input and the anode for protecting the active electronic device during a negative half cycle of the AC Mains input voltage;
      a second diode across the reference input and the cathode for protecting the active electronic device during a positive half cycle of the AC Mains input voltage;
   a voltage compensation circuit for balancing bias voltages, wherein the voltage compensation circuit is connectable to the rectifier and the sensing circuit; and
   a trip circuit for delatching the manually latched relay in response to a fault condition or excessive device temperatures.

2. The voltage comparator as in claim 1 further comprising the active electronic device comparing a changing voltage on the reference input to the predetermined reference voltage, wherein the changing voltage is due to a fault condition.

3. The trip circuit as in claim 2 comprising a second active electronic device and at least one silicon controller rectifier (SCR), wherein the second active electronic device is connectable between the cathode and the SCR and wherein the second active electronic device triggers the SCR in response to the activation of the voltage comparator.

4. The voltage compensation circuit as in claim 1 comprises:
   a first voltage divider comprising a plurality of resistors connectable between the bridge rectifier and the anode;
   a second voltage divider comprising a second plurality of resistors connectable between the bridge rectifier the thermistor and the reference input; and
   wherein the first voltage divider develops a first voltage and the second voltage divider develops a second voltage, wherein the first and second voltage difference are cooperatively balanced and biases the active electronic component in the off state during normal operation.

5. The remote temperature detection sensor assembly as in claim 4 comprises at least one of the second plurality of resistors.

6. The remote temperature detection sensor assembly as in claim 5 comprising a plurality of diodes connectable to the at least one of the second plurality of resistors.

7. A self-monitoring alternating current (AC) power cord apparatus for remotely detecting excessive operational parameters via at least one remote parametric sensing device, the apparatus comprising:
   an upper housing, wherein the upper housing is adaptable to fit snugly within the palm of a hand;
   a lower housing, mateable with the upper housing, wherein the lower housing comprises a plurality of gripping surfaces; wherein the lower housing comprises a controlling circuit, wherein the controlling circuit comprises:
      a rectifier for rectifying AC Mains input voltage, wherein the rectifier comprises a bridge rectifier;
      a sensing circuit connectable to the remote temperature sensor and the rectifier, wherein the sensing circuit comprises at least one active electronic component;
      a voltage compensation circuit for balancing bias voltages, wherein the voltage compensation circuit is connectable to the rectifier and the sensing circuit;
      a trip circuit for delatching the manually latched relay in response to a fault condition or excessive device temperatures; and
   a remote temperature detection sensor assembly connectable to the controlling circuit, wherein the remote temperature detection sensor assembly comprises:
      at least one circuit board support for supporting a temperature sensing circuit;
      at least one sensor housing for containing the at least one circuit board support, wherein the sensor housing comprises:
         at least one face comprising a curvature exceeding 0 degrees;
      at least one holding device, the at least one holding device having at least one dimple;
      at least one spring clip for holding the sensor housing to the at least one holding device, the at least one spring clip comprising at least one inverse dimple for mating to the at least one dimple.

8. The temperature sensing circuit as in claim 7 further comprising at least one thermistor.

9. The voltage compensation circuit as in claim 7 for balancing bias voltages, the voltage compensation circuit comprising:
   a first voltage divider comprising a plurality of resistors;
   a second voltage divider comprising a second plurality of resistors; and
   wherein the first voltage divider develops a first voltage and the second voltage divider develops a second voltage, wherein the first and second voltage difference are cooperatively balanced and bias the active electronic component in the off state during normal operation.

10. The trip circuit as in claim 7 for delatching the manually latched relay in response to a fault condition further comprising a fault condition selected from the group of the sensor wire shorted to line, the sensor wire shorted to neutral, the sensor wire broken, the L-sensor wire broken, and the N-sensor wire broken.

\* \* \* \* \*